US012775784B2

(12) United States Patent
Turner

(10) Patent No.: US 12,775,784 B2
(45) Date of Patent: Oct. 27, 2026

(54) DOCUMENT TEMPLATE GENERATION

(71) Applicant: DocuSign, Inc., San Francisco, CA (US)

(72) Inventor: Mariam Badiei Turner, Charlotte, NC (US)

(73) Assignee: Docusign, Inc., San Francisco, CA (US)

( * ) Notice: Subject to any disclaimer, the term of this patent is extended or adjusted under 35 U.S.C. 154(b) by 163 days.

(21) Appl. No.: 18/420,308

(22) Filed: Jan. 23, 2024

(65) Prior Publication Data

US 2025/0238605 A1 Jul. 24, 2025

(51) Int. Cl.
*G06F 40/186* (2020.01)
*G06F 40/194* (2020.01)
*G06F 40/197* (2020.01)

(52) U.S. Cl.
CPC .......... *G06F 40/186* (2020.01); *G06F 40/194* (2020.01); *G06F 40/197* (2020.01)

(58) Field of Classification Search
CPC ..... G06F 40/186; G06F 40/194; G06F 40/197
See application file for complete search history.

(56) References Cited

U.S. PATENT DOCUMENTS 9,208,450 B1 12/2015 Nanda
9,213,893 B2 12/2015 Laaser
10,387,559 B1 8/2019 Wendt
11,079,987 B2 * 8/2021 Downs ................. G06V 30/414
11,087,219 B1 8/2021 Brecque
11,128,680 B2 9/2021 Nawrocki
11,775,747 B1 * 10/2023 Religa ..................... G06T 11/60 715/243
11,861,751 B2 1/2024 Wodetzki
12,210,824 B1 1/2025 Cabaud, III
2006/0224952 A1 * 10/2006 Lin ....................... G06F 40/143 715/209

(Continued)

FOREIGN PATENT DOCUMENTS

WO 2023076059 A1 5/2023
WO 2023242540 A1 12/2023

OTHER PUBLICATIONS

International Search Report and Written Opinion for International Application No. PCT/US2024/062236, mailed on Mar. 13, 2025, 14 pages.

*Primary Examiner* — Asher D Kells
(74) *Attorney, Agent, or Firm* — KDW FIRM PLLC

(57) ABSTRACT

A method, a system, and a computer program product for generation of templates for electronic documents. A first template is generated based on a plurality of electronic documents. The first template defines a first structural arrangement of one or more portions extracted from the electronic documents and includes one or more portions. A machine learning model determines the first structural arrangement. An update to at least one portion is received. A second template is generated based on the first template and the received update. The second template defines a second structural arrangement of the portions as determined based on the first structural arrangement and the received update. An object model representative of at least one of: the first template, the second template, and a difference between the first and second templates is stored.

20 Claims, 23 Drawing Sheets

(56) References Cited

U.S. PATENT DOCUMENTS

| | | | | |
|---|---|---|---|---|
| 2007/0011608 | A1 | 1/2007 | Titemore | |
| 2014/0025608 | A1 | 1/2014 | Miller | |
| 2014/0164255 | A1 | 6/2014 | Daly | |
| 2017/0308517 | A1* | 10/2017 | Josifovski | G06Q 10/10 |
| 2018/0144042 | A1* | 5/2018 | Sheng | G06Q 10/10 |
| 2018/0239959 | A1 | 8/2018 | Bui | |
| 2020/0104353 | A1 | 4/2020 | Chua | |
| 2020/0371647 | A1 | 11/2020 | Gerges | |
| 2021/0406319 | A1* | 12/2021 | Holt | G06N 3/0499 |
| 2022/0019624 | A1 | 1/2022 | Gwozdz | |
| 2022/0108065 | A1* | 4/2022 | Eshghi | G06F 16/164 |
| 2022/0343250 | A1 | 10/2022 | Tremblay | |
| 2022/0398680 | A1 | 12/2022 | Wodetzki | |
| 2023/0274084 | A1* | 8/2023 | Modani | G06F 40/174<br>715/243 |
| 2024/0153299 | A1 | 5/2024 | Pillai | |
| 2024/0338959 | A1* | 10/2024 | Dua | G06V 30/412 |
| 2024/0403372 | A1 | 12/2024 | Boyce | |
| 2025/0077625 | A1 | 3/2025 | Coleman | |
| 2025/0148020 | A1 | 5/2025 | Padmashali | |
| 2025/0209256 | A1 | 6/2025 | Marom | |
| 2025/0209257 | A1 | 6/2025 | Marom | |

* cited by examiner

DOCUMENT TEMPLATE GENERATION

BACKGROUND

An electronic document management platform allows organizations to manage a growing collection of electronic documents, such as electronic agreements. An electronic agreement may be tagged with a visual element for receiving an electronic signature. An electronic signature is data that is logically associated with other data and used by a signatory to sign the associated data. Due to constantly evolving legal and technical requirements imposed on electronic documents, an entire ecosystem of processes, devices, systems and networks continuously evolve around the safe and secure contract lifecycle management (CLM), such as generation, delivery, management, searching and storage of electronic documents. In particular, document generation is a resource intensive task that typically consumes a substantial amount of time and requires special skills, research, and knowledge. Many documents, especially, legal documents, include standard portions, provisions, clauses, etc. that users do not need to formulate anew every time such documents are created. Such documents also include a common structure or organization that also do not require reinvention. However, conventional systems typically lack an ability to allow users to rely on and use the knowledge, format, etc. of prior-created documents to generate similar types of documents. Instead, users, using such systems, are forced to create these documents every time a similar document is needed, resulting in errors, lower levels of accuracy, and waste of resources.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
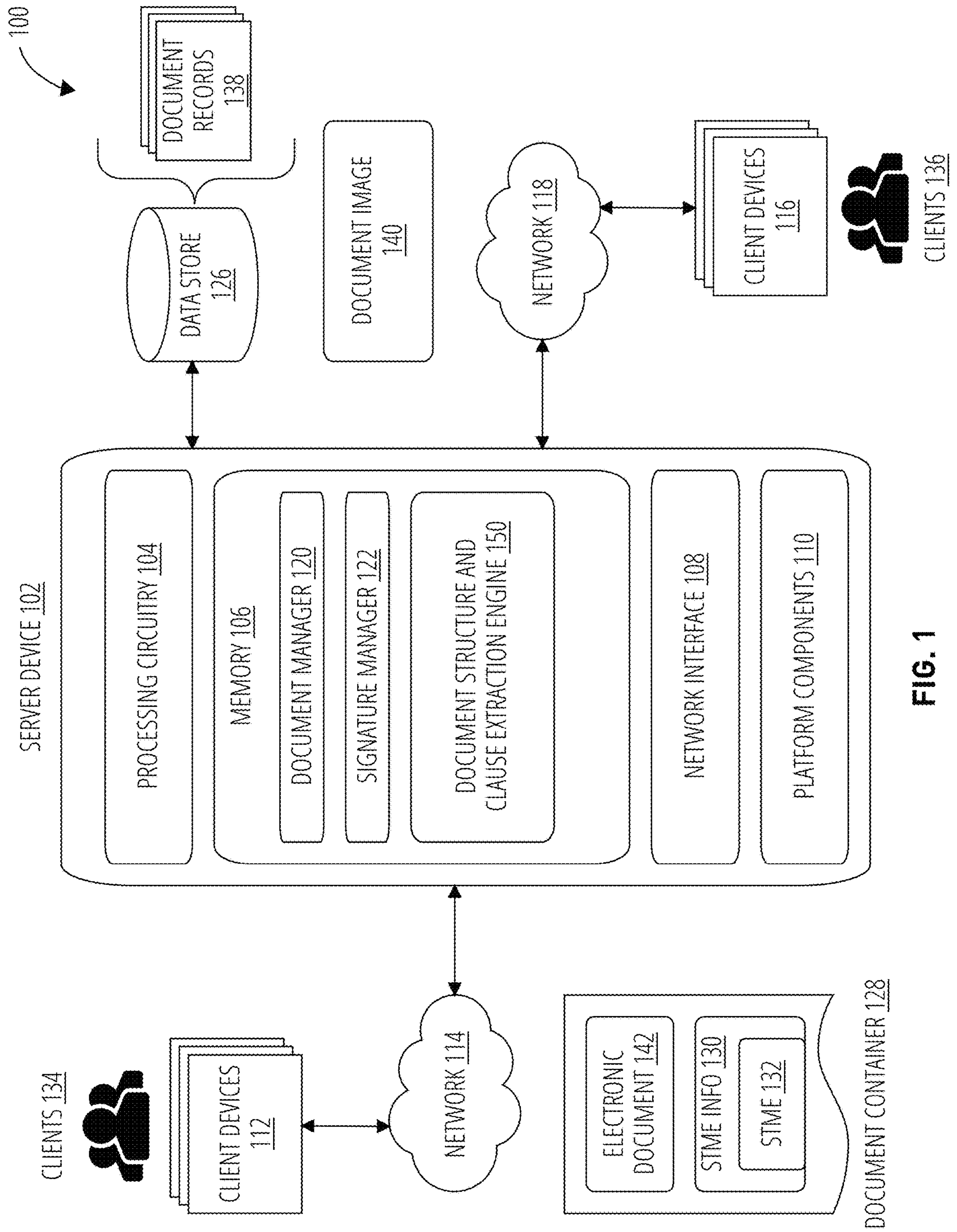
FIG. 1 illustrates a system in accordance with one embodiment.

Embodiments disclosed herein are generally directed to techniques for extracting structure of electronic documents and any associated portions thereof, and generating one or more templates for such documents, where extraction of document structure and/or their portions and/or generation of templates are assisted through use of machine learning models and artificial intelligence architectures. In general, a document may include a multimedia record. The term "electronic" may refer to technology having electrical, digital, magnetic, wireless, optical, electromagnetic, or similar capabilities. The term "electronic document" may refer to any electronic multimedia content intended to be used in an electronic form. An electronic document may be part of an electronic record. The term "electronic record" may refer to a contract or other record created, generated, sent, communicated, received, or stored by an electronic mechanism. An electronic document may have an electronic signature. The term "electronic signature" may refer to an electronic sound, symbol, or process, attached to or logically associated with an electronic document, such as a contract or other record, and executed or adopted by a person with the intent to sign the record.

An online electronic document management system provides a host of different benefits to users (e.g., a client or customer) of the system. One advantage is added convenience in generating and signing an electronic document, such as a legally binding agreement. Parties to an agreement can review, revise and sign the agreement from anywhere around the world on a multitude of electronic devices, such as computers, tablets and smartphones.

In some embodiments, the current subject matter may be configured to provide a framework for processing and/or understanding electronic documents for the purposes of generation of templates that may be used to create other electronic documents of a particular type (e.g., sales agreements, non-disclosure agreements, etc.). This may be accomplished through analysis of electronic documents of particular type(s) to extract their structure and any portions thereof (e.g., clauses of an agreement). The structure of the document(s) may be used to determine information about positions of various portions within electronic documents. The extracted portions may be stored as object models, which may include label(s), metadata, etc. that may describe specifics of each portion. The extracted portions may be stored in a repository and may be connected to other extracted clauses in a "spider web", tree, etc. fashion. This allows querying such clauses for the purposes of generation of templates and/or document rules for a particular type of document. A generative artificial intelligence (AI) model may be used to analyze electronic documents for the purposes of extraction/labeling of their portions. A structure of the document (e.g., where specific portions are located within the document) may be determined as well. Iterative feedback may also be received to improve document portion extraction, labeling, etc.

As part of document structure generation, the current subject matter may be configured to receive and/or ingest an electronic document that may be represented in any desired format (e.g., .pdf, .docx, etc.). Moreover, the document may include, for instance, text, graphics, images, tables, audio, video, computing code (e.g., source code, etc.) and/or any other type of media. An output may include a structure that may represent a hierarchical structure and/or any other type of structure of the electronic document that may identify its various elements (e.g., heading, section, paragraph, sentence, table, image, video, etc.) and relationships between the elements. The relationships may, for instance, be defined by one or more sections being included under a specific heading; a first section including five paragraphs with first three paragraphs including four sentences, and last two paragraphs including two sentences; a second section including a paragraph and a table; a third section including a graphic; etc. As can be understood, these examples are non-limiting and other structural relationships and/or elements of a document may be organized into the document structure.

In some embodiments, the current subject matter may be configured to analyze a plurality of electronic documents and determine a structure and/or portions of documents that may be common to particular types of documents. For example, all lease agreements may include an address of a property being leased, identification of parties, a terms clause (e.g., 1 year, 2 years, etc.), a law of agreement clause, a damages clause, etc. Alternatively, or in addition, all non-disclosure agreements may include a confidentiality clause, a damages clause in the event of breach of confidentiality, etc. Thus, the current subject matter may be configured to identify types of electronic documents that it analyzes and determine that specific portions that may be common to them.

Once the type of the electronic documents have been determined and structures of documents, including portions thereof, have been ascertained and/or extracted, a machine learning model may be used to generate one or more templates that may be specific to a particular type of electronic documents. The templates may define a structural arrangement of portions of the electronic document for each type of electronic document (e.g., in a lease agreement, the names of the parties section is followed by address of the leased property section, which, in turn, is followed by a term section, etc.). Moreover, once the templates are generated, one or more portions (e.g., sample portions) may be associated with specific locations. For example, in a lease agreement, "The duration of this lease agreement is for years" section may be linked to a location of the term section in the lease agreement. The linking may be accomplished using one or more identifiers, metadata, labels, etc.

The template along with associated portions may be stored as an object model in a storage location (e.g., a template database) and may include the requisite labels, metadata, etc., which may indicate how and where document portions may be insertable when generating an electronic document. The stored templates and associated portions may be used to generate documents that may later be modifiable by end users. For example, if a request to generate a lease agreement is received, the current subject matter may be configured to determine that a lease agreement type of documents is being requested and initiate a query to the template database that may indicate that lease agreement templates and associated clauses are being sought. The query may then be submitted to the template database. The query may be in any desired format. The template database may then be searched to retrieve one or more lease agreement templates and clauses that may have been linked to with the lease agreement templates. The retrieved lease agreement clauses that may be associated with the lease agreement template may be inserted into the lease agreement that is being generated based on the lease agreement template.

As can be understood, templates and associated clauses may be generated for any type of electronic documents, e.g., agreement types, legal document types, non-legal document types, and any combinations thereof. Further, portions from one type of document (e.g., lease agreement) may be associated with portions from another type of document (e.g., master services agreement).

In some embodiments, the current subject matter may be configured to receive feedback from at least one user computing device. The feedback may be to the generated templates, associated portions of documents, and/or documents that have been generated using templates retrieved from template database. Once feedback is received, the current subject matter may be configured to update one or more templates stored in the template database. All templates may be updated. Alternatively, or in addition, only templates for a specific type of electronic document may be updated. Moreover, the feedback may be used to identify one or more machine learning (ML) models for generating templates for specific type(s) of electronic documents (e.g., one ML model may be used to generate templates for lease agreements, another ML model may be used to generate templates for non-disclosure agreements, etc.). In some embodiments, the feedback may be used to update an ML model that was used to generate a previous version of a template. For example, an update (e.g., feedback) to a termination clause of a lease agreement may be received (e.g., an original termination clause of "The term of this lease agreement is ______ years" may be updated to "The term of this lease agreement is ______ years. The term is renewable for ______ years upon agreement by the parties.") causing an update to the ML model that was used to generate original template. The update may trigger an update to the ML model, which in turn, may trigger update to the template, thereby generating an updated template. As can be understood, the feedback may be used to perform any desired action and/or any combination of actions.

In some embodiments, the ML models may include at least one of the following: a large language model, at least another generative AI model, and any combination thereof. The generative AI models may be part of the current subject matter system and/or be one or more third party models (e.g., ChatGPT, Bard, DALL-E, Midjourney, DeepMind, etc.). In some embodiments, the generative AI model may be provided with specific types of electronic documents, specific document portions of the electronic document, the electronic documents themselves, and/or any other information to assess a structure of the document(s) and their respective portions. For example, the generative AI model may be provided with the sales agreement and asked to determine where each clause of the agreement (e.g., termination, law of the agreement, sales terms, etc.) are located. It may also be asked to retrieve specific portions of the sales agreements and determine them to be representative of a particular clause. The models may determine that a particular language of a clause (e.g., termination clause) is standard across several sales and agreements and thus may be used as a common portion and hence, associated with the template for the sales agreement.

In some embodiments, the user may be presented with the output from the generative AI model and may provide feedback (e.g., "thumbs up", "thumbs down", vote, written feedback, etc.). The feedback may be used to adjust and/or finetune, for example, how a document structure may be generated, how portions of document may be selected, etc. For example, too many thumbs down on a structure for a particular type of document may mean that the way the structure is determined may need be adjusted to account for more important content, etc. User feedback may be used to update document structure and/or retrieved portions of documents, train and/or re-train and/or refresh train one or more models used for generation of templates and/or selection of portions of documents for association with templates, and/or for any other purpose(s).

In some embodiments, the structural representation of documents that may be used for generation of templates may include one or more groups of elements within an arrangement of elements. The arrangement of elements and/or groups of elements may be determined based on at least one of the following: a position of each element in electronic documents, a type of each element in electronic documents, one or more functions of each element in electronic documents, etc., and/or any combinations thereof. For example, the elements may be grouped based on a specific subject (e.g., termination provisions of agreement), a specific location in the document (e.g., where "whereas" clauses are located), a specific function of an element (e.g., tables, etc.), etc. The elements include at least one of the following: a text, an audio, a video, an image, a table, and/or any combinations thereof.

In some embodiments, the current subject matter may be configured to use extracted structural representation of electronic documents and associated document portions to dynamically provide users with new and/or updated templates (e.g., on the fly) when updates and/or additional information related to the structural representation and/or document portions is received. For example, such new and/or updated templates may be automatically generated whenever an update/new information is received. This may allow continuous refinement of templates that may be stored for various types of electronic documents.

For example, if a non-disclosure agreement needs to be generated, a template corresponding to such agreement may be retrieved from a storage location (e.g., a template repository, etc.) and provided to the user for filling in the information. The template that may be retrieved may be generated in accordance with particular requirements (e.g., user's requirements, organizational requirements, legal requirements, etc.). The template and/or any updates thereto and/or any new templates (e.g., to cover variations of the non-disclosure agreement-one under the US law and another one under the French law) may be generated and stored for future use. Further, the templates may be associated and/or linked with original electronic documents, using which, the templates were generated. This may ensure that the documents' structural representation in the template is preserved (e.g., by storing the template and/or any associated information using one or more object models and/or data models). Hence, the structural representation and/or any associated document portions used within the template may be akin to a living document, with any updates/additional information being used as a collective structure of historical document changes.

In some embodiments, to create such living document, the current subject matter may be configured to generate a template and/or a retrieve a template for an electronic document. The template may define a structural arrangement of one or more portions that may be extracted from electronic documents. The template may be generated using one or more historical versions of one or more electronic documents. The documents may be of the same type of documents (e.g., non-disclosure agreements, etc.) and/or of different type of document (e.g., lease agreements and master services agreements). The template may be generated in response to a request to generate an electronic document (e.g., allowing generation of a template on a fly) and/or retrieved from a storage location in response to such request.

In addition to the structural arrangement, the template may also include the document portions that have been extracted. In some example, embodiments, one or more machine learning (ML) models may determine the structural arrangement and associate document portions to the structural arrangement's structural elements within the template. The ML model(s) may be a large language model, a generative artificial intelligence (AI) model, and/or any other models and/or any combination thereof. The ML model(s) may be selected in accordance with a particular type of an electronic document (e.g., a non-disclosure agreement, a lease agreement, a non-legal document (e.g., a book, an article, etc.), etc.). Moreover, the template may likewise be generated and/or retrieved for a particular type of an electronic document.

In some embodiments, an update to at least one document portion in the template may be received. The update may be related to document portions and/or structural arrangement of a template. For example, the update may include additional information (e.g., new confidentiality clause in a non-disclosure agreement), variation of existing document portion (e.g., a US governing law clause for a non-disclosure agreement and a French governing law clause for the same agreement), a supplement to existing document portion and/or structural arrangement (e.g., additional service in the master services agreement), and/or any other update and/or any combination thereof.

Once update is received, the machine learning model may be used to generate another template or another version of the template. The second template may be generated based on the initial template and the update. In some embodiments, the updated template may define another structural arrangement of document portions that may be determined based on the initial structural arrangement and the update. The structural arrangements of initial template and updated template may be the same or different. An object model representative of at least one of: the initial template, the updated template, and a difference between the initial template and the updated template may be stored in a storage location. If the structural arrangements are the same, the object model may include the update to the document portion. If they are different, then the object model may include the update to the document portion and at least one structural difference between the structural arrangements.

In some embodiments, if a request to generate an electronic document is received, the current subject matter may be configured to use the object model to generate the document. It may select between the templates (e.g., initial template, updated template, etc.) that may be included in the object model and use the selected template to generate the electronic document. Moreover, a user may, via a computing device, provide feedback to refine the document generation. Using the feedback, the current subject matter may, for instance, update at least one of the templates to generate at least one of the other templates. It may also identify another machine learning model and generate, using such model, a template defining at least another structural arrangement of document portions of an electronic document for each type of electronic document. Also, it may update the originally used machine learning model to generate an updated machine learning model and then generate, using the updated model, a template for each type of electronic document. As can be understood, the feedback may be used for any other purpose, e.g., training, re-training, refresh training, etc. of one or more models.

One of the technical benefits of the current subject matter is that it provides for a dynamic generation of standardized templates and associated portions for generation of electronic documents based on a specific structure of documents of a particular type. This enables a more effective, faster, and compute-resource efficient generation of electronic document of a particular type that may typically be consumed by generative AI models in performing of complete document analysis and generating a desired document. Some conventional systems typically analyze entire documents to respond to a query seeking generation of a particular document. This consumes a substantial amount of computing resources and takes a long time to complete, especially for large documents. Further, oftentimes, such systems generate incorrect documents with glaring omissions and errors leading to undesired consequences.

Additionally, the current subject matter may allow dynamic creation, versioning, and maintenance of electronic document templates. It ensures that the changes applied to initially generated document templates are tracked and linked to original document(s) that were used to generate the template. This avoids use of static templates that may no longer represent the current state of electronic documents that are generated using such templates, and thus, avoids use of erroneous information when generating documents.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application, or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items may be distinct, or they may be the same, although in some situations the context may indicate that they are distinct or that they are the same.

As used herein, the term "circuitry" may refer to, be part of, or include a circuit, an integrated circuit (IC), a monolithic IC, a discrete circuit, a hybrid integrated circuit (HIC), an Application Specific Integrated Circuit (ASIC), an electronic circuit, a logic circuit, a microcircuit, a hybrid circuit, a microchip, a chip, a chiplet, a chipset, a multi-chip module (MCM), a semiconductor die, a system on a chip (SoC), a processor (shared, dedicated, or group), a processor circuit, a processing circuit, or associated memory (shared, dedicated, or group) operably coupled to the circuitry that execute one or more software or firmware programs, a combinational logic circuit, or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

FIG. 1 illustrates an embodiment of a system 100. The system 100 may be suitable for implementing one or more embodiments as described herein. In one embodiment, for example, the system 100 may comprise an electronic document management platform (EDMP) suitable for managing a collection of electronic documents. An example of an EDMP includes a product or technology offered by DocuSign®, Inc., located in San Francisco, California ("DocuSign"). DocuSign is a company that provides electronic signature technology and digital transaction management services for facilitating electronic exchanges of contracts and signed documents. An example of a DocuSign product is a DocuSign Agreement Cloud that is a framework for generating, managing, signing and storing electronic documents on different devices. It may be appreciated that the system 100 may be implemented using other EDMP, technologies and products as well. For example, the system 100 may be implemented as an online signature system, online document creation and management system, an online workflow management system, a multi-party communication and interaction platform, a social networking system, a marketplace and financial transaction management system, a customer record management system, and other digital transaction management platforms. Embodiments are not limited in this context.

The system 100 may implement an EDMP as a cloud computing system. Cloud computing is a model for providing on-demand access to a shared pool of computing resources, such as servers, storage, applications, and services, over the Internet. Instead of maintaining their own physical servers and infrastructure, companies can rent or lease computing resources from a cloud service provider. In a cloud computing system, the computing resources are hosted in data centers, which are typically distributed across multiple geographic locations. These data centers are designed to provide high availability, scalability, and reliability, and are connected by a network infrastructure that allows users to access the resources they need. Some examples of cloud computing services include Infrastructure-as-a-Service (IaaS), Platform-as-a-Service (PaaS), and Software-as-a-Service (SaaS).

The system 100 may implement various search tools and algorithms designed to search for electronic document(s) and/or collections of electronic documents (which may also be referred to as "transaction documents", "transaction packages", "document packages" or "packages") and/or information within an electronic document or across a collection of electronic documents. Within the context of a cloud computing system, the system 100 may implement a cloud search service accessible to users via a web interface or web portal front-end server system. A cloud search service is a managed service that allows developers and businesses to add search capabilities to their applications or websites without the need to build and maintain their own search infrastructure. Cloud search services typically provide powerful search capabilities, such as faceted search, full-text search, and auto-complete suggestions, while also offering features like scalability, availability, and reliability. A cloud search service typically operates in a distributed manner, with indexing and search nodes located across multiple data centers for high availability and faster query responses. These services typically offer application program interfaces (APIs) that allow developers to easily integrate search functionality into their applications or websites. One major advantage of cloud search services is that they are designed to handle large-scale data sets and provide powerful search capabilities that can be difficult to achieve with traditional search engines. Cloud search services can also provide advanced features, such as machine learning-powered search, natural language processing, and personalized recommendations, which can help improve the user experience and make search more efficient. Some examples of popular cloud search services include Amazon CloudSearch, Elasticsearch, and Azure Search. These services are typically offered on a pay-as-you-go basis, allowing businesses to pay only for the resources they use, making them an affordable option for businesses of all sizes.

In general, the system 100 may allow users to generate, revise and electronically sign electronic documents. When implemented as a large-scale cloud computing service, the system 100 may allow entities and organizations to amass a significant number of electronic documents, including both signed electronic documents and unsigned electronic documents. As such, the system 100 may need to manage a large collection of electronic documents for different entities, a task that is sometimes referred to as contract lifecycle management (CLM).

As shown in FIG. 1, the system 100 may include a server device 102 communicatively coupled to a set of client devices 112 via a network 114. The server device 102 may also be communicatively coupled to a set of client devices 116 via a network 118. The client devices 112 may be associated with a set of clients 134. The client devices 116 may be associated with a set of clients 136. In one network topology, the server device 102 may represent any server device, such as a server blade in a server rack as part of a cloud computing architecture, while the client devices 112 and the client devices 116 may represent any client device, such as a smart wearable (e.g., a smart watch), a smart phone, a tablet computer, a laptop computer, a desktop computer, a mobile device, and so forth. The server device 102 may be coupled to a local or remote data store 126 to store document records 138. It may be appreciated that the system 100 may have more or less devices than shown in FIG. 1 with a different network topology as needed for a given implementation. Embodiments are not limited in this context.

Figure 22:
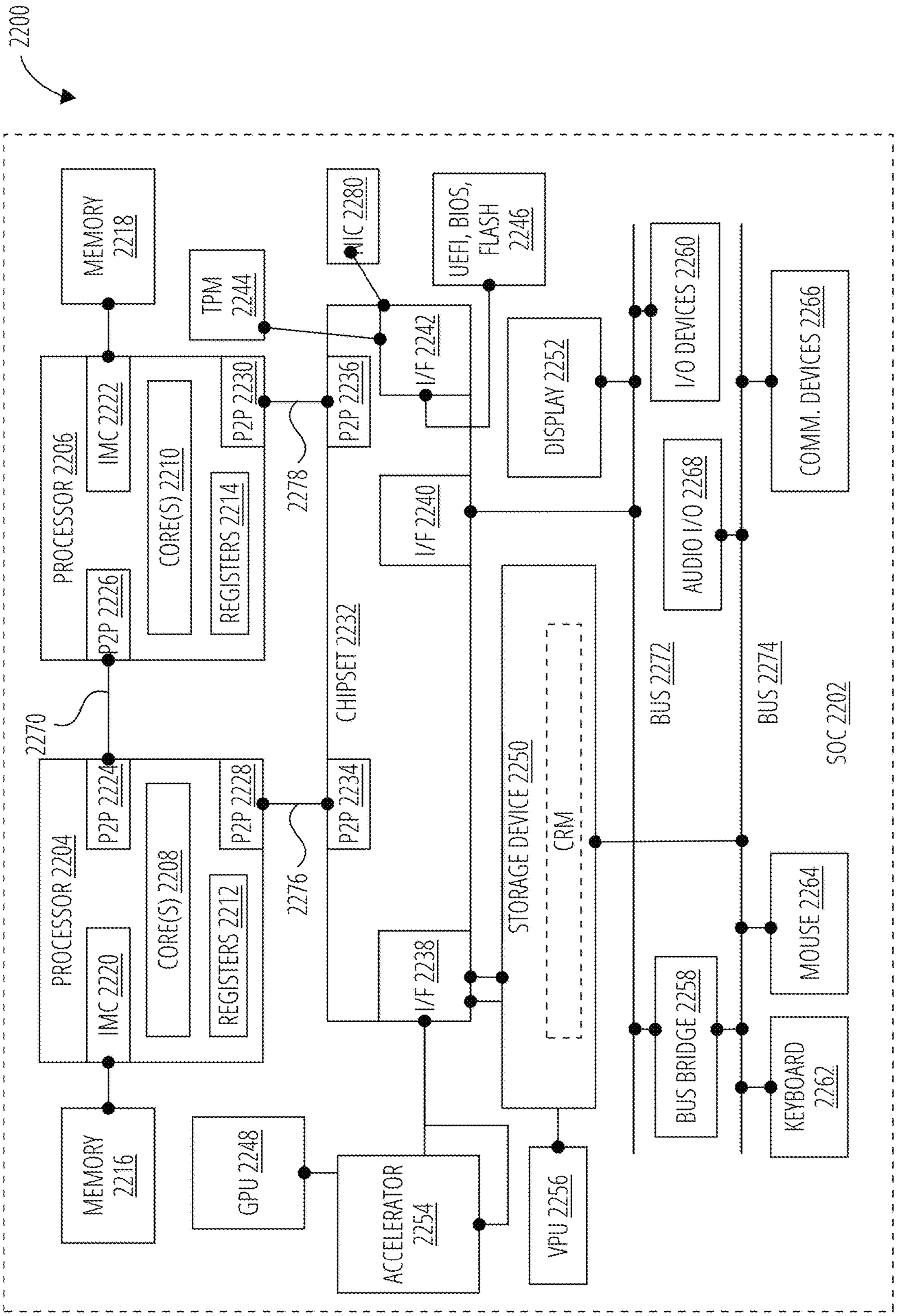
FIG. 22 illustrates a computing architecture in accordance with one embodiment.

In various embodiments, the server device 102 may include various hardware elements, such as a processing circuitry 104, a memory 106, a network interface 108, and a set of platform components 110. The client devices 112 and/or the client devices 116 may include similar hardware elements as those depicted for the server device 102. The server device 102, client devices 112, and client devices 116, and associated hardware elements, are described in more detail with reference to a computing architecture 2200 as depicted in FIG. 22.

Figure 23:
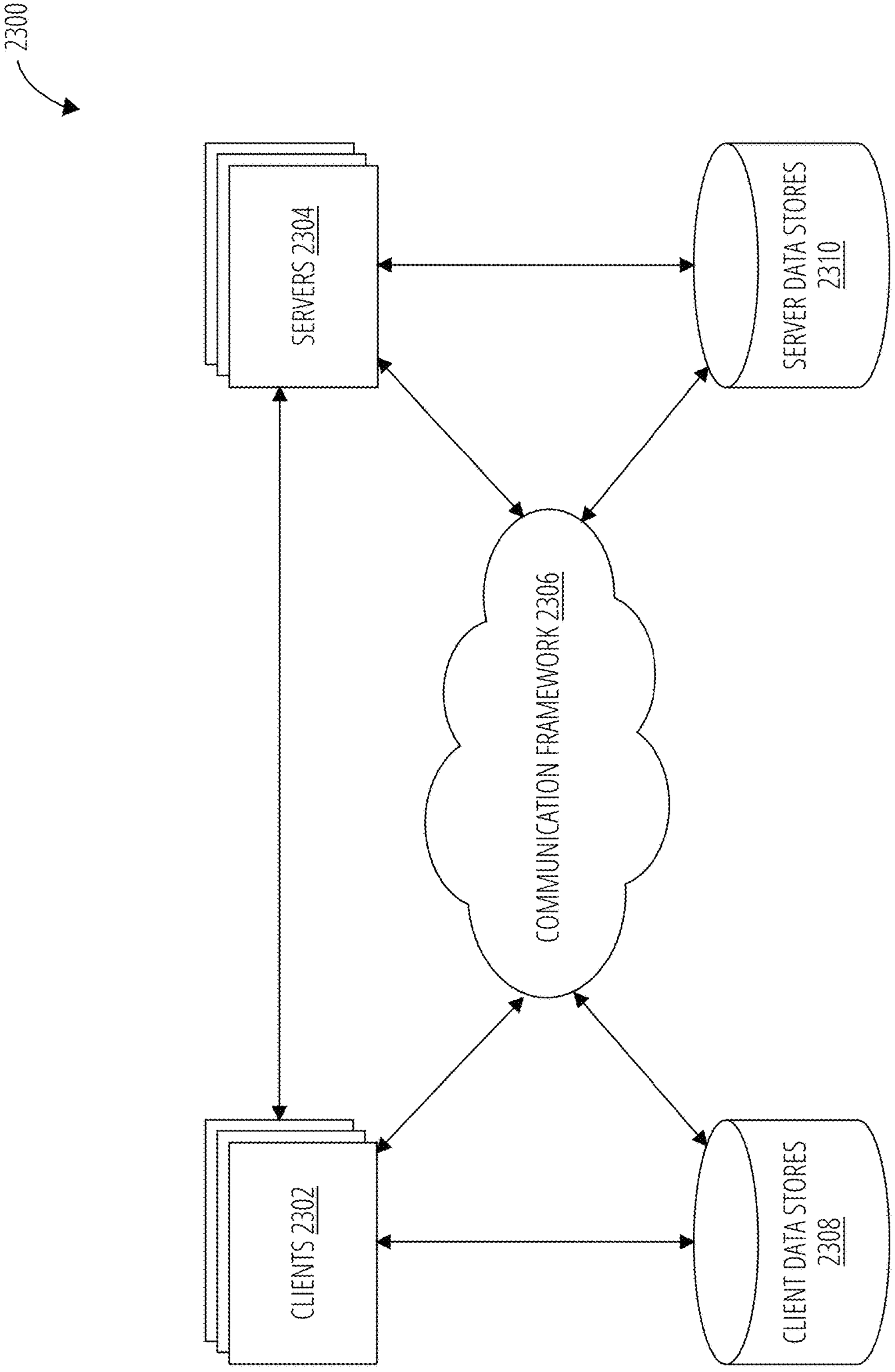
FIG. 23 illustrates a communications architecture in accordance with one embodiment.

In various embodiments, the server devices 102, 112 and/or 116 may communicate various types of electronic information, including control, data and/or content information, via one or both network 114, network 118. The network 114 and the network 118, and associated hardware elements, are described in more detail with reference to a communications architecture 2300 as depicted in FIG. 23.

The memory 106 may store a set of software components, such as computer executable instructions, that when executed by the processing circuitry 104, causes the processing circuitry 104 to implement various operations for an electronic document management platform. As depicted in FIG. 1, for example, the memory 106 may include a document manager 120, a signature manager 122, and a document structure and clause extraction engine 150, among other software elements.

The document manager 120 may generally manage a collection of electronic documents stored as document records 138 in the data store 126. The document manager 120 may receive as input a document container 128 for an electronic document. A document container 128 is a file format that allows multiple data types to be embedded into a single file, sometimes referred to as a "wrapper" or "metafile." The document container 128 can include, among other types of information, an electronic document 142 and metadata for the electronic document 142.

A document container 128 may include an electronic document 142. The electronic document 142 may comprise any electronic multimedia content intended to be used in an electronic form. The electronic document 142 may comprise an electronic file having any given file format. Examples of file formats may include, without limitation, Adobe portable document format (PDF), Microsoft Word, PowerPoint, Excel, text files (.txt, .rtf), and so forth. In one embodiment, for example, the electronic document 142 may comprise a PDF created from a Microsoft Word file with one or more workflows developed by Adobe Systems Incorporated, an American multi-national computer software company headquartered in San Jose, California. Embodiments are not limited to this example.

In addition to the electronic document 142, the document container 128 may also include metadata for the electronic document 142. In one embodiment, the metadata may comprise signature tag marker element (STME) information 132 for the electronic document 142. The STME information 130 may include one or more STME 132, which are graphical user interface (GUI) elements superimposed on the electronic document 142. The GUI elements may include textual elements, visual elements, auditory elements, tactile elements, and so forth. In some embodiments, for example, the STME information 130 and STME 132 may be implemented as text tags, such as DocuSign anchor text, Adobe® Acrobat Sign® text tags, and so forth. Text tags are specially formatted text that can be placed anywhere within the content of an electronic document specifying the location, size, type of fields such as signature and initial fields, checkboxes, radio buttons, and form fields; and advanced optional field processing rules. Text tags can also be used when creating PDFs with form fields. Text tags may be converted into signature form fields when the document is sent for signature or uploaded. Text tags can be placed in any document type such as PDF, Microsoft Word, PowerPoint, Excel, and text files (.txt, .rtf). Text tags offer a flexible mechanism for setting up document templates that allow positioning signature and initial fields, collecting data from multiple parties within an agreement, defining validation rules for the collected data, and adding qualifying conditions. Once a document is correctly set up with text tags it can be used as a template when sending documents for signatures ensuring that the data collected for agreements is consistent and valid throughout the organization.

In one embodiment, the STME 132 may be utilized for receiving signing information, such as GUI placeholders for approval, checkbox, date signed, signature, social security number, organizational title, and other custom tags in association with the GUI elements contained in the electronic document 142. A client 134 may have used the client device 112 and/or the server device 102 to position one or more signature tag markers over the electronic document 142 with tools applications, and workflows developed by DocuSign or Adobe. For instance, assume the electronic document 142 is a commercial lease associated with STME 132 designed for receiving signing information to memorialize an agreement between a landlord and tenant to lease a parcel of commercial property. In this example, the signing information may include a signature, title, date signed, and other GUI elements.

The document manager 120 may process a document container 128 to generate a document image 140. The document image 140 is a unified or standard file format for an electronic document used by a given EDMP implemented by the system 100. For instance, the system 100 may standardize use of a document image 140 having an Adobe portable document format (PDF), which is typically denoted by a ".pdf" file extension. If the electronic document 142 in the document container 128 is in a non-PDF format, such as a Microsoft Word ".doc" or ".docx" file format, the document manager 120 may convert or transform the file format for the electronic document into the PDF file format. Further, if the document container 128 includes an electronic document 142 stored in an electronic file having a PDF format suitable for rendering on a screen size typically associated with a larger form factor device, such as a monitor for a desktop computer, the document manager 120 may transform the electronic document 142 into a PDF format suitable for rendering on a screen size associated with a smaller form factor device, such as a touch screen for a smart phone. The document manager 120 may transform the electronic document 142 to ensure that it adheres to regulatory requirements for electronic signatures, such as a "what you see is what you sign" (WYSIWYS) property, for example.

The signature manager 122 may generally manage signing operations for an electronic document, such as the document image 140. The signature manager 122 may manage an electronic signature process to send the document image 140 to signers, obtaining electronic signatures, verifying electronic signatures, and recording and storing the electronically signed document image 140. For instance, the signature manager 122 may communicate a document image 140 over the network 118 to one or more client devices 116 for rendering the document image 140. A client 136 may electronically sign the document image 140 and send the signed document image 140 to the server device 102 for verification, recordation, and storage.

Figure 5:
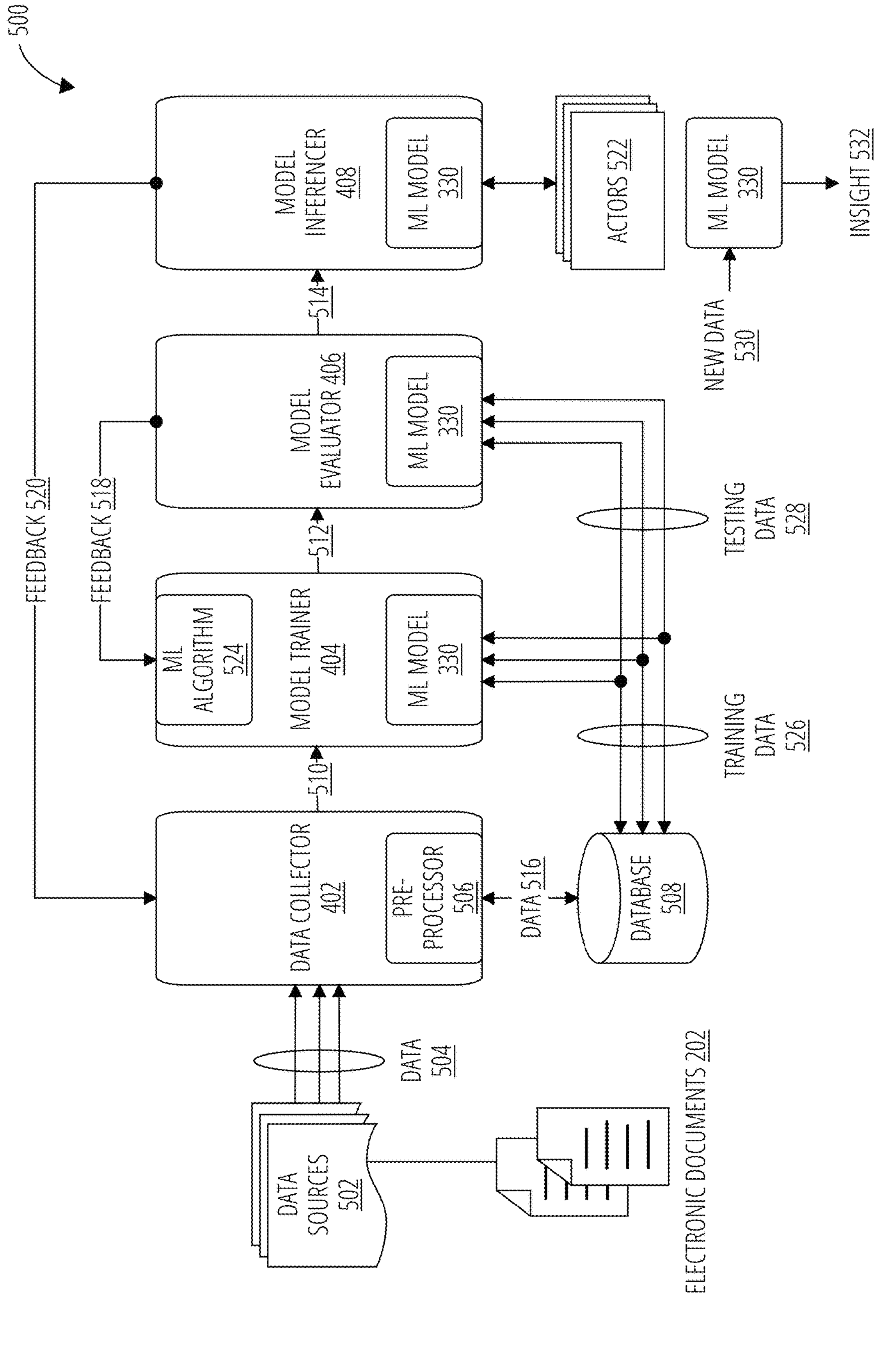
FIG. 5 illustrates an artificial intelligence architecture that may be used by the training device to generate the ML model (e.g., as shown in FIG. 2) for deployment by the inferencing device.

The document structure and clause extraction engine 150 may implement and/or manage various artificial intelligence (AI) and machine learning (ML) agents to assist in various operational tasks for the EDMP of the system 100. The AI/ML agents and their operation associated with the document structure and clause extraction engine 150, and associated software elements, are described in more detail with reference to an artificial intelligence architecture 500 as depicted in FIG. 5. The document structure and clause extraction engine 150, and associated hardware elements, are described in more detail with reference to a computing architecture 2200 as depicted in FIG. 22.

In general operation, assume the server device 102 receives a document container 128 from a client device 112 over the network 114. The server device 102 processes the document container 128 and makes any necessary modifications or transforms as previously described to generate the document image 140. The document image 140 may have a file format of an Adobe PDF denoted by a ".pdf" file extension. The server device 102 sends the document image 140 to a client device 116 over the network 118. The client device 116 renders the document image 140 with the STME 132 in preparation for electronic signing operations to sign the document image 140.

Figure 7:
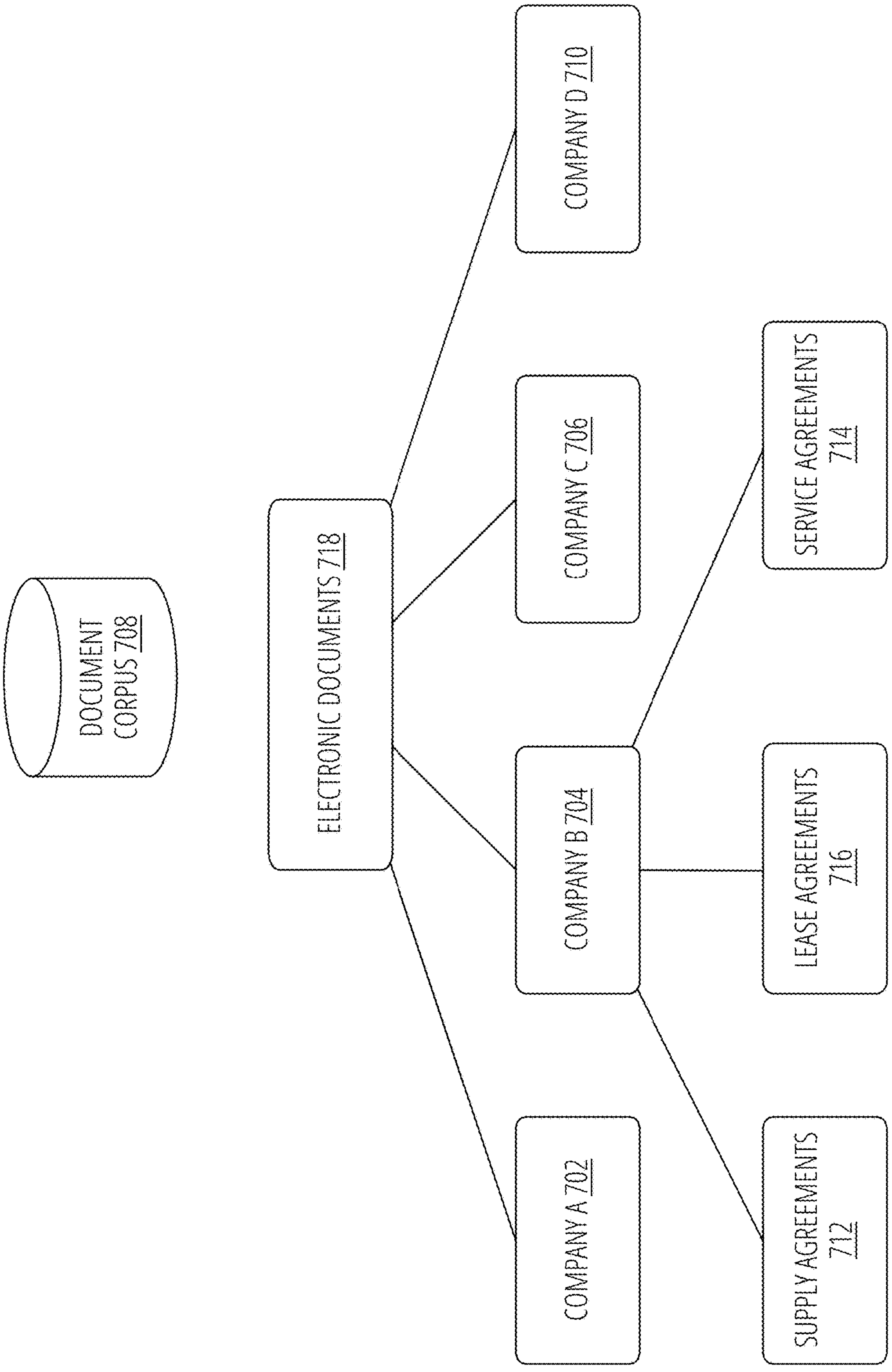
FIG. 7 illustrates a document corpus in accordance with one embodiment.

The document image 140 may further be associated with STME information 130 including one or more STME 132 that were positioned over the document image 140 by the client device 112 and/or the server device 102. The STME 132 may be utilized for receiving signing information (e.g., approval, checkbox, date signed, signature, social security number, organizational title, etc.) in association with the GUI elements contained in the document image 140. For instance, a client 134 may use the client device 112 and/or the server device 102 to position the STME 132 over the electronic documents 718, as shown in FIG. 7, with tools, applications, and workflows developed by DocuSign. For example, the electronic documents 718 may be a commercial lease that is associated with one or more or more STME 132 for receiving signing information to memorialize an agreement between a landlord and tenant to lease a parcel of commercial property. For example, the signing information may include a signature, title, date signed, and other GUI elements.

Broadly, a technological process for signing electronic documents may operate as follows. A client 134 may use a client device 112 to upload the document container 128, over the network 114, to the server device 102. The document manager 120, at the server device 102, receives and processes the document container 128. The document manager 120 may confirm or transform the electronic document 142 as a document image 140 that is rendered at a client device 116 to display the original PDF image including multiple and varied visual elements. The document manager 120 may generate the visual elements based on separate and distinct input including the STME information 130 and the STME 132 contained in the document container 128. In one embodiment, the PDF input in the form of the electronic document 142 may be received from and generated by one or more workflows developed by Adobe Systems Incorporated. The STME 132 input may be received from and generated by workflows developed by DocuSign. Accordingly, the PDF and the STME 132 are separate and distinct input as they are generated by different workflows provided by different providers.

The document manager 120 may generate the document image 140 for rendering visual elements in the form of text images, table images, STME images and other types of visual elements. The original PDF image information may be generated from the document container 128 including original documents elements included in the electronic document 142 of the document container 128 and the STME information 130 including the STME 132. Other visual elements for rendering images may include an illustration image, a graphic image, a header image, a footer image, a photograph image, and so forth.

The signature manager 122 may communicate the document image 140 over the network 118 to one or more client devices 116 for rendering the document image 140. The client devices 116 may be associated with clients 136, some of which may be signatories or signers targeted for electronically signing the document image 140 from the client 134 of the client device 112. The client device 112 may have utilized various work flows to identify the signers and associated network addresses (e.g., email address, short message service, multimedia message service, chat message, social message, etc.). For example, the client 134 may utilize workflows to identify multiple parties to the lease including bankers, landlord, and tenant. Further, the client 134 may utilize workflows to identify network addresses (e.g., email address) for each of the signers. The signature manager 122 may further be configured by the client 134 whether to communicate the document image 140 in series or parallel. For example, the signature manager 122 may utilize a workflow to configure communication of the document image 140 in series to obtain the signature of the first party before communicating the document image 140, including the signature of the first party, to a second party to obtain the signature of the second party before communicating the document image 140, including the signature of the first and second party to a third party, and so forth. Further for example, the client 134 may utilize workflows to configure communication of the document image 140 in parallel to multiple parties including the first party, second party, third party, and so forth, to obtain the signatures of each of the parties irrespective of any temporal order of their signatures.

The signature manager 122 may communicate the document image 140 to the one or more parties associated with the client devices 116 in a page format. Communicating in page format, by the signature manager 122, ensures that entire pages of the document image 140 are rendered on the client devices 116 throughout the signing process. The page format is utilized by the signature manager 122 to address potential legal requirements for binding a signer. The signature manager 122 utilizes the page format because a signer is only bound to a legal document that the signer is intended to be bound. To satisfy the legal requirement of intent, the signature manager 122 generates PDF image information for rendering the document image 140 to the one or more parties with a "what you see is what you sign" (WYSIWYS) property. The WYSIWYS property ensures the semantic interpretation of a digitally signed message is not changed, either by accident or by intent. If the WYSIWYS property is ignored, a digital signature may not be enforceable at law. The WYSIWYS property recognizes that, unlike a paper document, a digital document is not bound by its medium of presentation (e.g., layout, font, font size, etc.) and a medium of presentation may change the semantic interpretation of its content. Accordingly, the signature manager 122 anticipates a possible requirement to show intent in a legal proceeding by generating original PDF image information for rendering the document image 140 in page format. The signature manager 122 presents the document image 140 on a screen of a display device in the same way the signature manager 122 prints the document image 140 on the paper of a printing device.

As previously described, the document manager 120 may process a document container 128 to generate a document image 140 in a standard file format used by the system 100, such as an Adobe PDF, for example. Additionally, or alternatively, the document manager 120 may also implement processes and workflows to prepare an electronic document 142 stored in the document container 128. For instance, assume a client 134 uses the client device 112 to prepare an electronic document 142 suitable for receiving an electronic signature, such as the lease agreement in the previous example. The client 134 may use the client device 112 to locally or remotely access document management tools, features, processes and workflows provided by the document manager 120 of the server device 102. The client 134 may prepare the electronic document 142 as a brand new originally written document, a modification of a previous electronic document, or from a document template with predefined information content. Once prepared, the signature manager 122 may implement electronic signature (e-sign) tools, features, processes and workflows provided by the signature manager 122 of the server device 102 to facilitate electronic signing of the electronic document 142.

Figure 13:
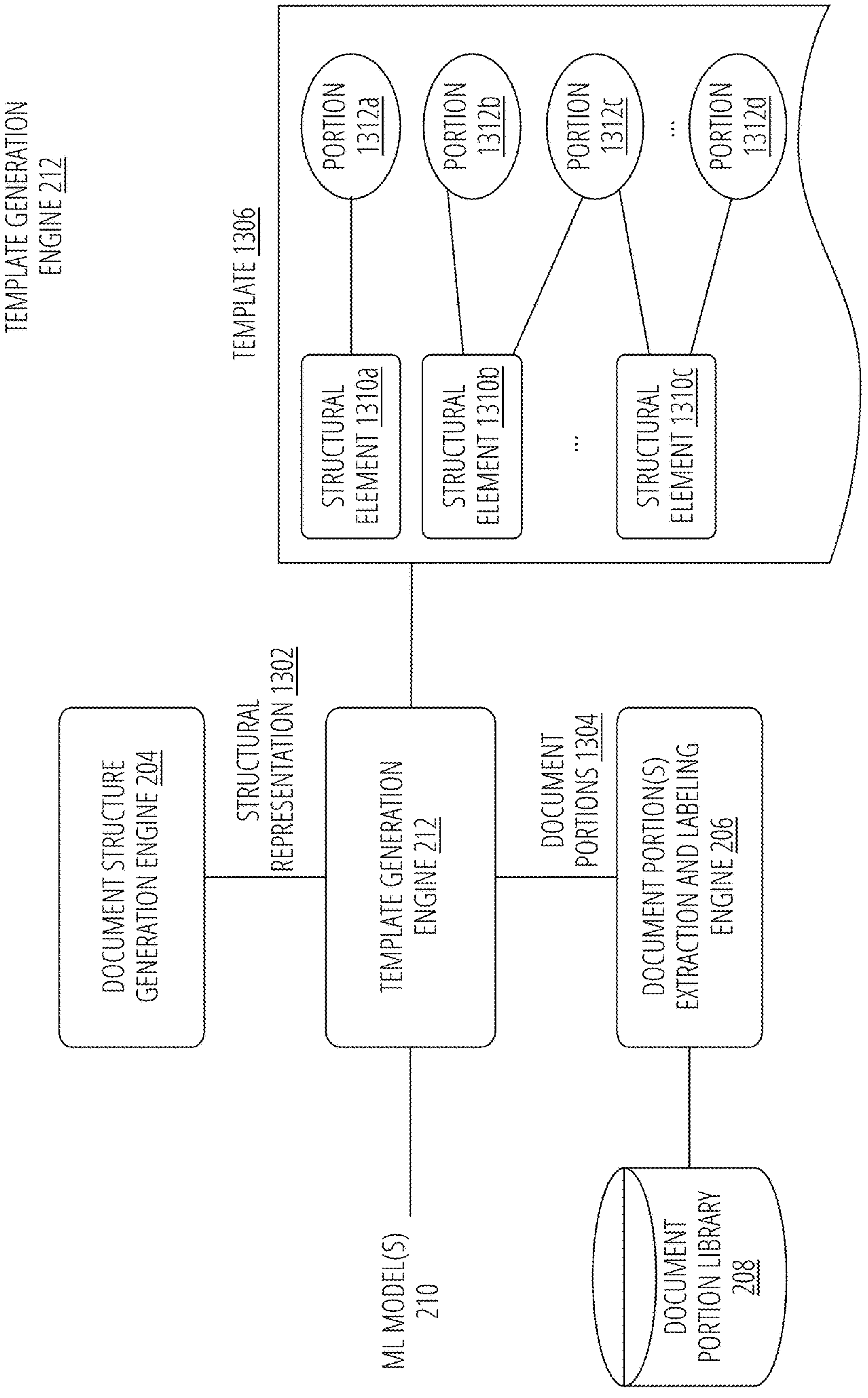
FIG. 13 illustrates operation of an example of the template generation engine, according to some embodiments of the current subject matter.

In addition, as discussed above, the system 100 may include a document structure and clause extraction engine 150. The document structure and clause extraction engine 150 may implement a set of tools and/or algorithms to generate one or more templates for a particular type of electronic document, where templates may be associated and/or linked with various document portions, some of which may be common to a particular type of electronic documents. In particular, the engine 150 may be configured to identify a type of an electronic document and generate, using a machine learning model, one or more templates defining a structural arrangement of one or more portions of the electronic document for each type of electronic document (as for example, is shown in FIG. 13). Each portion of the document may be associated with a template, and in particular, a specific structural element of the template. The generated template may be presented on a graphical user interface of a user computing device. Moreover, the template and any of its associated portions may be stored in a storage location. In some embodiments, to generate templates, the engine 150 may be configured to send the plurality of electronic documents to a generative artificial intelligence (AI) model, a machine learning model, and/or any other type of model to determine a structure and one or more portions of each electronic document in the plurality of electronic documents. The structure/portions may be used to generate one or more templates.

In some embodiments, the engine 150 may be used to generate one or more documents using one or more of the templates. The engine 150 may receive a request to generate an electronic document of a first type (e.g., a lease agreement). It may then retrieve a first template (e.g., a lease agreement template) and a first portion (e.g., a termination clause, a governing law clause, etc.) associated with the first template, where at least one of the first template and the first portion(s) may be associated with the first type of electronic document. The portion(s) may be stored as object model(s), where the object model(s) may include one or more labels labeling and/or identifying the portion(s). Using the first template and/or the first portion(s), the engine 150 may then generate the electronic document. The engine 150 may insert, using the first template, the first portion at a first location within the electronic document of the first type. In some example, non-limiting embodiments, the type of the electronic document includes at least one of the following: an agreement type, a legal document type, a non-legal document type, and any combinations thereof.

In some embodiments, the document structure and clause extraction engine 150 may also be configured to dynamically generate and/or update templates. The templates may include specific structural arrangement of structural elements and associated document portions (as discussed herein). The engine 150 may be configured to generate (and/or additionally, or alternatively, retrieve) a template using a plurality of electronic documents. The template may define a structural arrangement of one or more document portions that may be extracted from the electronic documents. The template may also include document portions associated with one or more structural elements in the structural arrangement. The document structure and clause extraction engine 150 may select and/or use a machine learning model to determines the structural arrangement for the template. The engine 150 may select the model based on a type of electronic document for which template is to be generated (e.g., a lease agreement, a master services agreement, etc.). One or more models may be selected by the engine 150 to generate the template.

The engine 150 may then use the ML model to generate another template. The engine 150 may generate this template using the initial template as well as any changes and/or updates that may have been received. For example, the engine 150 may generate this second template to include an update to at least one document portion that may have been present in the initial template, an update to the structural arrangement of the initial template, etc. The updated/new template may define another structural arrangement of the document portions that may be determined based on the initial template's structural arrangement and any updates. Once the updated/new template is generated, it may be presented on a graphical user interface of at least one computing device. Moreover, the document structure and clause extraction engine 150 may store an object model that may be representative of at least one of: the initial template, the updated/new template, and/or any differences between the templates (e.g., updates to document portions, structural representations, etc.).

As stated above, in some embodiments, the document structure and clause extraction engine 150 may implement a generative AI model platform locally on the server device 102. Alternatively, or in addition, the document structure and clause extraction engine 150 may access a generative AI model remotely on another server device. In the latter scenario, the document structure and clause extraction engine 150 may send a natural language generation (NLG) request (e.g., "analyze a sales contract and determine its structure") and/or any other type of request to the generative AI model implemented on another device over a network. In the former scenario, the generative AI model may include a machine learning model that implements a large language model (LLM) to support natural language processing (NLP) operations, such as natural language understanding (NLU), natural language generation (NLG), and other NLP operations. The response, as generated by the generative AI model platform, to the task may be presented in a natural language representation of a human language, such as, for example, English, French, Spanish, Korean, and so forth. The document structure and clause extraction engine 150 may receive an NLG response from the generative AI model implemented by the other server device. The document structure and clause extraction engine 150 may then present the instructions to the user via a graphical user interface (GUI) on a user's computing device.

Figure 2:
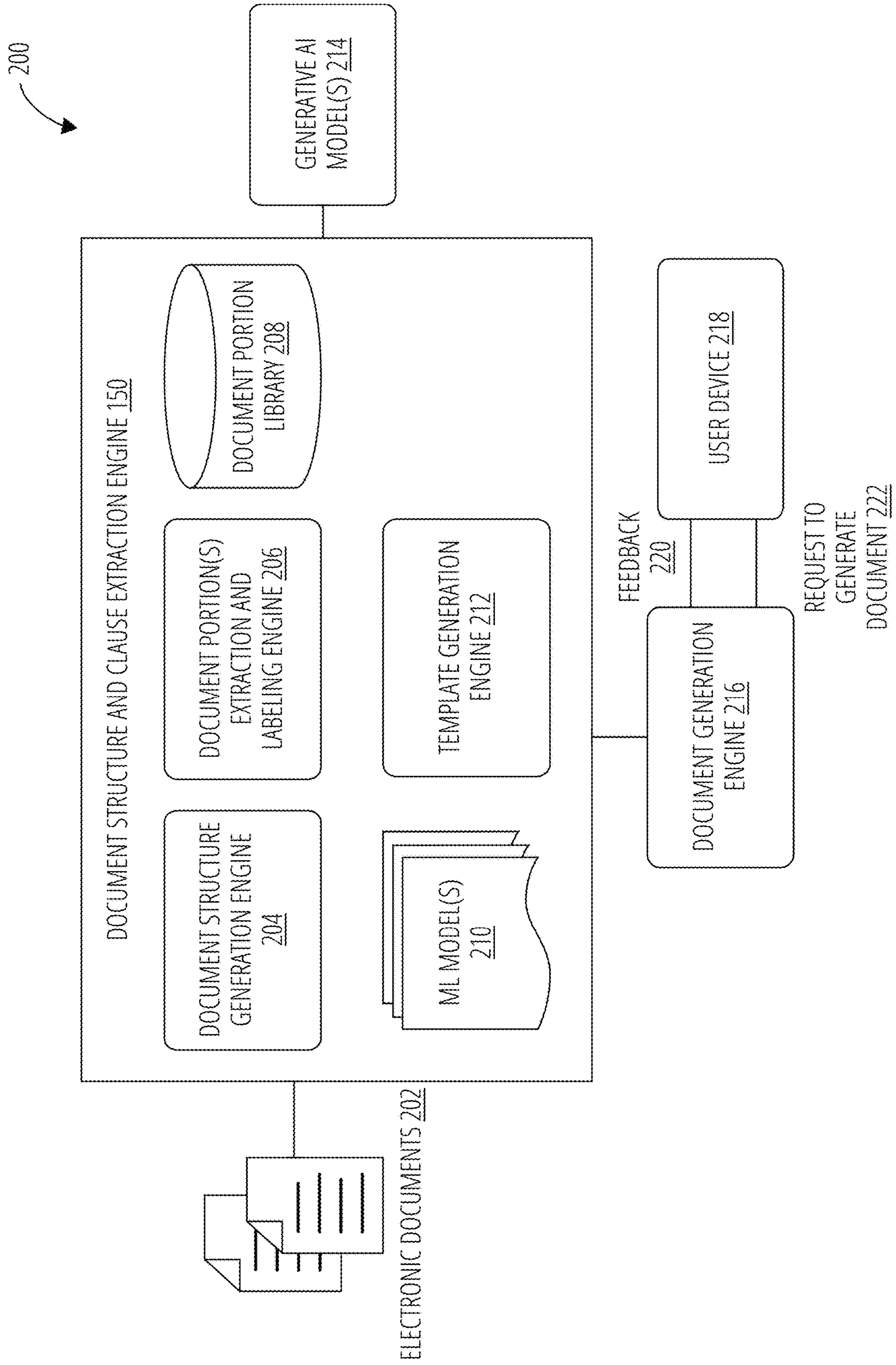
FIG. 2 illustrates an example system showing operation of the document structure and clause extraction engine, according to some embodiments of the current subject matter.

FIG. 2 illustrates an example system 200 showing operation of the document structure and clause extraction engine 150, according to some embodiments of the current subject matter. The document structure and clause extraction engine 150 may include a document structure generation engine 204, a document portion(s) extraction and labeling engine 206, and a template generation engine 212. The document structure and clause extraction engine 150 may also be communicatively coupled to one or more user devices 218 and a document generation engine 216. The engine 150 may also be communicatively coupled to the generative AI model(s) platforms 214. In some embodiments, one or more electronic documents 202 may be received by the engine 150 for analysis and determination of its structure and portions, using which one or more document templates may be generated (e.g., a lease agreement template including associated clauses).

One or more components of the system 200 shown in FIG. 2 may be communicatively coupled using one or more communications networks. The communications networks may include one or more of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and/or any combination thereof.

Further, one or more components of the system 200 may include any combination of hardware and/or software. In some embodiments, one or more components of the system may be disposed on one or more computing devices, such as, server(s), database(s), personal computer(s), laptop(s), cellular telephone(s), smartphone(s), tablet computer(s), virtual reality devices, and/or any other computing devices and/or any combination thereof. In some example embodiments, one or more components of the system may be disposed on a single computing device and/or may be part of a single communications network. Alternatively, or in addition to, such devices may be separately located from one another. A device may be a computing processor, a memory, a software functionality, a routine, a procedure, a call, and/or any combination thereof that may be configured to execute a particular function associated with interface and/or document certification processes disclosed herein.

In some embodiments, one or more components of the system 200 may include network-enabled computers. As referred to herein, a network-enabled computer may include, but is not limited to a computer device, or communications device including, e.g., a server, a network appliance, a personal computer, a workstation, a phone, a smartphone, a handheld PC, a personal digital assistant, a thin client, a fat client, an Internet browser, or other device. One or more components of the system also may be mobile computing devices, for example, an iPhone, iPod, iPad from Apple® and/or any other suitable device running Apple's iOS® operating system, any device running Microsoft's Windows®. Mobile operating system, any device running Google's Android® operating system, and/or any other suitable mobile computing device, such as a smartphone, a tablet, or like wearable mobile device.

One or more components of the system 200 may include a processor and a memory, and it is understood that the processing circuitry may contain additional components, including processors, memories, error and parity/CRC checkers, data encoders, anti-collision algorithms, controllers, command decoders, security primitives and tamper-proofing hardware, as necessary to perform the interface and/or document certification functions described herein. One or more components of the system may further include one or more displays and/or one or more input devices. The displays may be any type of devices for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein.

In some example embodiments, one or more components of the system 200 may execute one or more applications, such as software applications, that enable, for example, network communications with one or more components of system and transmit and/or receive data.

One or more components of the system 200 may include and/or be in communication with one or more servers via one or more networks and may operate as a respective front-end to back-end pair with one or more servers. One or more components of the system may transmit, for example from a mobile device application (e.g., executing on one or more user devices, components, etc.), one or more requests to one or more servers. The requests may be associated with retrieving data from servers (e.g., retrieving one or more electronic documents from one or more document storage sources that may store electronic documents 202). The servers may receive the requests from the components of the system. Based on the requests, servers may be configured to retrieve the requested data from one or more storage locations. Based on receipt of the requested data from the databases, the servers may be configured to transmit the received data to one or more components of the system, where the received data may be responsive to one or more requests.

The system 200 may include one or more networks, such as, for example, networks that may be communicatively coupling the engine 150, the document storage source (e.g., storing electronic documents 202), the generative AI model(s) 214, and/or any other computing components. In some embodiments, networks may be one or more of a wireless network, a wired network or any combination of wireless network and wired network and may be configured to connect the components of the system and/or the components of the system to one or more servers. For example, the networks may include one or more of a fiber optics network, a passive optical network, a cable network, an Internet network, a satellite network, a wireless local area network (LAN), a metropolitan area network (MAN), a wide area network (WAN), a virtual local area network (VLAN), an extranet, an intranet, a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or any other type of network and/or any combination thereof.

In addition, the networks may include, without limitation, telephone lines, fiber optics, IEEE Ethernet 802.3, a wide area network, a wireless personal area network, a LAN, or a global network such as the Internet. Further, the networks may support an Internet network, a wireless communication network, a cellular network, or the like, or any combination thereof. The networks may further include one network, or any number of the exemplary types of networks mentioned above, operating as a stand-alone network or in cooperation with each other. The networks may utilize one or more protocols of one or more network elements to which they are communicatively coupled. The networks may translate to or from other protocols to one or more protocols of network devices. The networks may include a plurality of interconnected networks, such as, for example, the Internet, a service provider's network, a cable television network, corporate networks, such as credit card association networks, and home networks.

The system 200 may include one or more servers, which may include one or more processors that may be coupled to memory. Servers may be configured as a central system, server or platform to control and call various data at different times to execute a plurality of workflow actions. Servers may be configured to connect to the one or more databases. Servers may be incorporated into and/or communicatively coupled to at least one of the components of the system.

Further, one or more components of the system 200 may be configured to execute one or more actions using one or more containers. In some embodiments, each action may be executed using its own container. A container may refer to a standard unit of software that may be configured to include the code that may be needed to execute the action along with all its dependencies. This may allow execution of actions to run quickly and reliably.

In some embodiments, the electronic documents 202 may be stored in various data storages. For example, some data storages may be configured to be one or more private databases, access to which might not be publicly available (e.g., internal company databases, specific user access databases, etc.). The electronic documents 202 stored in these databases may be organized in a predetermined fashion, which may allow ease of access to the electronic documents and/or any portions thereof. For example, electronic documents 202 stored in these databases may be labeled, searchable, and/or otherwise, easily identifiable. The documents may be stored in a particular electronic format (e.g., PDF, .docx, etc.).

Other data storage sources may be configured to be public non-government databases, government databases (e.g., SEC-EDGAR, etc.), etc. and may store various electronic documents, such as, for example, legal documents (e.g., commercial contracts, lease agreements, public disclosures (e.g., 10 k statements, 5 k statements, quarterly reports, etc.)), non-legal documents (e.g., articles, books, etc.). The electronic documents 202 stored in these databases may be identified using various identifiers, which may allow location of these documents in the databases, however, contents of electronic documents stored therein might not be parsed and/or specifically identified. For example, a review of the entire electronic document (e.g., 10 k statement of a company stored in SEC-EDGAR database) may need to be performed to identify a particular section (e.g., a section related to compensation of executives for the company).

In operation, one or more electronic documents 202 may be supplied to the document structure and clause extraction engine 150. As stated above, the documents may be any type of documents, such as, for example, agreements, applications, websites, video files, audio files, text files, images, graphics, tables, spreadsheets, computer programs, etc. The documents may be in any desired format, e.g., .pdf, .docx, .xls, and/or any other type of format. The documents may also have any desired size. Moreover, the documents may be organized in any desired fashion. In some examples, documents may be nested within other documents (e.g., one document embedded in another document); one document may be linked to another document, etc.

In some embodiments, electronic documents 202 may include one or more elements. Examples of such elements may include pages, headings, sub-headings, sections, paragraphs, sentences, tables, images, and/or any other type of elements. One or more elements may also be associated and/or assigned one or more functions (e.g., a document title, a text heading, a text paragraph, etc.). The documents 202 may be structured in a particular way (e.g., a lease agreement may include a section identifying parties, a section identifying leased premises, a section describing rent being paid, etc.).

Figure 10:
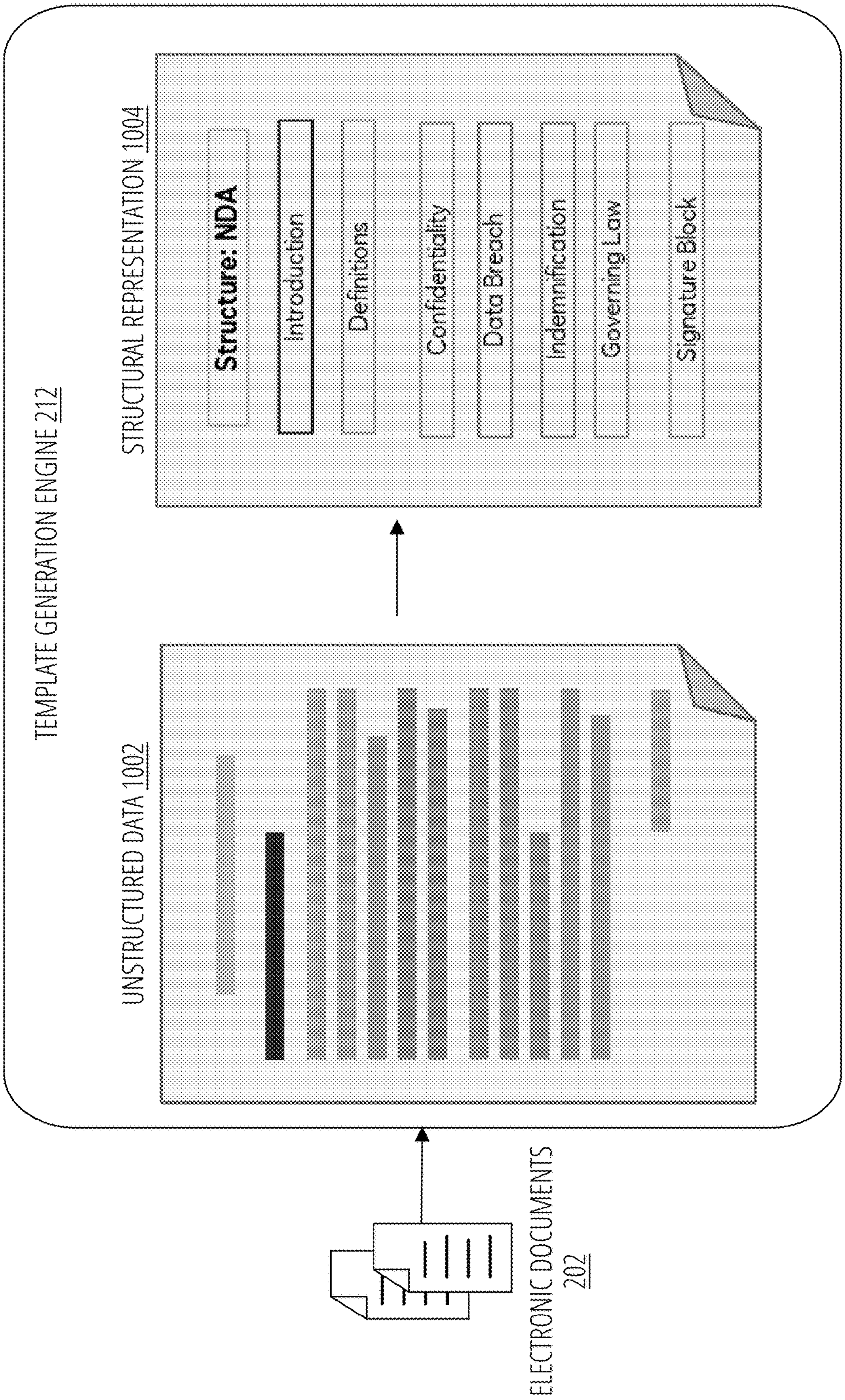
FIG. 10 illustrates an example of such structural representation of an electronic document, according to some embodiments of the current subject matter.

Upon receiving an electronic document, the document structure generation engine 204 of the engine 150 may be configured to generate one or more structural representations of the electronic document, such as, a structural representation or template(s) 1004 that is shown in FIG. 10. The structural representation may be arranged in a desired fashion (e.g., a listing of structural elements of the document (e.g., as shown in FIG. 10), a tree-like arrangement of elements of the document, and/or in any other desired fashion). In some embodiments, the document structure generation engine 204 may be configured to generate the structural representation of the electronic document by arranging of the elements based on relationships between elements of the electronic document 202.

In some embodiments, the engine 204 may be configured to provide the electronic document 202 to the generative AI model(s) 214 and request it to generate a structural representation of the document. The generative AI model(s) 214 may be provided with instructions describing what the electronic document is (e.g., a lease agreement, a sales agreement, etc.) and requested to generate its structure. Alternatively, or in addition, the generative AI model(s) 214 may analyze the electronic document 202 and recognize various its sections, elements, etc. Moreover, instead of generative AI model(s) 214, one or more machine learning models (e.g., ML model(s) 210) may be used for analysis of the document to determine its structure.

For example, (as shown in FIG. 10), the structural representation may include a root heading (e.g., "Introduction"), which may, in an agreement (e.g., NDA) may be a listing of parties, one or more sub-headings under the root heading that may correspond to sections of the document (e.g., "Definitions", "Confidentiality", etc.), further sub-sub-subheadings under the sub-headings corresponding to paragraphs, sub-sections, etc. As can be understood, the structural representation may have any desired form, such as for, example, but not limited to, a node-like structure, a linked list, and/or any other type of structure (e.g., simple graphs, directed graphs, undirected graphs, weighted graphs, adjacency matrices, adjacency lists, adjacency sets, etc.).

The engine 204 may also group portions of documents into one or more groups based on various factors, functions, etc. For example, in a sales agreement, portions (e.g., provisions, sections, paragraphs, sentences, etc.) related to termination of the agreement (which may be located in different section of the agreement) may be grouped together in the structural representation of the document. Document portions related to pricing terms may also be grouped under the same document portion in the structural representation. In some embodiments, document portions may be grouped based on a position of each document portion in the electronic document, a type of each document portion in the electronic document, etc. and/or any combinations thereof.

The document portion(s) extraction and labeling engine 206 may be configured to extract and label various portions of document(s) from the electronic document(s). For example, the engine 206 may provide instructions to the generative AI model(s) 214 asking it to analyze electronic document (which may be sent to the generative AI model(s) 214) and extract specific portions for labeling. For example, when analyzing lease agreements, the engine 206 may be configured to instruct generative AI model(s) 214 to retrieve specific clauses related to lease terms, termination, governing law, lessee's and lessor's liabilities, etc. The engine 206 may also be configured to instruct generative AI model(s) 214 to identify clauses in different lease agreements that may be similar to one another. A semantic similarity analysis may be used to identify similar clauses in such agreements. In some embodiments, similarity of clauses may be defined by one or more thresholds, where threshold may be defined by a predetermined number of words that may be similar to one another. For example, a lease termination clause of "A term of this lease agreement is one year." and a lease termination clause of "This lease agreement shall be for one year" may be considered to be semantically similar. One or both clauses or a combination of the clauses may be set as a standard lease termination clause that may be applicable to all lease agreements and/or all lease agreements of a particular type (e.g., residential lease agreements).

Upon extracting specific document portions from the electronic documents or receiving extracted portions from the generative AI model(s) 214, the document portion(s) extraction and labeling engine 206 may be configured to label each extracted portion with an identifier. For example, a lease termination clause in lease agreements may be labeled using a label "lease termination"; a governing law clause in lease agreements may be labeled using a label "lease governing law." As can be understood, any labels, identifiers, etc. may be used to identify extracted document portions. The extracted and labeled document portions may be stored in the document portion library 208.

The generative AI model(s) 214 may be part of the engine 150 and/or be one or more third party models (e.g., ChatGPT, Bard, DALL-E, Midjourney, DeepMind, etc.) and may be accessed by the document structure and clause extraction engine 150. The generative AI model(s) 214 may use the provided information to generate a response.

Figure 12:
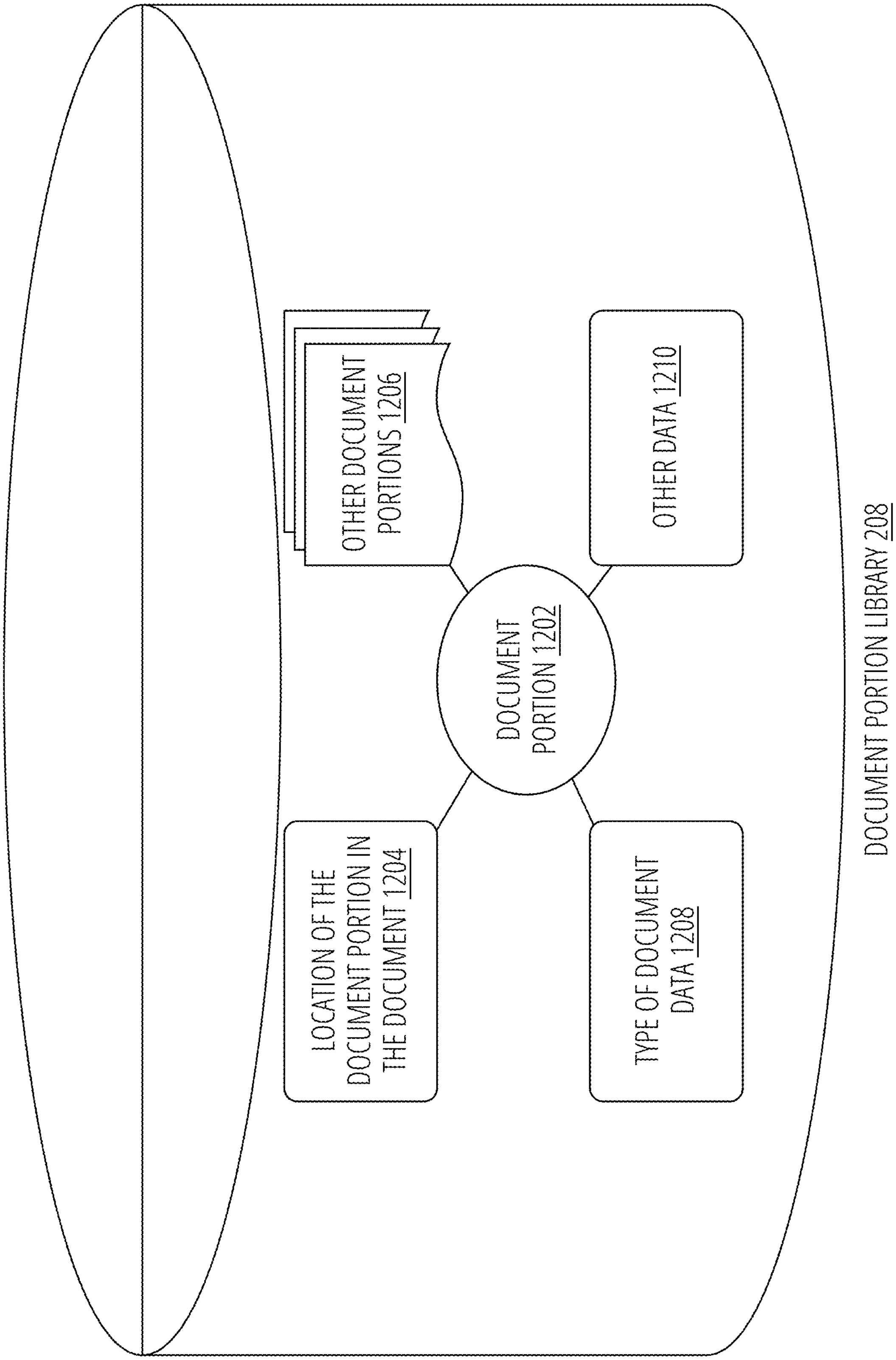
FIG. 12 illustrates an example document portion library, according to some embodiments of the current subject matter.

In some embodiments, the document portion library 208 may store such document portions as object models. An example of an object model is illustrated in FIG. 12. The object models may include various information about the portion of the electronic document. For example, in the lease agreement, the object model may be associated with a lease termination clause and may include metadata, identifiers, etc. that may indicate location of the lease termination clause (e.g., page 2 of the lease agreement, clause no. 5). The object model may also indicate other clauses that may be located prior to and/or after the lease termination clause, e.g., a governing law clause may precede the lease termination clause and a security deposit clause may follow the lease termination clause.

Additionally, the model may indicate that other clauses may be associated with and/or be relevant to the lease termination clause, e.g., a term extension clause may be related to and/or associated with the termination clause; a notice clause may also be related to and/or associated with the lease termination clause, etc. The related and/or associated clauses may be determined based on a search of the clauses' texts and determining that common terms may be present in both, thereby making them related and, thus, related/associated in the object model. Further, the model may indicate a type of document where lease termination clause may be found (e.g., a lease agreement). In some embodiments, the model may include data that may indicate that the lease termination clause may be associated with and/or related to termination clauses in other types of agreements (e.g., master services agreements, licenses, non-disclosure agreements, etc.). Such clauses may again be determined based on a search of electronic documents to identify clauses that may include semantically similar language.

Moreover, the object model may store information related to any other data. For example, in the lease agreement, such data may include information about parties to the lease agreement, location of leased premises, and/or any other information. This data may be used when other lease agreements are requested to be generated. For example, upon receiving a request to generate a lease agreement, the document structure and clause extraction engine 150, in addition to retrieving information about the structure of the lease agreement and any associated clauses, may also use information about the parties, premises, etc. to incorporate this information into any agreement that may be generated.

Once the document structure generation engine 204 generates structural representation of an electronic document (e.g., for a particular type of electronic document), it may send the generated structural representation to the template generation engine 212 for further processing. The template generation engine 212 may include one or more application programming interfaces (APIs) that may be configured to receive the generated structural representation of the document and determine further processing operations (as discussed herein).

In some embodiments, upon receiving the structural representation of the electronic document, the template generation engine 212 may further collect the specific portions of the electronic document that may be needed for generation of one or more templates for a particular type of document. For example, for a template of an agreement of a lease agreement type, the template generation engine 212 may be configured use the structural representation of a lease agreement generated by document structure generation engine 204 (e.g., in the form of structural representation 1004 as shown in FIG. 10) and associate and/or link one or more clauses from stored in document portion library 208 and determined by document portion(s) extraction and labeling engine 206. Once this information has been gathered, the template generation engine 212 may use one or more ML model(s) 210 to generate a template for an agreement of a lease agreement type.

The template generation engine 212 may be configured to use information stored in the object model(s) associated with each document clause to associate or link specific structural portions of the electronic document with the document portions stored in document portion library 208. For example, in a lease agreement, a structural element identified as a termination may be associated with a termination clause stored in the document portion library 208; a structural element identified as governing law may be associated with a governing law clause stored in the document portion library 208. The template generation engine 212 may be configured to select one or more ML model(s) 210 that may be specific to a particular type of document and then use such models to determine how a particular type of document (e.g., lease agreement) needs to be structured and where and how each portion (stored in document portion library 208) may need to be associated or linked.

The template and associated document portions, once assembled by the template generation engine 212, may be stored by the document structure and clause extraction engine 150 in one or more storage locations, e.g., document portion library 208. Moreover, the document structure and clause extraction engine 150 may be configured to present the template and associated document portions on the graphical user interface of the user device 218. The template/associated document portions may be presented in any desired form (e.g., as a text file, as an audio file, as an image, as a graphic, as a video file, etc.). The document structure and clause extraction engine 150 may present the template/associated document portions in response to a request to generate a document that may be received from the user device 218. Alternatively, or in addition, the template/associated document portions may be presented without receiving a request from the user device 218.

In some embodiments, the user may use the user device 218 to provide feedback 220 to the document structure and clause extraction engine 150. The feedback 220 may also be in response to a document generated by the document generation engine 216 using one or more templates/associated portions generated by document structure and clause extraction engine 150. The feedback 220 may be any type of feedback, such as, for example, a yes/no vote (e.g., thumbs up, thumbs down, etc.) that may be indicative of the user's acceptance of and/or satisfaction with template/associated portions. The feedback 220 may be textual feedback that may include specific comments that may be written and sent to the document structure and clause extraction engine 150 by the user using the user device 218. As can be understood, any other type of feedback may be provided.

The document structure and clause extraction engine 150 may receive the user's feedback 220 (whether positive or negative or neutral) and use it for various purposes. For example, the document structure and clause extraction engine 150 may update the structural representation of the electronic document and generate an updated structural representation of the document (e.g., rearranging some structural elements (e.g., clauses' order in an agreement), create new structural elements, revise structural representation, etc.). The document structure and clause extraction engine 150 may also identify other ML model(s) 210 for the purposes of generation of further and/or different templates and/or associating/linking them to other document portions stored in document portion library 208. Further, the document structure and clause extraction engine 150 may use the user's feedback 220 to update the ML model(s) 210 that are used to generate templates/associated document portions. Alternatively, or in addition, the document structure and clause extraction engine 150 may just generate updated templates/associated document portions. As can be understood, any other actions may be performed by the document structure and clause extraction engine 150 based on the user feedback 220. For example, the document structure and clause extraction engine 150 may train, re-train, refresh-train and/or create new ML model(s) 210.

Any of the above updates generated by the document structure and clause extraction engine 150 may be provided to the ML models and/or generative AI models for generation of structural representations of documents, labeling of portions of documents, creation of templates for documents, associating various document portions with specific template portions, and/or any other tasks. Feedback 220 may be used to update any of the above operations and/or how any of them are performed. This process may continue until the user has no further feedback.

Figure 3:
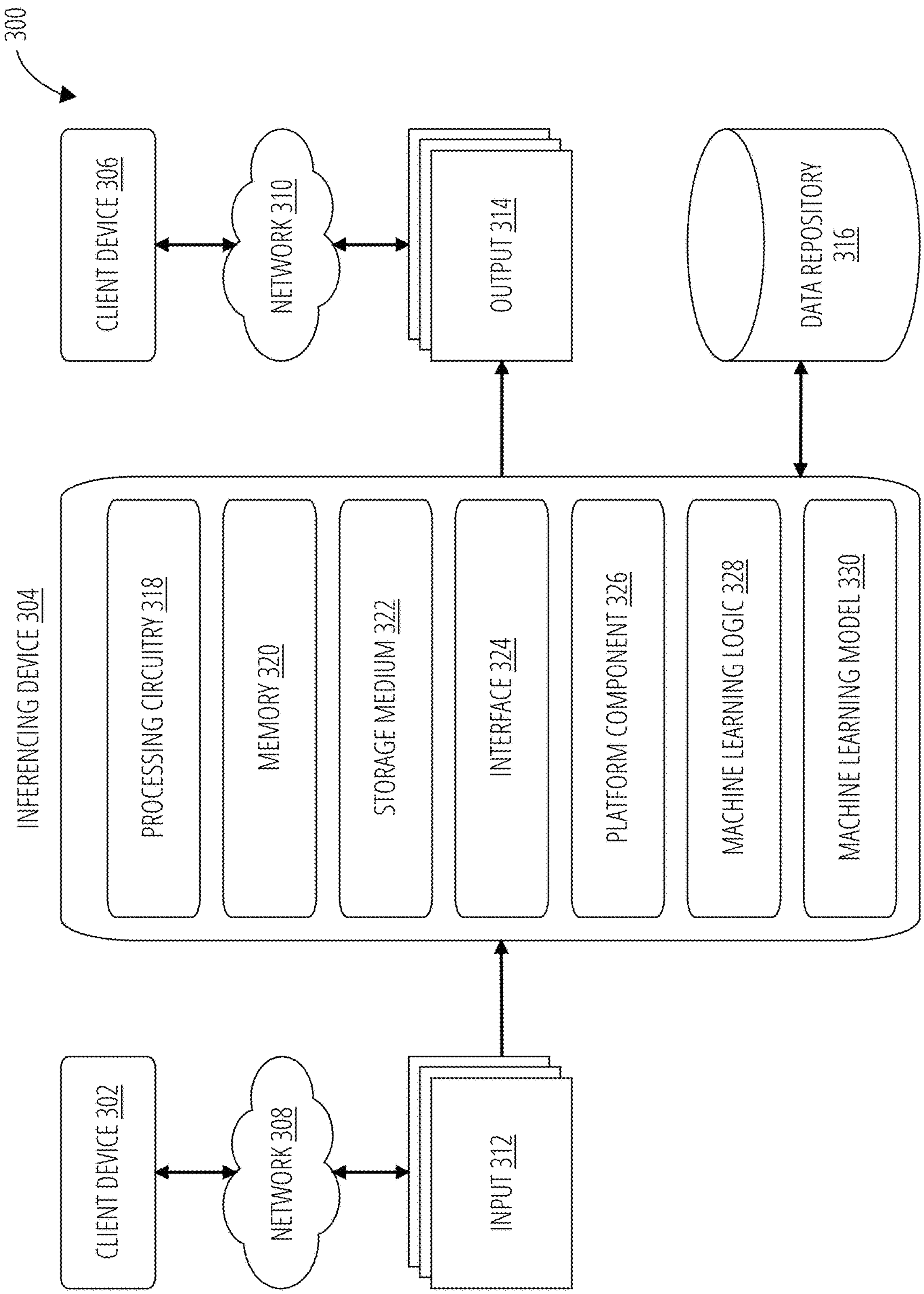
FIG. 3 illustrates an example of an AI/ML system that may be used for generating one or more transaction packages and/or guiding the user through one or more tasks, documents, etc., according to some embodiments of the current subject matter.

FIG. 3 illustrates an example of an AI/ML system 300 that may be used for generating one or more portions of an electronic document 202 based on a structure of the document, etc., according to some embodiments of the current subject matter. The system 300 may include a set of M devices, where M is any positive integer. As shown in FIG. 3, the system 300 may include three devices (M=3), such as a client device 302, an inferencing device 304, and a client device 306. The inferencing device 304 may communicate information with the client device 302 and the client device 306 over a network 308 and a network 310, respectively. The information may include input 312 from the client device 302 and output 314 to the client device 306, or vice-versa. In some embodiments, the input 312 and the output 314 may be communicated between the same client device 302 or client device 306. In another alternative, the input 312 and the output 314 may be stored in a data repository 316. Alternatively, or in addition, the input 312 and the output 314 are communicated via a platform component 326 of the inferencing device 304, such as an input/output (I/O) device (e.g., a touchscreen, a microphone, a speaker, etc.).

As shown in FIG. 3, the inferencing device 304 may include a processing circuitry 318, a memory 320, a storage medium 322, an interface 324, a platform component 326, ML logic 328, and an ML model 330. In some embodiments, the inferencing device 304 may include other components and/or devices as well. Examples for software elements and hardware elements of the inferencing device 304 are described in more detail with reference to a computing architecture 2200 as depicted in FIG. 22. Embodiments are not limited to these examples.

The inferencing device 304 may generally be arranged to receive an input 312, process the input 312 via one or more AI/ML techniques, and send an output 314. The inferencing device 304 may receive the input 312 from the client device 302 via the network 308, the client device 306 via the network 310, the platform component 326 (e.g., a touchscreen as a text command or microphone as a voice command), the memory 320, the storage medium 322 or the data repository 316. The inferencing device 304 may send the output 314 to the client device 302 via the network 308, the client device 306 via the network 310, the platform component 326 (e.g., a touchscreen to present text, graphic or video information or speaker to reproduce audio information), the memory 320, the storage medium 322 or the data repository 316. Examples for the software elements and hardware elements of the network 308 and the network 310 are described in more detail with reference to a communications architecture 2300 as depicted in FIG. 23. Embodiments are not limited to these examples.

The inferencing device 304 may include ML logic 328 and an ML model 330 to implement various AI/ML techniques for various AI/ML tasks. The ML logic 328 may receive the input 312 and process the input 312 using the ML model 330. The ML model 330 may perform inferencing operations to generate an inference for a specific task from the input 312. In some embodiments, the inference is part of the output 314. The output 314 may be used by the client device 302, the inferencing device 304, or the client device 306 to perform subsequent actions in response to the output 314.

In some embodiments, the ML model 330 may be a trained ML model 330 using a set of training operations. An example of training operations to train the ML model 330 is described with reference to FIG. 4.

Figure 4:
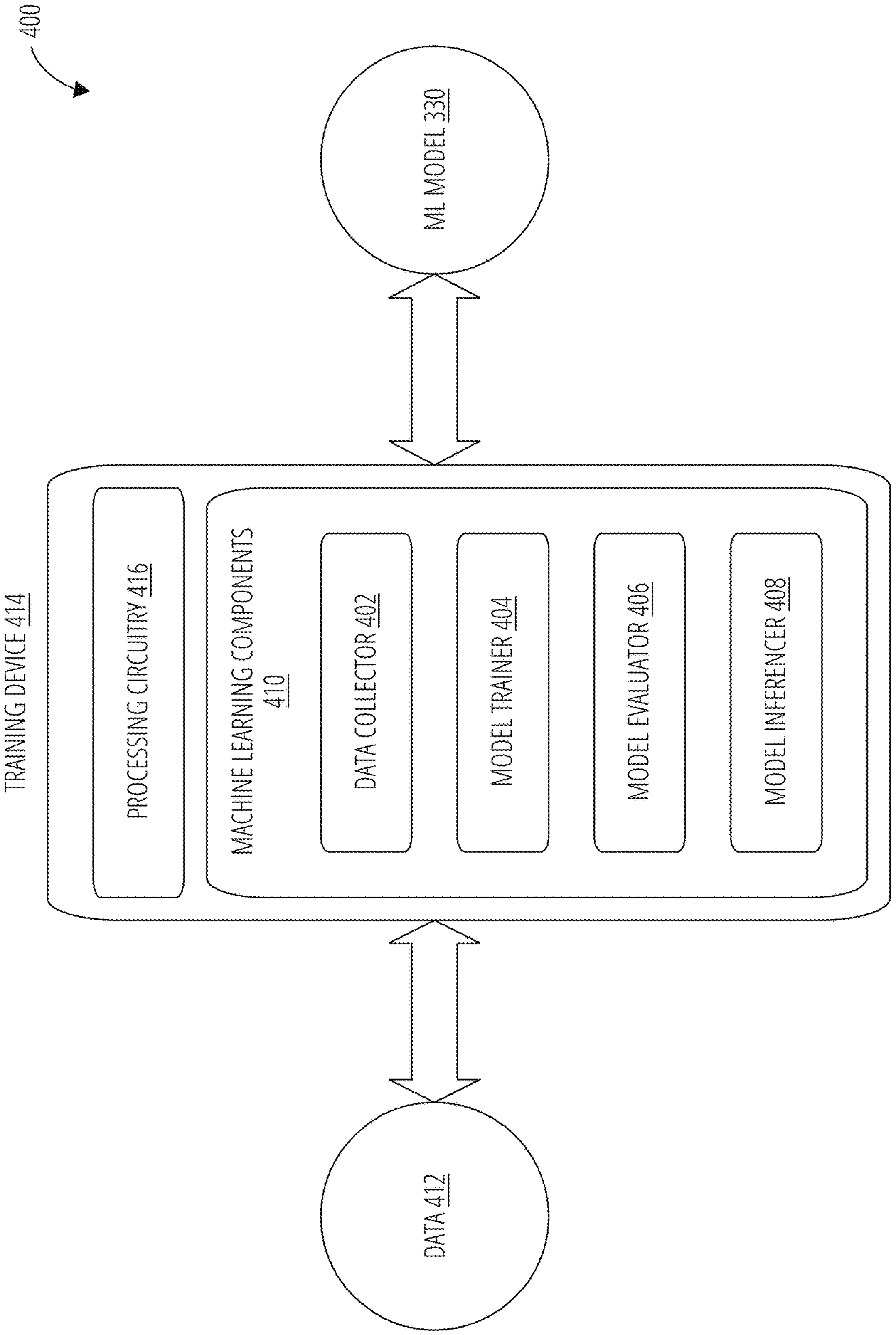
FIG. 4 illustrates an example apparatus that may include a training device suitable to generate a trained ML model for the inferencing device of the system shown in FIG. 3.

FIG. 4 illustrates an example apparatus 400 that may include a training device 414 suitable to generate a trained ML model 330 for the inferencing device 304 of the system 300. As shown in FIG. 4, the training device 414 may include a processing circuitry 416 and a set of ML components 410 to support various AI/ML techniques, such as a data collector 402, a model trainer 404, a model evaluator 406 and a model inferencer 408.

In general, the data collector 402 may collect data 412 from one or more data sources to use as training data for the ML model 330. The data collector 402 may collect different types of data 412, such as, text information, audio information, image information, video information, graphic information, and so forth. The model trainer 404 may receive as input the collected data and uses a portion of the collected data as test data for an AI/ML algorithm to train the ML model 330. The model evaluator 406 may evaluate and improve the trained ML model 330 using a portion of the collected data as test data to test the ML model 330. The model evaluator 406 may also use feedback information from the deployed ML model 330. The model inferencer 408 may implement the trained ML model 330 to receive as input new unseen data, generate one or more inferences on the new data, and output a result such as an alert, a recommendation or other post-solution activity.

An exemplary AI/ML architecture for the ML components 410 is described in more detail with reference to FIG. 5.

FIG. 5 illustrates an artificial intelligence architecture 500 that may be used by the training device 414 to generate the ML model 330 (e.g., ML model(s) 210, as shown in FIG. 2) for deployment by the inferencing device 304. The artificial intelligence architecture 500 is an example of a system suitable for implementing various AI techniques and/or ML techniques to perform various inferencing tasks on behalf of the various devices of the system 100.

AI is a science and technology based on principles of cognitive science, computer science and other related disciplines, which deals with the creation of intelligent machines that work and react like humans. AI is used to develop systems that can perform tasks that require human intelligence such as recognizing speech, vision and making decisions. AI can be seen as the ability for a machine or computer to think and learn, rather than just following instructions. ML is a subset of AI that uses algorithms to enable machines to learn from existing data and generate insights or predictions from that data. ML algorithms are used to optimize machine performance in various tasks such as classifying, clustering and forecasting. ML algorithms are used to create ML models that can accurately predict outcomes.

In general, the artificial intelligence architecture 500 may include various machine or computer components (e.g., circuit, processor circuit, memory, network interfaces, compute platforms, input/output (I/O) devices, etc.) for an AI/ML system that are designed to work together to create a pipeline that can take in raw data, process it, train an ML model 330, evaluate performance of the trained ML model 330, and deploy the tested ML model 330 as the trained ML model 330 in a production environment, and continuously monitor and maintain it.

The ML model 330 may be a mathematical construct used to predict outcomes based on a set of input data. The ML model 330 may be trained using large volumes of training data 526, and it can recognize patterns and trends in the training data 526 to make accurate predictions. The ML model 330 may be derived from an ML algorithm 524 (e.g., a neural network, decision tree, support vector machine, etc.). A data set is fed into the ML algorithm 524 which trains an ML model 330 to "learn" a function that produces mappings between a set of inputs and a set of outputs with a reasonably high accuracy. Given a sufficiently large enough set of inputs and outputs, the ML algorithm 524 may find the function for a given task. This function may even be able to produce the correct output for input that it has not seen during training. A data scientist prepares the mappings, selects and tunes the ML algorithm 524, and evaluates the resulting model performance. Once the ML logic 328 is sufficiently accurate on test data, it can be deployed for production use.

The ML algorithm 524 may include any ML algorithm suitable for a given AI task. Examples of ML algorithms may include supervised algorithms, unsupervised algorithms, or semi-supervised algorithms.

A supervised algorithm is a type of machine learning algorithm that uses labeled data to train a machine learning model. In supervised learning, the machine learning algorithm is given a set of input data and corresponding output data, which are used to train the model to make predictions or classifications. The input data is also known as the features, and the output data is known as the target or label. The goal of a supervised algorithm is to learn the relationship between the input features and the target labels, so that it can make accurate predictions or classifications for new, unseen data. Examples of supervised learning algorithms include: (1) linear regression which is a regression algorithm used to predict continuous numeric values, such as stock prices or temperature; (2) logistic regression which is a classification algorithm used to predict binary outcomes, such as whether a customer will purchase or not purchase a product; (3) decision tree which is a classification algorithm used to predict categorical outcomes by creating a decision tree based on the input features; or (4) random forest which is an ensemble algorithm that combines multiple decision trees to make more accurate predictions.

An unsupervised algorithm is a type of machine learning algorithm that is used to find patterns and relationships in a dataset without the need for labeled data. Unlike supervised learning, where the algorithm is provided with labeled training data and learns to make predictions based on that data, unsupervised learning works with unlabeled data and seeks to identify underlying structures or patterns. Unsupervised learning algorithms use a variety of techniques to discover patterns in the data, such as clustering, anomaly detection, and dimensionality reduction. Clustering algorithms group similar data points together, while anomaly detection algorithms identify unusual or unexpected data points. Dimensionality reduction algorithms are used to reduce the number of features in a dataset, making it easier to analyze and visualize. Unsupervised learning has many applications, such as in data mining, pattern recognition, and recommendation systems. It is particularly useful for tasks where labeled data is scarce or difficult to obtain, and where the goal is to gain insights and understanding from the data itself rather than to make predictions based on it.

Semi-supervised learning is a type of machine learning algorithm that combines both labeled and unlabeled data to improve the accuracy of predictions or classifications. In this approach, the algorithm is trained on a small amount of labeled data and a much larger amount of unlabeled data. The main idea behind semi-supervised learning is that labeled data is often scarce and expensive to obtain, whereas unlabeled data is abundant and easy to collect. By leveraging both types of data, semi-supervised learning can achieve higher accuracy and better generalization than either supervised or unsupervised learning alone. In semi-supervised learning, the algorithm first uses the labeled data to learn the underlying structure of the problem. It then uses this knowledge to identify patterns and relationships in the unlabeled data, and to make predictions or classifications based on these patterns. Semi-supervised learning has many applications, such as in speech recognition, natural language processing, and computer vision. It is particularly useful for tasks where labeled data is expensive or time-consuming to obtain, and where the goal is to improve the accuracy of predictions or classifications by leveraging large amounts of unlabeled data.

The ML algorithm 524 of the artificial intelligence architecture 500 is implemented using various types of ML algorithms including supervised algorithms, unsupervised algorithms, semi-supervised algorithms, or a combination thereof. A few examples of ML algorithms include support vector machine (SVM), random forests, naive Bayes, K-means clustering, neural networks, and so forth. A SVM is an algorithm that can be used for both classification and regression problems. It works by finding an optimal hyperplane that maximizes the margin between the two classes. Random forests is a type of decision tree algorithm that is used to make predictions based on a set of randomly selected features. Naive Bayes is a probabilistic classifier that makes predictions based on the probability of certain events occurring. K-Means Clustering is an unsupervised learning algorithm that groups data points into clusters. Neural networks is a type of machine learning algorithm that is designed to mimic the behavior of neurons in the human brain. Other examples of ML algorithms include a support vector machine (SVM) algorithm, a random forest algorithm, a naive Bayes algorithm, a K-means clustering algorithm, a neural network algorithm, an artificial neural network (ANN) algorithm, a convolutional neural network (CNN) algorithm, a recurrent neural network (RNN) algorithm, a long short-term memory (LSTM) algorithm, a deep learning algorithm, a decision tree learning algorithm, a regression analysis algorithm, a Bayesian network algorithm, a genetic algorithm, a federated learning algorithm, a distributed artificial intelligence algorithm, and so forth. Embodiments are not limited in this context.

As depicted in FIG. 5, the artificial intelligence architecture 500 includes a set of data sources 502 to source data 504 for the artificial intelligence architecture 500. Data sources 502 may comprise any device capable generating, processing, storing or managing data 504 suitable for a ML system. The data sources 502 may receive data 550 associated with documents (e.g., type of documents, portion(s) of document content(s) and/or entire contents of document(s), transactions data (e.g., type of transaction, transaction identifier, requests associated with the transaction, etc.), and/or any other data. It should be noted that the data 550 may also be supplied during training phase of the model. Some additional, non-limiting, examples of data sources 502 include without limitation databases, web scraping, sensors and Internet of Things (IoT) devices, image and video cameras, audio devices, text generators, publicly available databases, private databases, and many other data sources 502. The data sources 502 may be remote from the artificial intelligence architecture 500 and accessed via a network, local to the artificial intelligence architecture 500 an accessed via a network interface or may be a combination of local and remote data sources 502.

The data sources 502 source difference types of data 504 (which may include data 550 related to documents, transactions, etc.). By way of example and not limitation, the data 504 includes structured data from relational databases, such as customer profiles, transaction histories, or product inventories. The data 504 includes unstructured data from websites such as customer reviews, news articles, social media posts, or product specifications. The data 504 includes data from temperature sensors, motion detectors, and smart home appliances. The data 504 includes image data from medical images, security footage, or satellite images. The data 504 includes audio data from speech recognition, music recognition, or call centers. The data 504 includes text data from emails, chat logs, customer feedback, news articles or social media posts. The data 504 includes publicly available datasets such as those from government agencies, academic institutions, or research organizations. These are just a few examples of the many sources of data that can be used for ML systems. It is important to note that the quality and quantity of the data is critical for the success of a machine learning project.

The data 504 is typically in different formats such as structured, unstructured or semi-structured data. Structured data refers to data that is organized in a specific format or schema, such as tables or spreadsheets. Structured data has a well-defined set of rules that dictate how the data should be organized and represented, including the data types and relationships between data elements. Unstructured data refers to any data that does not have a predefined or organized format or schema. Unlike structured data, which is organized in a specific way, unstructured data can take various forms, such as text, images, audio, or video. Unstructured data can come from a variety of sources, including social media, emails, sensor data, and website content. Semi-structured data is a type of data that does not fit neatly into the traditional categories of structured and unstructured data. It has some structure but does not conform to the rigid structure of a traditional relational database. Semi-structured data is characterized by the presence of tags or metadata that provide some structure and context for the data.

The data sources 502 may be communicatively coupled to a data collector 402. The data collector 402 may gather relevant data 504 from the data sources 502. Once collected, the data collector 402 may use a pre-processor 506 to make the data 504 suitable for analysis. This may involve data cleaning, transformation, and feature engineering. Data preprocessing is a critical step in ML as it directly impacts the accuracy and effectiveness of the ML model 330. The pre-processor 506 receives the data 504 as input, processes the data 504, and outputs pre-processed data 516 for storage in a database 508. Examples for the database 508 includes a hard drive, solid state storage, and/or random-access memory (RAM).

The data collector 402 is communicatively coupled to a model trainer 404. The model trainer 404 may perform AI/ML model training, validation, and testing which may generate model performance metrics as part of the model testing procedure. The model trainer 404 may receive the pre-processed data 516 as input 510 or via the database 508. The model trainer 404 may implement a suitable ML algorithm 524 to train an ML model 330 on a set of training data 526 from the pre-processed data 516. The training process may involve feeding the pre-processed data 516 into the ML algorithm 524 to produce or optimize an ML model 330. The training process may adjust its parameters until it achieves an initial level of satisfactory performance.

The model trainer 404 may be communicatively coupled to a model evaluator 406. After an ML model 330 is trained, the ML model 330 may need to be evaluated to assess its performance. This is done using various metrics such as accuracy, precision, recall, and F1 score. The model trainer 404 may output the ML model 330, which is received as input 510 or from the database 508. The model evaluator 406 may receive the ML model 330 as input 512, and it initiates an evaluation process to measure performance of the ML model 330. The evaluation process may include providing feedback 518 to the model trainer 404. The model trainer 404 may re-train the ML model 330 to improve performance in an iterative manner.

The model evaluator 406 may be communicatively coupled to the model inferencer 408. The model inferencer 408 may provide AI/ML model inference output (e.g., inferences, predictions or decisions). Once the ML model 330 is trained and evaluated, it may be deployed in a production environment where it is used to make predictions on new data. The model inferencer 408 may receive the evaluated ML model 330 as input 514. The model inferencer 408 may use the evaluated ML model 330 to produce insights or predictions on real data, which may be deployed as a final production ML model 330. The inference output of the ML model 330 may be use case specific. The model inferencer 408 may also perform model monitoring and maintenance, which involves continuously monitoring performance of the ML model 330 in the production environment and making any necessary updates or modifications to maintain its accuracy and effectiveness. The model inferencer 408 may provide feedback 518 to the data collector 402 to train or re-train the ML model 330. The feedback 518 may include model performance feedback information, which may be used for monitoring and improving performance of the ML model 330.

Some or all of the model inferencer 408 may be implemented by various actors 522 in the artificial intelligence architecture 500, including the ML model 330 of the inferencing device 304, for example. The actors 522 may use the deployed ML model 330 on new data to make inferences or predictions for a given task and output an insight 532. The actors 522 may implement the model inferencer 408 locally, or remotely receives outputs from the model inferencer 408 in a distributed computing manner. The actors 522 may trigger actions directed to other entities or to itself. The actors 522 provide feedback 520 to the data collector 402 via the model inferencer 408. The feedback 520 may include data needed to derive training data, inference data or to monitor the performance of the ML model 330 and its impact to the network through updating of key performance indicators (KPIs) and performance counters.

As discussed above, the systems 100, 300 implement some or all of the artificial intelligence architecture 500 to support various use cases and solutions for various AI/ML tasks. In some embodiments, the training device 414 of the apparatus 400 may use the artificial intelligence architecture 500 to generate and train the ML model 330 for use by the inferencing device 304 for the system 100. In one embodiment, for example, the training device 414 may train the ML model 330 as a neural network, as described in more detail with reference to FIG. 6. Other use cases and solutions for AI/ML are possible as well, and embodiments are not limited in this context.

Figure 6:
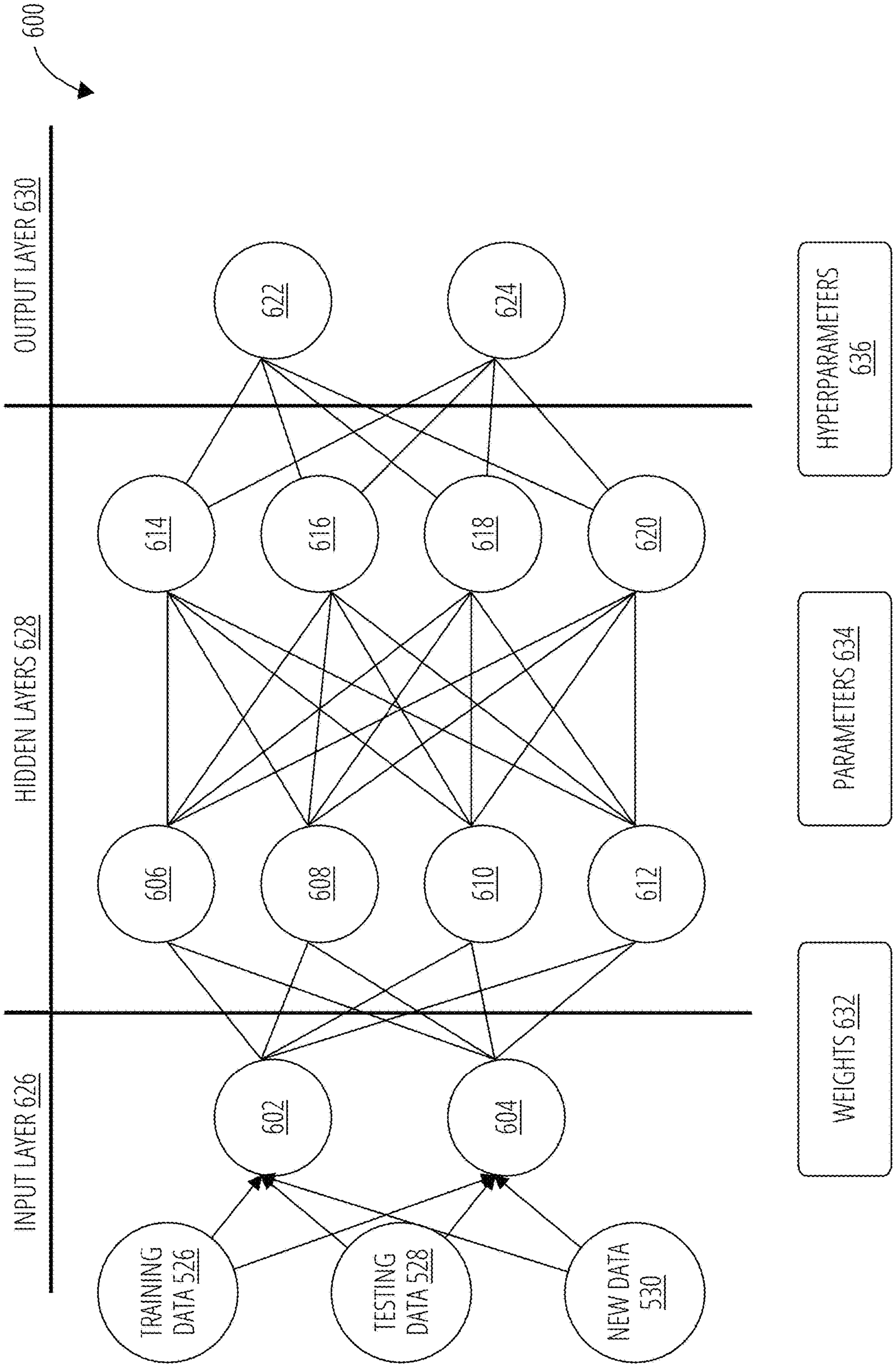
FIG. 6 illustrates an artificial neural network in accordance with one embodiment.

FIG. 6 illustrates an embodiment of an artificial neural network 600. Neural networks, also known as artificial neural networks (ANNs) or simulated neural networks (SNNs), are a subset of machine learning and are at the core of deep learning algorithms. Their name and structure are inspired by the human brain, mimicking the way that biological neurons signal to one another.

Artificial neural network 600 may include multiple node layers, containing an input layer 626, one or more hidden layers 628, and an output layer 630. Each layer comprises one or more nodes, such as nodes 602 to 624. As shown in FIG. 6, for example, the input layer 626 may include nodes 602, 604. The artificial neural network 600 may include two hidden layers 628, with a first hidden layer having nodes 606, 608, 610 and 612, and a second hidden layer having nodes 614, 616, 618 and 620. The artificial neural network 600 may include an output layer 630 with nodes 622, 624. Each node 602 to 624 may include a processing element (PE), or artificial neuron, that connects to another and has an associated weight and threshold. If the output of any individual node is above the specified threshold value, that node may be activated, sending data to the next layer of the network. Otherwise, no data is passed along to the next layer of the network.

In general, artificial neural network 600 may rely on training data 526 to learn and improve accuracy over time. However, once the artificial neural network 600 may be fine-tuned for accuracy, and tested on testing data 528, the artificial neural network 600 may be ready to classify and cluster new data 530 at a high velocity. Tasks in speech recognition or image recognition can take minutes versus hours when compared to the manual identification by human experts.

Each individual node 602 to 424 may be a linear regression model, composed of input data, weights, a bias (or threshold), and an output. The linear regression model may have a formula similar to Equation (1), as follows:

$$\sum wixi + \text{bias} = w1x1 + w2x2 + w3x3 + \text{bias} \qquad \text{EQUATION (1)}$$

$$\text{output} = f(x) = 1 \text{ if } \sum w1x1 + b >= 0;\ 0 \text{ if } \sum w1x1 + b < 0$$

Once an input layer 626 is determined, a set of weights 632 may be assigned. The weights 632 help determine the importance of any given variable, with larger ones contributing more significantly to the output compared to other inputs. All inputs are then multiplied by their respective weights and then summed. Afterward, the output is passed through an activation function, which determines the output. If that output exceeds a given threshold, it "fires" (or activates) the node, passing data to the next layer in the network. This results in the output of one node becoming in the input of the next node. The process of passing data from one layer to the next layer defines the artificial neural network 600 as a feedforward network.

In some embodiments, the artificial neural network 600 may leverage sigmoid neurons, which are distinguished by having values between 0 and 1. Since the artificial neural network 600 behaves similarly to a decision tree, cascading data from one node to another, having x values between 0 and 1 will reduce the impact of any given change of a single variable on the output of any given node, and subsequently, the output of the artificial neural network 600.

The artificial neural network 600 may have many practical use cases, like image recognition, speech recognition, text recognition or classification. The artificial neural network 600 leverages supervised learning, or labeled datasets, to train the algorithm. As the model is trained, its accuracy is measured using a cost (or loss) function. This is also commonly referred to as the mean squared error (MSE). An example of a cost function is shown in Equation (2), as follows:

$$\text{Cost Function} = MSE = \frac{1}{2m}\sum_{i=1}^{m}(\hat{y}_i - y_i)^2 \rightarrow \text{MIN} \qquad \text{EQUATION (2)}$$

Where i represents the index of the sample, y-hat is the predicted outcome, y is the actual value, and m is the number of samples.

Ultimately, the goal is to minimize the cost function to ensure correctness of fit for any given observation. As the model adjusts its weights and bias, it uses the cost function and reinforcement learning to reach the point of convergence, or the local minimum. The process in which the algorithm adjusts its weights is through gradient descent, allowing the model to determine the direction to take to reduce errors (or minimize the cost function). With each training example, the parameters 634 of the model adjust to gradually converge at the minimum.

In one embodiment, the artificial neural network 600 is feedforward, meaning it flows in one direction only, from input to output. In one embodiment, the artificial neural network 600 uses backpropagation. Backpropagation is when the artificial neural network 600 moves in the opposite direction from output to input. Backpropagation allows calculation and attribution of errors associated with each neuron 602 to 624, thereby allowing adjustment to fit the parameters 634 of the ML model 330 appropriately.

The artificial neural network 600 is implemented as different neural networks depending on a given task. Neural networks are classified into different types, which are used for different purposes. In one embodiment, the artificial neural network 600 is implemented as a feedforward neural network, or multi-layer perceptrons (MLPs), comprised of an input layer 626, hidden layers 628, and an output layer 630. While these neural networks are also commonly referred to as MLPs, they are actually comprised of sigmoid neurons, not perceptrons, as most real-world problems are nonlinear. Trained data 504 usually is fed into these models to train them, and they are the foundation for computer vision, natural language processing, and other neural networks. In one embodiment, the artificial neural network 600 is implemented as a convolutional neural network (CNN). A CNN is similar to feedforward networks, but usually utilized for image recognition, pattern recognition, and/or computer vision. These networks harness principles from linear algebra, particularly matrix multiplication, to identify patterns within an image. In one embodiment, the artificial neural network 600 is implemented as a recurrent neural network (RNN). A RNN is identified by feedback loops. The RNN learning algorithms are primarily leveraged when using time-series data to make predictions about future outcomes, such as stock market predictions or sales forecasting. The artificial neural network 600 is implemented as any type of neural network suitable for a given operational task of system 100, and the MLP, CNN, and RNN are merely a few examples. Embodiments are not limited in this context.

The artificial neural network 600 may include a set of associated parameters 634. There are a number of different parameters that must be decided upon when designing a neural network. Among these parameters are the number of layers, the number of neurons per layer, the number of training iterations, and so forth. Some of the more important parameters in terms of training and network capacity are a number of hidden neurons parameter, a learning rate parameter, a momentum parameter, a training type parameter, an Epoch parameter, a minimum error parameter, and so forth.

In some embodiments, the artificial neural network 600 may be implemented as a deep learning neural network. The term deep learning neural network refers to a depth of layers in a given neural network. A neural network that has more than three layers—which would be inclusive of the inputs and the output—can be considered a deep learning algorithm. A neural network that only has two or three layers, however, may be referred to as a basic neural network. A deep learning neural network may tune and optimize one or more hyperparameters 636. A hyperparameter is a parameter whose values are set before starting the model training process. Deep learning models, including convolutional neural network (CNN) and recurrent neural network (RNN) models can have anywhere from a few hyperparameters to a few hundred hyperparameters. The values specified for these hyperparameters impacts the model learning rate and other regulations during the training process as well as final model performance. A deep learning neural network uses hyperparameter optimization algorithms to automatically optimize models. The algorithms used include Random Search, Tree-structured Parzen Estimator (TPE) and Bayesian optimization based on the Gaussian process. These algorithms are combined with a distributed training engine for quick parallel searching of the optimal hyperparameter values.

FIG. 7 illustrates an example of a document corpus 708 suitable for use by the document structure and clause extraction engine 150 of the server device 102. The document corpus 708 may be stored in one or more database and/or storage locations and may be accessible (e.g., via a query) by the document structure and clause extraction engine 150. In general, a document corpus is a large and structured collection of electronic documents, such as text documents, that are typically used for natural language processing (NLP) tasks such as text classification, sentiment analysis, topic modeling, and information retrieval. A corpus can include a variety of document types such as web pages, books, news articles, social media posts, scientific papers, and more. The corpus may be created for a specific domain or purpose, and it may be annotated with metadata or labels to facilitate analysis. Document corpora are commonly used in research and industry to train machine learning models and to develop NLP applications.

As shown in FIG. 7, the document corpus 708 may include information from electronic documents 718 derived from the document records 138 stored in the data store 126. The electronic documents 718 may include any electronic document having metadata such as STME 132 suitable for receiving an electronic signature, including both signed electronic documents or unsigned electronic documents. Different sets of the electronic documents 718 of the document corpus 708 may be associated with different entities. For example, a first set of electronic documents 718 is associated with a company A 702. A second set of electronic documents 718 is associated with a company B 704. A third set of electronic documents 718 is associated with a company C 706. A fourth set of electronic documents 718 is associated with a company D 710. Although some embodiments discuss the document corpus 708 having electronic documents 718, it may be appreciated that the document corpus 708 may have unsigned electronic document as well, which may be mined using the AI/ML techniques described herein. Embodiments are not limited in this context.

Each set of electronic documents 718 associated with a defined entity may include one or more subsets of the electronic documents 718 categorized by document type. For instance, the second set of electronic documents 718 associated with company B 704 may have a first subset of electronic documents 718 with a document type for supply agreements 712, a second subset of electronic documents 718 with a document type for lease agreements 716, and a third subset of electronic documents 718 with a document type for service agreements 714. In one embodiment, the sets and subsets of electronic documents 718 may be identified using labels manually assigned by a human operator, such as metadata added to a document record for a signed electronic document created in a document management system, or feedback from a user of the system 100 during a document generation process. In one embodiment, the sets and subsets of electronic documents 718 may be unlabeled.

Figure 8:
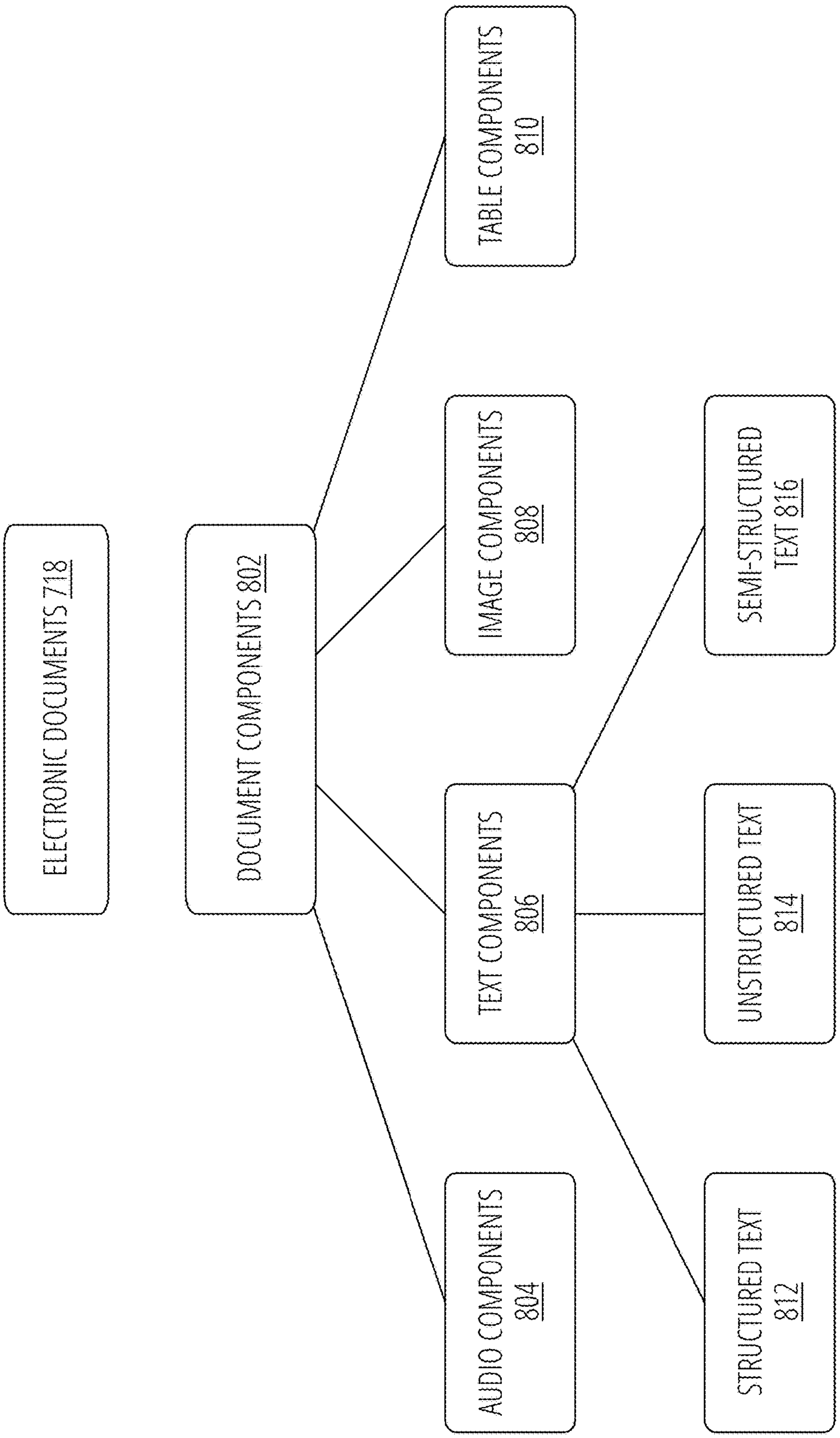
FIG. 8 illustrates electronic documents in accordance with one embodiment.

FIG. 8 illustrates an example of an electronic document 718. An electronic document 718 may include different information types that collectively form a set of document components 802 for the electronic document 718. The document components 802 may comprise, for example, one or more audio components 804, text components 806, image components 808, or table components 810. Each document component 802 may comprise different content types. For example, the text components 806 may comprise structured text 812, unstructured text 814, or semi-structured text 816.

Structured text 812 refers to text information that is organized in a specific format or schema, such as words, sentences, paragraphs, sections, clauses, and so forth. Structured text 812 has a well-defined set of rules that dictate how the data should be organized and represented, including the data types and relationships between data elements.

Unstructured text 814 refers to text information that does not have a predefined or organized format or schema. Unlike structured text 812, which is organized in a specific way, unstructured text 814 can take various forms, such as text information stored in a table, spreadsheet, figures, equations, header, footer, filename, metadata, and so forth.

Semi-structured text 816 is text information that does not fit neatly into the traditional categories of structured and unstructured data. It has some structure but does not conform to the rigid structure of a specific format or schema. Semi-structured data is characterized by the presence of context tags or metadata that provide some structure and context for the text information, such as a caption or description of a figure, name of a table, labels for equations, and so forth.

Figure 9:
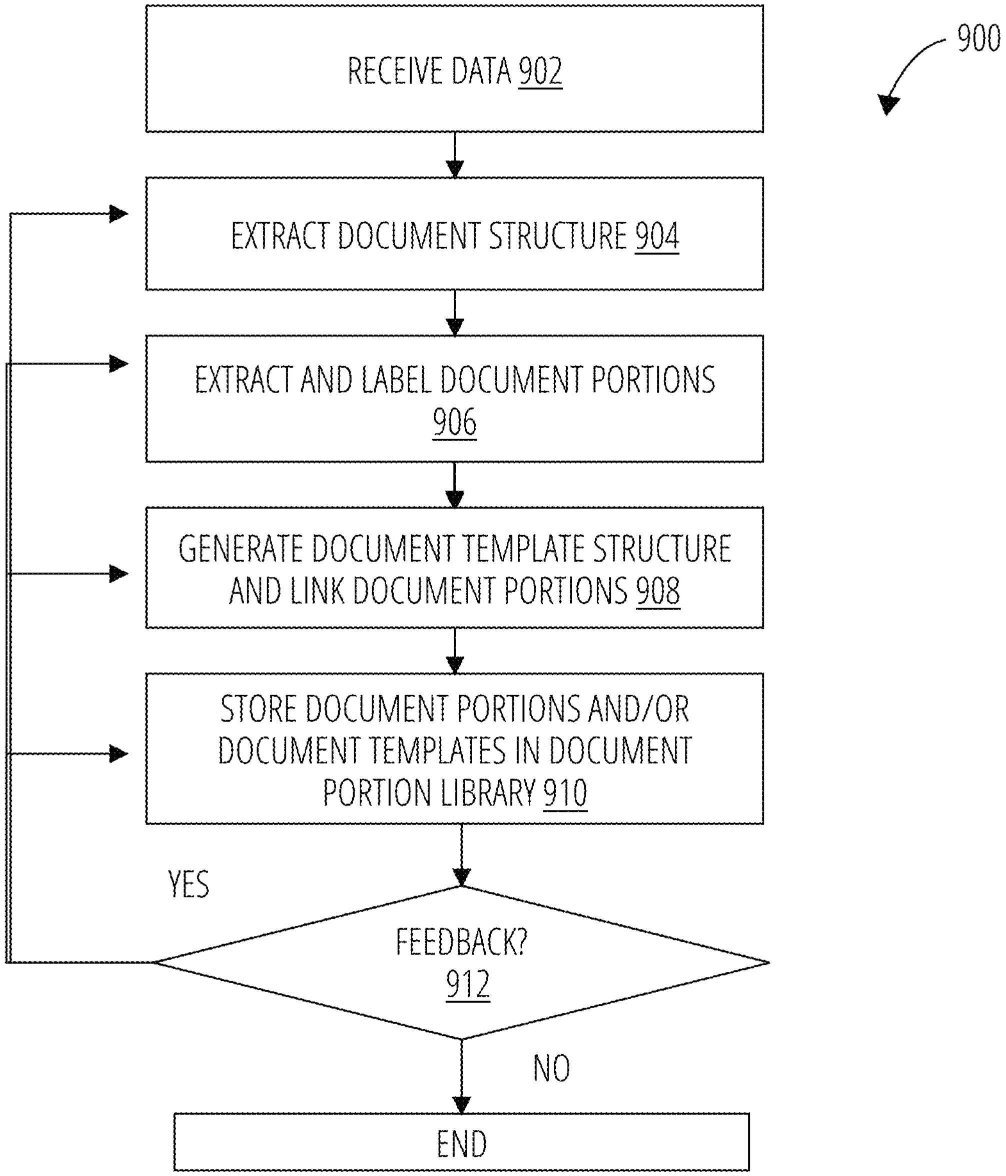
FIG. 9 illustrates an example process for generating one or more templates for one or more electronic documents, according to some embodiments of the current subject matter.

FIG. 9 illustrates an example process 900 for generating one or more templates for one or more electronic documents, according to some embodiments of the current subject matter. The process 900 may be executed using the document structure and clause extraction engine 150 shown in FIGS. 1-2.

At 902, the document structure and clause extraction engine 150 may be configured to receive various data related to electronic documents, such as, for example, electronic documents 202. The data in such documents 202 may be structured and/or unstructured. Further, the electronic documents 202 may be labeled and/or unlabeled. The documents may come from one or more storage locations and/or sources. For example, data storages may be private databases with various access rights and/or privileges (e.g., internal company databases, specific user access databases, etc.). In some cases, the private databases may store documents in an organized predetermined fashion, which may allow ease of access to the electronic documents and/or any portions thereof. For instance, the documents 202 stored in private databases may be labeled, searchable, and/or otherwise, easily identifiable. In other cases, the documents may be stored in such databases in an unstructured format. The documents 202 may be stored in any desired electronic formats, e.g., PDF, .docx, .xls, etc.

The documents 202 may also be received from public non-government databases, government databases (e.g., SEC-EDGAR, etc.), etc. and/or any other data sources. These sources may store various legal documents (e.g., commercial contracts, lease agreements, public disclosures, etc.), non-legal documents, and/or any other types of documents. The documents 202 may be identified using various identifiers allowing location/retrieval of these documents in/from the databases.

At 904, the document structure generation engine 204 of the document structure and clause extraction engine 150 may be configured to extract and/or determine structure of the electronic documents. The engine 204 may be configured to process one document at a time, or several electronic documents in parallel. The engine 204 may be configured to use one or more generative AI model(s) 214 to determine structure of the electronic documents 202. In particular, the engine 204 may generate one or more instructions to the generative AI model(s) 214 so that the generative AI model(s) 214 can analyze the text of the documents and ascertain their structure. For example, the engine 204 may provide an electronic version of a lease agreement and include an instruction to generative AI model(s) 214 stating "identify all clauses of the lease agreement".

In some embodiments, the document structure generation engine 204 may be configured to also request the generative AI model(s) 214 to generate one or more labels for each structural element (i.e., portion) of the electronic document. For example, the engine 204 may include an instruction to generative AI model(s) 214 stating: "label each clause of the lease agreement". The generative AI model(s) 214 may use this instruction and analyze each clause, which may correspond to a structural element of the document, of the lease agreement to determine a particular label for that clause. The determination may be based on a semantic analysis of the clause. For example, upon determining that a clause of the lease agreement includes words "termination", the generative AI model(s) 214 may generate a label "termination" and assign it to that clause. As can be understood, any other way of generating labels is possible.

At 906, the document portion(s) extraction and labeling engine 206 of the document structure and clause extraction engine 150 may be configured to identify and extract one or more portions from electronic documents 202. In some embodiments, the document portion(s) extraction and labeling engine 206 may be configured to use one or more generative AI model(s) 214 for the purposes of identifying and extracting document portions from documents 202. In the lease agreement example, the engine 206 may be configured to provide one or more instructions to the generative AI model(s) 214 to analyze one or more lease agreements (which it may provide to the generative AI model(s) 214) and identify and extract all clauses of lease agreements. Alternatively, or in addition, the engine 206 may instruct the generative AI model(s) 214 to identify and extract only specific clauses, e.g., termination clauses, governing law clauses, etc.

Upon receiving such instructions, the generative AI model(s) 214 may be configured to analyze the documents and identify (e.g., using semantic search, and/or any other methodology) requested clauses. Once clauses have been identified and extracted, they may be provided to the document portion(s) extraction and labeling engine 206.

In some example embodiments, the engine 206 may be configured to label each clause that it receives from the generative AI model(s) 214 (e.g., "termination" label may be assigned to a termination clause, etc.). Alternatively, or in addition, the document portion(s) extraction and labeling engine 206 may be configured to request the generative AI model(s) 214 to label each clause that it identifies. Further, each label (whether generated by the generative AI model(s)

214 or document portion(s) extraction and labeling engine 206) may include data identifying the type of document (e.g., "lease agreement", etc.), the clause, whether the clause relates to any other clauses, and/or any other information.

Each document portion (e.g., clause of an agreement) may be stored in the document portion library 208 as an object model, at 910. As stated above, the object model may include various information (e.g., metadata, identifiers, etc.) related to the document portion, such as, for example, identification of the document portion, location of the document portion within the document, relationship of the document portion to other document portions within the same document and/or to document portions in other documents of the same or different types, document portions that precede and follow the document portion, identification of the document type of the document containing the document portion, and/or any other data. An example of document portion's object model is illustrated in FIG. 12.

At 908, template generation engine 212 of document structure and clause extraction engine 150 may be configured to generate one or more templates (e.g., templates 1004 as shown in FIG. 10). The templates 1004 may be configured to include structural representation of a particular type of an electronic document (e.g., a lease agreement) as generated by the document structure generation engine 204 with one or more portions of documents (e.g., termination clauses, governing law clauses, etc.), as determined by the document portion(s) extraction and labeling engine 206 and stored in the document portion library 208. The document portions may be associated and/or linked to specific locations within the structural representation of electronic document.

The engine 212 may be configured to use one or more ML model(s) 210 for the purposes of generating document templates. The models 210 may be specific to a particular type of document (e.g., a lease agreement model, a sales agreement model, etc.). The template generation engine 212 may be configured to use the ML model(s) 210 to associate and/or link structural representations of documents and various document portions stored in the document portion library 208. The model 210 may use various identifiers that may be stored together with the document portions and structural representations to associate/link document portions to specific structural elements within the structural representation of a particular type of electronic document.

Once template is generated, it may be stored in one or more storage locations, at 910. For example, the generated template may be stored in the document portion library 208 and/or at any other location.

In some embodiments, one or more users, such as, use of a computing user device 218 may provide feedback 220 to the generated template, at 912. The feedback 220 may be provided in response to a document being generated by the document generation engine 216. For instance, the user may indicate that a sales term clause is not appropriate for a lease agreement. The feedback 220 may be provided to one or more engines 204, 206, and/or 212, which may use it to update the structural representations of documents, the extracted document portions, the association/linking of document portions to the structural representation, one or more ML model(s) 210, and/or perform any other actions. Alternatively, or in addition, the feedback may be provided without the document generation engine 216 generating a particular document.

FIG. 10 illustrates an example of such structural representation 1004 of an electronic document 202. As discussed above, in some example, non-limiting embodiments, the structural representation 1004 may be generated from an unstructured data 1002 that may be contained within an electronic document 202. The unstructured data 1002 may be unlabeled and may be in any desired format. For example, the unstructured data 1002 may be a lease agreement that has not been processed and/or analyzed by the document structure generation engine 204 and/or any of the generative AI model(s) 214.

Once the unstructured data 1002 is provided to the document structure generation engine 204, the engine 204 may be configured to process the data 1002, which may include providing the unstructured data 1002 to the generative AI model(s) 214 to analyze it and determine its structural features or elements. For example, the engine 204 may be configured to instruct the generative AI model(s) 214 to determine specific structural elements of the unstructured data 1002 and indicate how such structural elements are arranged within the data 1002 so that structural representation 1004 may be generated. The generative AI model(s) 214 may also be asked to generate one or more labels for each structural element and then use the labels to label each structural element.

Alternatively, or in addition, the document structure generation engine 204 may be configured to use one or more ML model(s) 210 to analyze the unstructured data 1002 to determine specific structural elements contained in the unstructured data 1002 as well as how they are organized within the unstructured data 1002. In some embodiments, the engine 204 may be configured to initially determine a type of the document represented by the unstructured data 1002 (e.g., a lease agreement, a non-disclosure agreement, etc.) and, using the type of the document, select a specific ML model 210 from a plurality of ML model(s) 210 that may be trained to recognize structural elements of the document contained in the unstructured data 1002. For instance, one ML model 210 may be trained to recognize structural elements of lease agreements, while another ML model 210 may be trained to recognize structural elements of non-disclosure agreements, etc. Alternatively, or in addition, one model 210 may be trained to recognize specific structural elements within document irrespective of their types.

For example, as shown in FIG. 10, the unstructured data 1002 may be configured to be a non-disclosure agreement. Upon receipt of the unprocessed non-disclosure agreement, the document structure generation engine 204 may be configured to use ML model(s) 210 and/or generative AI model(s) 214 to perform analysis of the unstructured data 1002 to determine that it is a non-disclosure agreement and determine its structural elements. For example, the models may be configured to determine that the non-disclosure agreement may include one or more of the following sections-"Introduction", "Definitions", "Confidentiality", "Data Breach", "Indemnification", "Governing Law", and "Signature Block", as shown in FIG. 10. After and/or while analyzing the unstructured data 1002 and determining presence of the above sections, the engine 204 may be configured determine or instruct the models (e.g., ML model(s) 210 and/or generative AI model(s) 214) to generate and assign labels to each of the above sections. The labels may include the names of the above sections (e.g., "introduction", "definitions", etc.).

In some embodiments, upon competition of the analysis of the unstructured data 1002, the document structure generation engine 204 may be configured to generate structural representation 1004. The document structure generation engine 204 may also present a graphical representation of the structural representation 1004 on a graphical user interface of the user device 218. The user of the user device 218 may provide feedback 220 to the engine 204 (and/or to document structure and clause extraction engine 150) indicating that, for example, the structural representation 1004 is correct and/or has errors. For example, the feedback 220 may state that the non-disclosure agreement contained in the unstructured data 1002 does not include a definitions section and hence, the analysis performed by the engine 204 (and/or ML model(s) 210 and/or generative AI model(s) 214) may need to be re-executed. As stated herein, the engine 204 and/or document structure and clause extraction engine 150 may use the feedback 220 correct the structural representation 1004 and generate a new structural representation 1004. It may also use feedback 220 to re-train and/or refresh train one or more of the ML model(s) 210 and/or generative AI model(s) 214. Moreover, the feedback 220 may be used to revise instructions that document structure generation engine 204 may provide to ML model(s) 210 and/or generative AI model(s) 214 to generate the structural representation 1004. Once user's feedback 220 is taken into account, an updated structural representation 1004 may be generated by the document structure generation engine 204 and/or presented on the graphical user interface of the user device 218.

As can be understood, the structural representation 1004 include any desired arrangement of structural elements of the document. For example, the elements may be arranged in a sequential order, in a hierarchical order, in a node-like structure, and/or in any other order. In some embodiments, the arrangement of structural elements of the document may be defined by the instructions provided by document structure generation engine 204 to ML model(s) 210 and/or generative AI model(s) 214, and/or in any other way.

Figure 11:
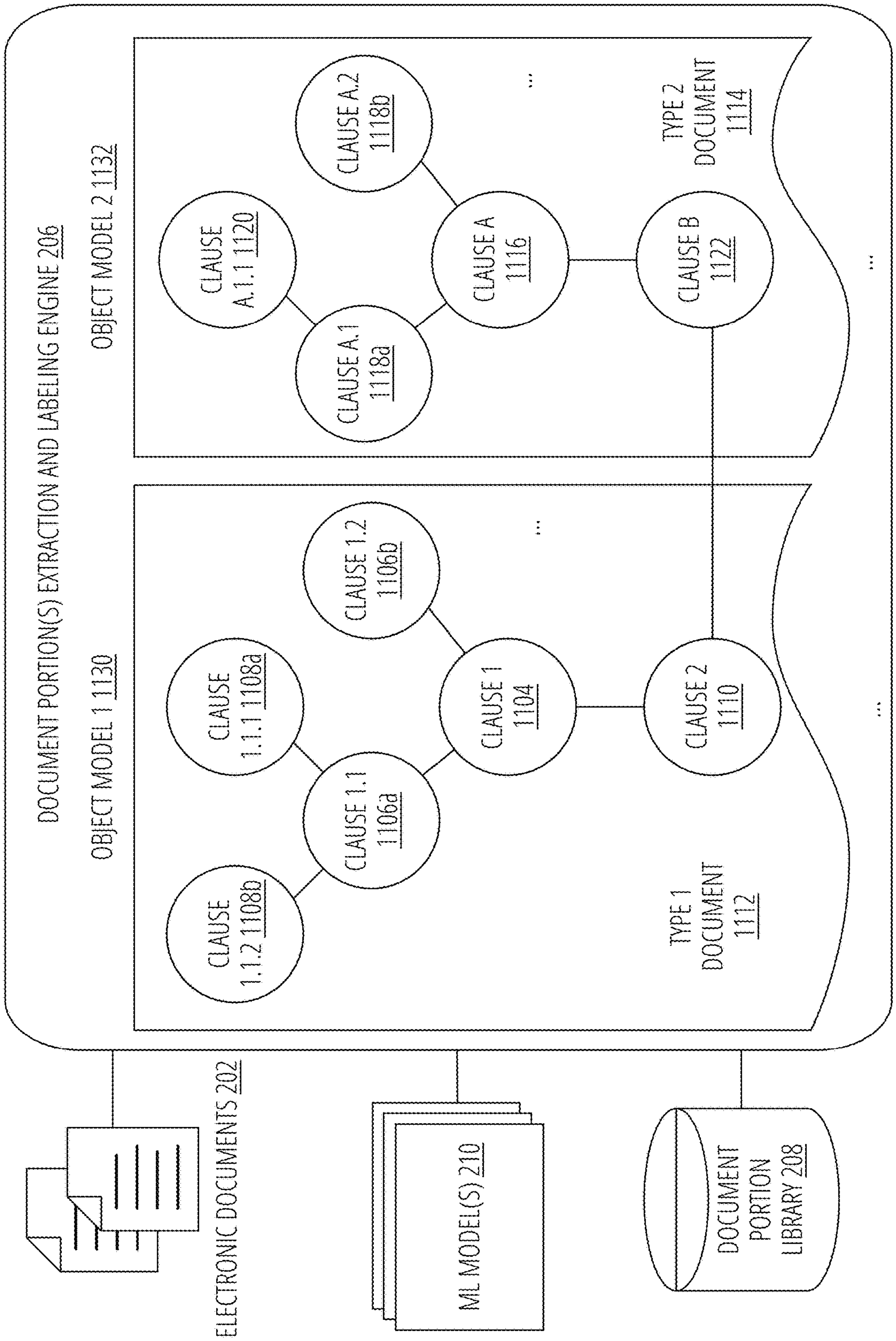
FIG. 11 illustrates details of operations that may be performed by document portion(s) extraction and labeling engine, according to some embodiments of the current subject matter.

FIG. 11 illustrates details of operations that may be performed by document portion(s) extraction and labeling engine 206, according to some embodiments of the current subject matter. As stated herein, the engine 206 may be configured to extract and/or label one or more portions of documents that may be extracted from the unstructured data 1002. The document portion(s) extraction and labeling engine 206 may use one or more ML model(s) 210 for extraction and labeling of document portions. Once portions are extracted and/or labeled, they may be stored as object models in the document portion library 208.

The object models may include object model 1 1130 and object model 2 1132, as shown in FIG. 11. The object model 1 1130 may be an object model for a type 1 document 1112, e.g., a lease agreement. The object model 2 1132 may be an object model for a type 2 document 1114, e.g., a master services agreement. Each object model 1130, 1132 may be configured to include various information or data (e.g., metadata, etc.) about document portions that have been extracted by the document portion(s) extraction and labeling engine 206. For example, the information may include a type of document from where the document portion was extracted (e.g., for object model 1 1130, it is type 1 document 1112, which corresponds to a lease agreement), location of the document portion within the document, identification and/or information about preceding and/or subsequent document portions that may also have been extracted by document portion(s) extraction and labeling engine 206, and/or any other information.

The object models may be arranged in any desired fashion. For instance, as shown in FIG. 11, the object models may be arranged in a form of a hierarchical tree with multiple node. The tree may include a root node with other nodes being connected to the root node. The root node may represent a document portion and any associated information (e.g., metadata, location, etc.) and connected nodes may represent other document portions (e.g., preceding, subsequent, related, etc. document portions).

For example, as shown in FIG. 11, the object model 1 1130 may include clauses 1104, 1106 (a, b), 1108 (a, b), and 1110, where the clauses may be extracted from the lease agreement, where the lease agreement by a type 1 document 1112. In this object model, the clause 1 1104 may be a root clause of the object model 1 1130, e.g., a clause related to the termination to the lease agreement. Clause 1.1 **1106*a* may be a clause connected to clause 1 1104, e.g., a clause that may be a “whereas” clause and may precede the termination clause. Clause 1.1.1 1108*a* may be a clause connected to clause 1.1 1106*a*, e.g., a clause that may precede the “whereas” clause and may identify parties to the lease agreement. Clause 1.1.2 1108*b* may be another clause connected clause 1.1 1106*a*, e.g., a clause that may precede the “whereas” clause and may identify the leased premises subject to the lease agreement. Clause 1.2 1106*b* may be a clause connected to clause 1 1104, e.g., a clause that may be located subsequently to the clause 1 1104 in the lease agreement and may be a lease extension clause. Clause 2 1110 may be yet another clause that may be connected to clause 1 1104, but not immediately preceding or following clause 1 1104. Clause 2 1110** may be a breach of agreement clause that may describe how the agreement may be terminated in the event of a breach.

The object model 2 1132 for type 2 document 1114, e.g., a master services agreement may be structured similar to the object model 1 1130. In particular, clause A 1116 may correspond to a description of services to be provided under the master services agreement. Clause A.1 **1118*a* may be connected to clause A 1116, may immediately precede clause A 1116, and may describe payment terms for the services. Clause A.1.1 1120 may be connected to clause A.1 1118*a*, may immediately precede clause A.1 1118*a*, and may describe parties to the master services agreement. Clause A.2 1118*b* may be connected to clause A 1116, may immediately follow clause A 1116, and may describe term of the master services agreement. Clause B 1122 may be connected to clause A 1116 but might not immediately precede or follow clause A 1116 and may be a breach of agreement clause (e.g., describing what happens in the event of a breach). Clause 2 1110 of the object model 1 1130 and clause B 1122 of object model 2 1132 may be connected to one another. The document portion(s) extraction and labeling engine 206** may determine that because these two clauses are related to similar subject matter, e.g., breach of agreement, they may be connected.

In some embodiments, to determine whether or not clauses of the same or different object models may need to be connected, the document portion(s) extraction and labeling engine 206 may be configured to use one or more ML model(s) 210. The ML model(s) 210 may be configured to analyze clauses of different documents (and hence, different object models) and determine whether they contain similar subject matter (e.g., breach of agreement). If similar subject matter is found, the ML model(s) 210 may indicate that clauses should be connected across different models. Alternatively, or in addition, clauses may be connected without determining their similarity, e.g., connection between clauses may be determined based on the same type of documents, e.g., lease agreements. As can be understood, connections between clauses may be formed using any desired criteria.

In some embodiments, the document portion(s) extraction and labeling engine 206 may determine how document portions may need to be arranged within a particular object model. The engine 206 may use a predetermined structure or model (e.g., a tree structure) for arranging document portions. Alternatively, or in addition, the engine 206 may use one or more ML model(s) 210 to determine arrangement of document portions within an object model. For example, the engine 206 may select a model 210 that may be specific to type 1 document 1112, e.g., lease agreement. Once document portions (e.g., clauses) are extracted from the document, the clauses in the resulting object model may be arranged by the model 210 in a particular way. As can be understood, the structure and/or arrangement of the object models may be performed in any desired way.

In some embodiments, the engine 206 may be configured to label each document portions that may be extracted from the documents. For example, in the object model 1 1130, clause 1 1104 may be labeled "termination", clause 1.1 1106*a* may be labeled "whereas", etc. Clauses may be labeled in a similar fashion in the object model 2 1132. The labels for the clauses may be generated using one or more ML model(s) 210. The engine 206 may instruct ML model(s) 210 to generate labels for one or more clauses that are extracted from the documents. The labels may be generated and, subsequently, assigned to clauses in accordance with a particular type of document, based on a content of the clause, and/or in any desired way.

Once the object models are generated (including their arrangement and/or labeling of portions), they may be stored in the document portion library 208. The object models may be stored in any desired fashion.

FIG. 12 illustrates an example document portion library 208, according to some embodiments of the current subject matter. The object models stored in the library 208 may include one or more of the document portion 1202, location of the document portion in the document 1204, other document portions 1206, type of document data 1208, and/or any other data 1210, and/or any combination thereof. The data contained in the object model may include any of type of data, metadata, identifiers, etc.

The document portion 1202 may be a clause of an agreement, a lease termination clause in a lease agreement. The location data 1204 may indicate location of the lease termination clause (e.g., page 2 of the lease agreement, clause no. 5). Other document portions 1206 may indicate other clauses (e.g., clause 1.1 1106*a*, clause 1.2 1106*b*, etc.) that may be located prior to and/or after the lease termination clause, e.g., a governing law clause may precede the lease termination clause and a security deposit clause may follow the lease termination clause. The type of document 1208 may indicate what type of document, e.g., lease agreement, that the document portion 1202 is associated with.

The object model stored in document portion library 208 may also include other data 1210 that may indicate other clauses that may be associated with and/or be relevant to the lease termination clause, e.g., a term extension clause may be related to and/or associated with the termination clause; a notice clause may also be related to and/or associated with the lease termination clause, etc. Alternatively, or in addition, the data 1210 may indicate that the lease termination clause may be associated with and/or related to termination clauses in other types of agreements (e.g., master services agreements, as represented by object model 2 1132).

Further, the other data 1210 may also include any other data, e.g., information about parties to the lease agreement, location of leased premises, and/or any other information. This data may be used when other lease agreements are requested to be generated. For example, upon receiving a request to generate a lease agreement, the engine 150 may retrieve information about the structure of the lease agreement and any associated clauses, information about the parties, premises, etc. and incorporate it into any agreement that may be generated.

FIG. 13 illustrates operation of an example of the template generation engine 212, according to some embodiments of the current subject matter. To generate a document template 1306, the template generation engine 212 may receive structural representation 1302 that may include one or more structural elements 1310 from document structure generation engine 204 and one or more document portions 1304 from document portion(s) extraction and labeling engine 206, where document portions 1304 may be retrieved from document portion library 208. The template generation engine 212 may use one or more ML model(s) 210 to generate templates 1306.

As discussed herein, the ML model(s) 210 may be selected by the engine 212 in accordance with a type of a particular document (e.g., a lease agreement, a master services agreement, etc.). The selected ML model(s) 210 may be used for arranging one or more structural elements 1310 (a, b, . . . c) within template 1306 and associating and/or linking one or more document portions 1312 (a, b, c, . . . d) to structural elements 1310. Alternatively, or in addition, the ML model(s) 210 may be used by the engine 212 to not only generate a particular template 1306 but also to determine and/or select one or more structural elements 1310 and one or more document portions 1304. The selection and/or retrieval may be based on a type of a particular document for which template 1306 is being generated by the template generation engine 212.

In some embodiments, the template 1306, as generated by the template generation engine 212 (either using ML model(s) 210 and/or a predetermined structure (e.g., as retrieved and/or stored by the engine 212)), may include a structural element 1310*a* linked to a portion 1312*a*, a structural element 1310*b* linked to a portion 1312*b* and a portion 1312*c*, a portion 1312*c* linked to the portion 1312*c* and a portion 1312*d*. Each of the portions 1312 may be retrieved from the document portion library 208 using information contained one or more corresponding object models, as shown in FIGS. 11-12.

For instance, the structural element 1310*a* may be a lease termination provision, where portion 1312*a* may be a lease termination clause stating, "This lease agreement shall terminate within, unless renewed." The text of clauses may be open-ended allowing end users (when requesting generation of specific document) to complete or fill-in the desired information. The structural element 1310*b* may be governing law provision, where portion 1312*b* may be a governing law clause stating, "This lease agreement shall be governed by the law of the State of" The portion 1312*c*, which may also be linked to the structural element 1310*b* may be a dispute resolution venue of the agreement clause and may state "The parties consent to the jurisdiction of court of to resolve any disputes arising out of breach of this lease agreement." Because the portions 1312*b* and 1312*c* are related (e.g., governing law and dispute resolution venue), they may be linked to the same structural element. Thus, when a lease agreement (or any other type of agreement) is generated, the template 1306 may be used to include both of these clauses. Similarly, the structural element 1310*c* may be linked to two document portions 1312*c* and 1312*d*, which may include related content (e.g., specifics of a termination of the lease agreement, breach of the lease agreement, etc.). As can be understood, the current subject matter is not limited to the specific arrangement of the template 1306 and any other arrangement may be used.

Figure 14:
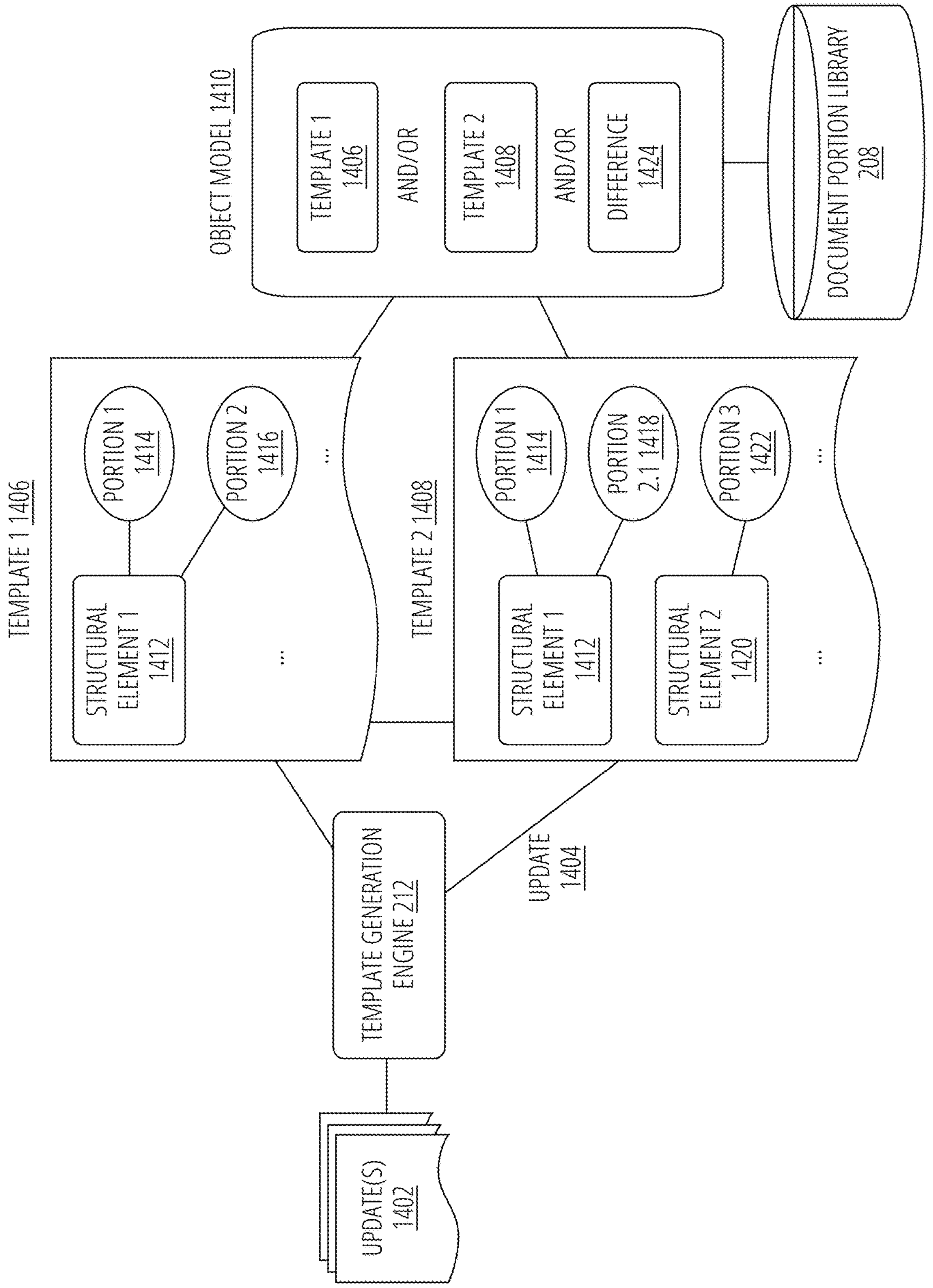
FIG. 14 illustrates another example operation of the template generation engine, according to some embodiments of the current subject matter.

FIG. 14 illustrates another example operation of the template generation engine 212, according to some embodiments of the current subject matter. In addition to generation of templates, as shown in FIG. 13, the template generation engine 212 may also be configured to receive one or more update(s) 1402 and generate one or more updated and/or new templates based on such updates. The template generation engine 212 may generate one or more object models 1410 using the updated/new templates and/or initially generated templates and/or differences between templates and store such object models in document portion library 208.

In some embodiments, the updates may relate to one or more portions (e.g., portions 1312 as shown in FIG. 13) of electronic documents that may be associated with one or more structural elements (e.g., structural elements 1310 as shown in FIG. 13). For example, in a lease agreement template, the termination clause may receive an update to change (e.g., add) its language from "The term of this agreement is." to "The term of this agreement is and is renewable for the same term upon written consent by both parties." Alternatively, or in addition, the update may relate to an entire change of a document portion. For instance, in a non-disclosure agreement, in order to comply with various jurisdictional requirements, governing law clause (as well as any other clauses) may be changed based on a geographic locale where the agreement may be signed/enforced. For instance, for the non-disclosure agreement to be enforceable in the United States, the governing clause (and/or any other clauses) in that agreement's template may be changed to state "This agreement shall be enforceable under the laws of the State of California, United States." and for the non-disclosure agreement to be enforceable in France, the governing clause (and/or any other clauses) in that agreement's template may be changed to state "This agreement shall be enforceable under the laws of France." As can be understood, any other update(s) 1402 may be received by template generation engine 212.

Moreover, the update(s) 1402 may relate to one or more structural elements (e.g., structural elements 1310), such as, addition and/or removal of a particular structural element (e.g., element 1310) in a document. For instance, in a lease agreement, a clause related to liabilities of a lease may be added to the lease agreement's template's structure. Alternatively, or in addition, a clause related to confidentiality may be removed from a lease agreement's template's structure. When modifying structural arrangement of a template, the template generation engine 212 may be configured associate and/or disassociate corresponding document portions, e.g., when adding a particular structural element, the engine 212 may add one or more corresponding document portions, and, when removing a structural element, the engine 212 may remove document portions that have been previously associated with such element (the engine 212 may still keep the portions disassociated with the remove structural element by associating them with other structural elements that have not been removed).

As shown in FIG. 14, and as discussed herein, the template generation engine 212 may be configured to generate a template 1 1406. The template 1 1406 may include a structural element 1 1412 that may be associated and/or linked with portion 1 1414 and portion 2 1416. For example, in a lease agreement, a termination clause (i.e., structural element 1 1412) may be linked with clause 1 stating "The term of this agreement is years." (i.e., portion 1 1414) and clause 2 stating "Parties have a right to terminate this agreement upon written notice." (i.e., portion 2 1416). As can be understood, template 1 1406 may include any number of structural elements 1 1412 and/or portions 1414 and/or 1416. Moreover, the elements 1412 and/or portions 1414, 1416 may be arranged in any desired way.

Upon receiving update(s) 1402, the template generation engine 212 may be configured to generate a template 2 1408. The template 2 1408 may be a version of the template 1 1406 and/or an entirely new template. The template generation engine 212 may use the template 1 1406 and update 1404 (resulting from processing of update(s) 1402 by template generation engine 212) to generate template 2 1408. As shown in FIG. 14, for example, the template 2 1408 may include the original structural element 1 1412 from template 1 1406 along with associated original portion 1 1414. However, the template 2 1408 includes a modification to portion 2 1416 in the form of portion 2.1 1418. For example, in the lease agreement, the portion 2.1 1418 may state "Parties have a right to terminate this agreement upon 30-day written notice."

Moreover, the template 2 1408 may include a new structural element-structural element 2 1420. For example, in the lease agreement, the structural element 2 1420 may be a governing law clause. A corresponding document portion, i.e., portion 3 1422, may be associated with the new structural element 2 1420. The portion 3 1422 may state "This agreement shall be interpreted under the law of the State of California." Each of the updated portions, i.e., portion 2.1 1418, and the new portion, i.e., portion 3 1422, may be associated/linked with structural elements, i.e., structural element 1 1412 and structural element 2 1420, respectively. As can be understood, any other changes may be included in the template 2 1408.

Once templates 1406 and 1408 are generated, the template generation engine 212 may be configured to generate and/or form an object model 1410 (and/or a data model). The object model 1410 may be configured to include one or more of the following: the template 1 1406, the template 2 1408, and/or any differences 1424 between the template 1 1406 and the template 2 1408. For example, the differences may include portion 2.1 1418, structural element 2 1420, and/or portion 3 1422. The object model 1410 may include various metadata, identifiers, and/or any other information and/or data that may be representative of the template 1 1406, template 2 1408, and/or differences 1424.

The object model 1410 may be stored in the document portion library 208. The document structure and clause extraction engine 150 and/or the document generation engine 216 may query the document portion library 208 and retrieve the object model 1410 and/or any of the template 1 1406 and template 2 1408 for the purposes of generating a desired electronic document (e.g., a lease agreement) for presentation to the user on a graphical user interface of the user device 218. In some embodiments, the object model 1410 may be used to generate electronic documents having same types (e.g., lease agreements) and/or different types (e.g., lease agreements and master services agreements).

In some embodiments, the object model 1410 may include information and/or data that may be specific to a particular user and/or organization that may be associated with the user. For example, Company A requires that its non-disclosure agreements are generated using templates that include clauses that are enforceable under provisions of the US laws (e.g., law of State of California) and/or Company B requires that its non-disclosure agreements are generated using templates that include clauses that are enforceable under provisions of the French laws. In that regard, when a request (e.g., request to generate document 222) to generate a non-disclosure agreement is received by the document generation engine 216 (e.g., from user device 218), the engine 216 may determine whether the request originated from Company A or from Company B. If the request originated from Company A, the document generation engine 216 may generate a query to the document structure and clause extraction engine 150 to generate a non-disclosure agreement template using a template that includes clauses enforceable under the provisions of the US laws. Alternatively, or in addition, the engine 150 may retrieve such template (which may have been previously generated by the template generation engine 212) from the document portion library 208. However, if the request originated from Company B, the document generation engine 216 may generate a query to the document structure and clause extraction engine 150 to generate or retrieve a non-disclosure agreement template using a template that includes clauses enforceable under the provisions of the French laws. Hence, because templates, which are Company-specific, are used, the resulting non-disclosure documents are generated in accordance with requirements of the Companies.

Figure 15:
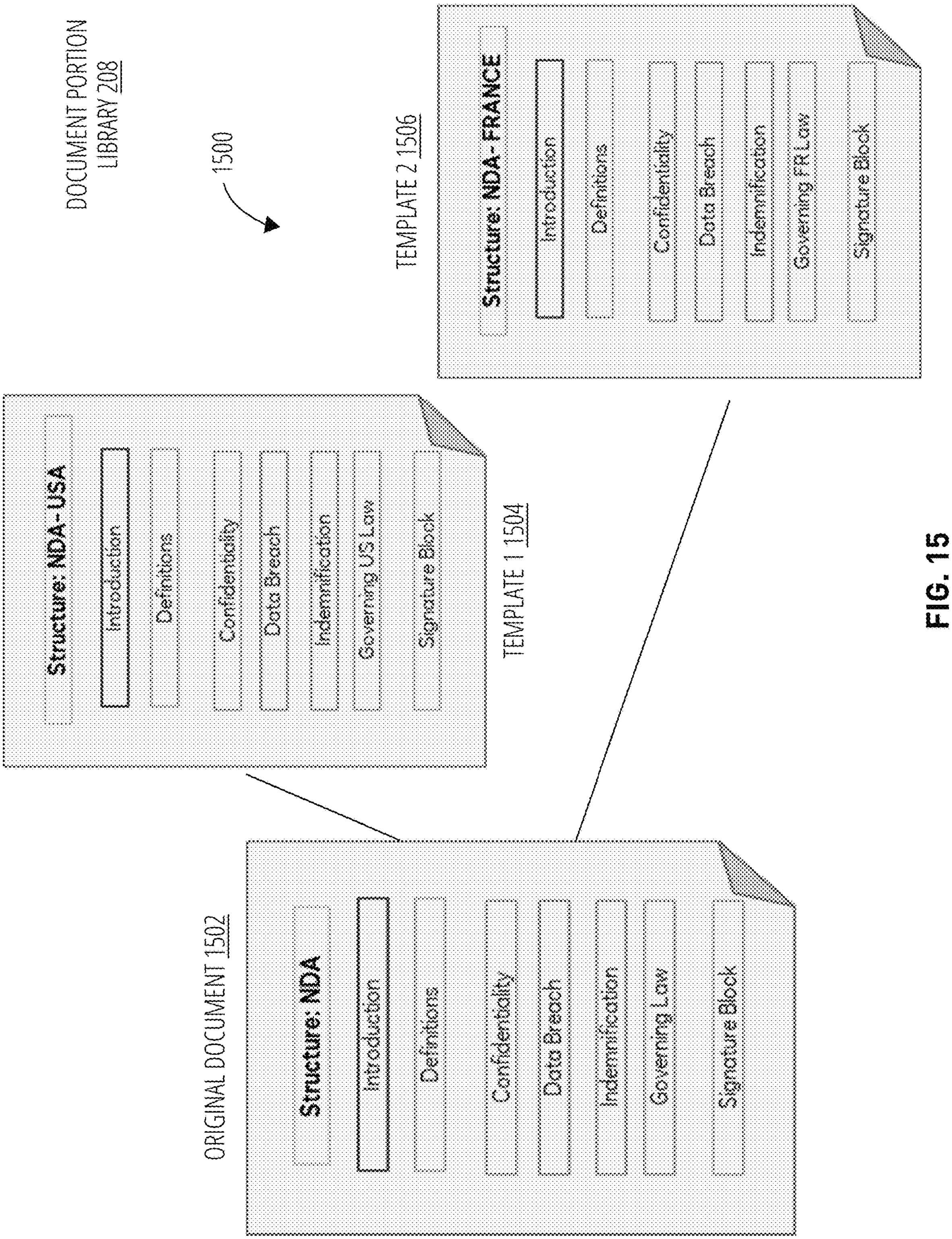
FIG. 15 illustrates an example structure of an object model that may be stored in the document portion library, according to some embodiments of the current subject matter.

FIG. 15 illustrates an example structure 1500 of an object model that may be stored in the document portion library 208, according to some embodiments of the current subject matter. The structure 1500 may include template 1 1504 and template 2 1506, both of which may be linked to an original document 1502. The structure and/or portions of the original document 1502 may have been used by the template generation engine 212 (not shown in FIG. 15) to generate template 1 1504 and/or template 2 1506.

For example, as shown in FIG. 15, the original document 1502 may be a non-disclosure agreement that may include one or more of the following structural elements: “Introduction”, “Definitions”, “Confidentiality”, “Data Breach”, “Indemnification”, “Governing Law”, and “Signature Block”. The structural elements may be arranged in a particular order, e.g., as shown in FIG. 15. Moreover, each of these structural elements may be associated with corresponding clauses containing wording specific to each element (e.g., “Introduction” may be associated with “This agreement is made by and between Company A and Company B . . . ”, etc.). As can be understood, more than one original document 1502 may be used for the purposes of generating template 1 1504 and/or template 2 1506.

The template 1 1504 may be generated by the template generation engine 212 (not shown in FIG. 15) using the structural arrangement of the original document 1502. As shown in FIG. 15, the template 1 1504 may include structural elements that may be similar to the structural elements of the original document 1502, e.g., “Introduction”, “Definitions”, “Confidentiality”, “Data Breach”, “Indemnification”, “Governing US Law”, and “Signature Block”. Since the template 1 1504 was generated based on the original document 1502, the order of the structural elements in template 1 1504 may be preserved and/or be the same as in the original document 1502. However, because template 1 1504 was generated by the template generation engine 212 to be used for creating US-law-governed non-disclosure agreements, the “Governing Law” structural element of the original document 1502 may be replaced with “Governing US Law” structural element in the template 1 1504. Moreover, in some example embodiments, the template 1 1504 may include an identifier “Structure: NDA-USA” to indicate that this is a template for non-disclosure agreements governed by the US laws. Once generation of the template 1 1504 is completed, it may be linked to the original document 1502. This way, all historical changes to the original document 1502 may be tracked, which may be helpful in reviewing evolution of the template and subsequently generated electronic documents.

Similarly, template 2 1506 may be generated by the template generation engine 212 (not shown in FIG. 15) using the structural arrangement of the original document 1502. In particular, the template 2 1506 may include structural elements that may be similar to the structural elements of the original document 1502 as well as to template 1 1504. For instance, the template 2 1506 may include “Introduction”, “Definitions”, “Confidentiality”, “Data Breach”, “Indemnification”, “Governing FR Law”, and “Signature Block”, the order of which may be preserved and/or be the same as in the original document 1502. However, the template 2 1506 is generated by the template generation engine 212 to be used for creating French-law-governed non-disclosure agreements. Thus, the “Governing Law” structural element of the original document 1502 may be replaced with “Governing FR Law” structural element in the template 2 1506 to indicate use of French laws. Moreover, in some example embodiments, the template 2 1506 may include an identifier “Structure: NDA-France” to indicate that this is a template for non-disclosure agreements governed by the French laws. The template 2 1506 may also be linked to the original document 1502 and/or template 1 1504. This way, all historical changes to the original document 1502 and/or template 1 1504 may be tracked.

Figure 16:
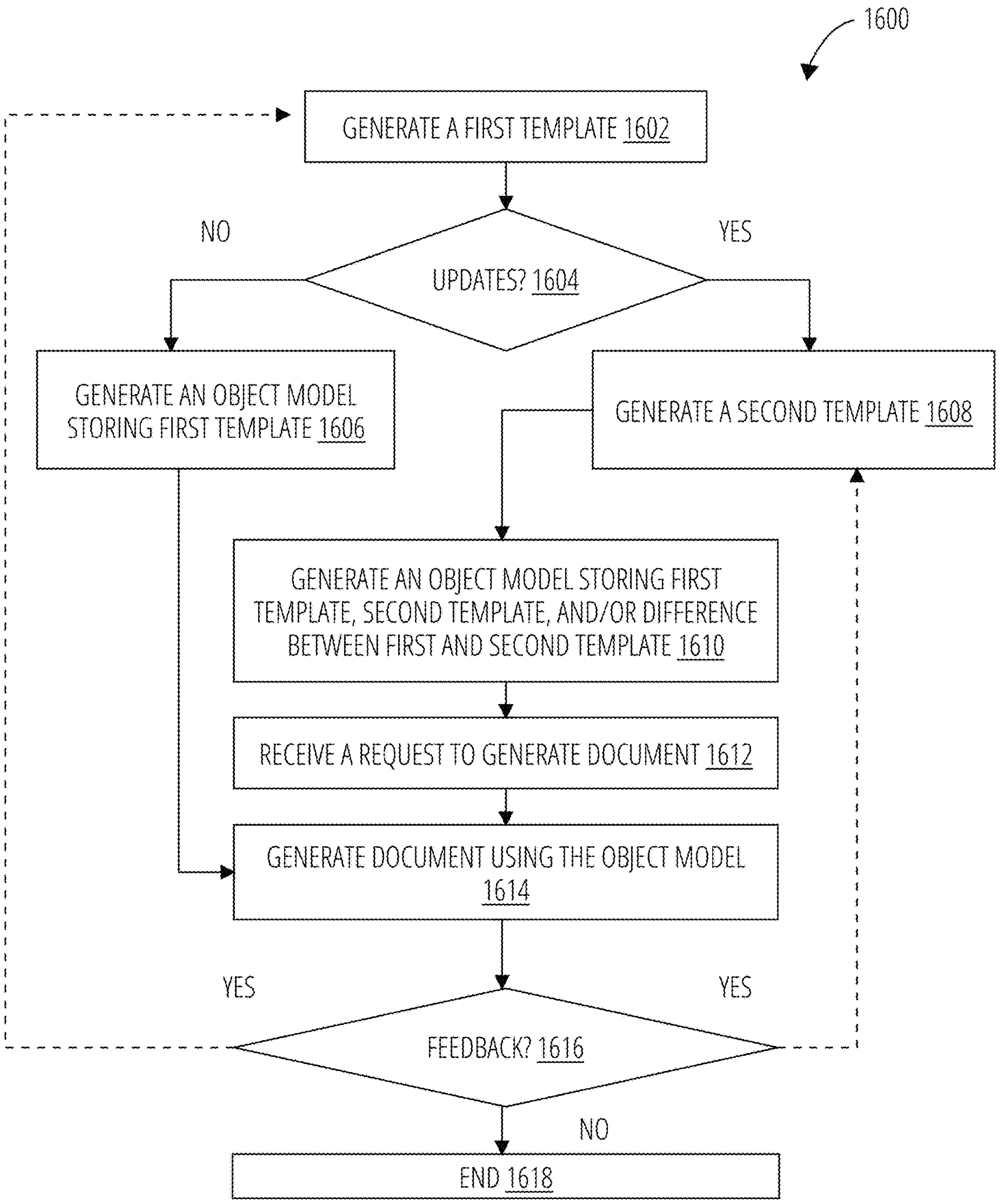
FIG. 16 illustrates an example process for generating of documents using one or more templates, according to some embodiments of the current subject matter.

FIG. 16 illustrates an example process 1600 for generating of documents using one or more templates, according to some embodiments of the current subject matter. The process 1600 may be executed using the document structure and clause extraction engine 150 shown in FIGS. 1-2.

At 1602, the document structure and clause extraction engine 150, and in particular, its template generation engine 212 may be configured to generate one or more first templates, such as, for example, one or more templates 1306 (as shown in FIG. 13), 1406 (as shown in FIG. 14), 1504 (as shown in FIG. 15). The templates may be for a particular type of document (e.g., a lease agreement, a master services agreement, a non-disclosure agreement, any legal agreement, non-legal agreement, etc.). The templates may be generated using historical electronic documents (e.g., original document 1502, as shown in FIG. 15). The templates may include a specific structural arrangement and one or more document portions associated with each structural element of the structural arrangement, e.g., as shown in FIG. 13. The structural arrangement as well as associated document portions may be determined based on the analysis of the historical documents (e.g., original documents 1502) using a machine learning model, which may include ML model(s) 210 and/or generative AI model(s) 214.

At 1604, the document structure and clause extraction engine 150 may determine whether or not an update and/or any other type of modification, e.g., addition, deletion, change, etc., may have been received with respect to any of the first templates.

If not, the template generation engine 212 may be configured to generate an object model (e.g., object model 1410) that may be configured to include one or more of the first templates, at 1606. The object model may be configured to include any metadata, identifiers, and/or any other information/data related to the first template(s).

Otherwise, at 1608, the template generation engine 212 may be configured to generate one or more second templates, e.g., templates 1408 (as shown in FIG. 14), 1506 (as shown in FIG. 15). The updates (e.g., update(s) 1402) may relate to any to any aspect to the first template(s), e.g., an update to one or more document portion associated with one or more structural elements (e.g., a change to a text of a clause in an agreement), an update to the structural element (e.g., an addition of a new section in an agreement), and/or any other type of update. For example, as discussed above, in a non-disclosure agreement, a governing law clause may be changed in accordance with a specific geographic locale where the agreement is intended to be enforced. Thus, for the non-disclosure agreement to be enforceable in the United States, the governing clause may be modified to state, "This agreement shall be enforceable under the laws of the State of California, United States." and for the agreement to be enforceable in France, the governing clause may be altered to recite "This agreement shall be enforceable under the laws of France." Embodiments are not limited to the above examples.

One or more structural elements may be added and/or removed and/or modified. For example, as is also discussed herein, in a lease agreement, a liabilities clause may be added to the lease agreement's template's structure, a confidentiality clause may be removed from the lease agreement's template's structure, etc. When modifying structural arrangement of the first template, the template generation engine 212 may be configured associate and/or disassociate corresponding document portions (e.g., adding text of the liabilities clause, removing text of the confidentiality clause, etc.). Embodiments are not limited to the above examples.

At 1610, the template generation engine 212 may be configured to generate an object model (e.g., object model 1410). The object model may include one or more of the following: the first template, the second template, and/or any between the first and second templates (as for example is shown in FIG. 14, where the differences may include portion 2.1 1418, structural element 2 1420, and/or portion 3 1422 that are not present in the first template). The object model may include various metadata, identifiers, and/or any other information and/or data that may be representative of the templates and/or any differences between them. The object model may also be stored in the document portion library 208.

At 1612, the document structure and clause extraction engine 150 and/or the document generation engine 216 may be configured to receive a request to generate an electronic document. The engines 150 and/or 216 may query the document portion library 208 and retrieve the object model and/or any of the first and/or second templates for the purposes of generating the electronic document (e.g., a lease agreement), which, once generated (as shown in FIG. 17), at 1614, may be presented to the user on a graphical user interface of the user device 218.

In some embodiments, one or more users, such as, user of a computing user device 218 may provide feedback 220 to the generated electronic document (and/or to the first and second templates), at 1616. For example, the user may indicate that a confidentiality term clause should not be included in a lease agreement. The feedback 220 may be provided to the template generation engine 212, which may use the feedback to update and/or revise the first template and/or the second template, as well as any of the extracted document portions, the association/linking of document portions to the structural representation in the first and/or the second templates, one or more ML model(s) 210, and/or perform any other actions. Alternatively, or in addition, the feedback may be provided without the document generation engine 216 generating a particular document.

Figure 17:
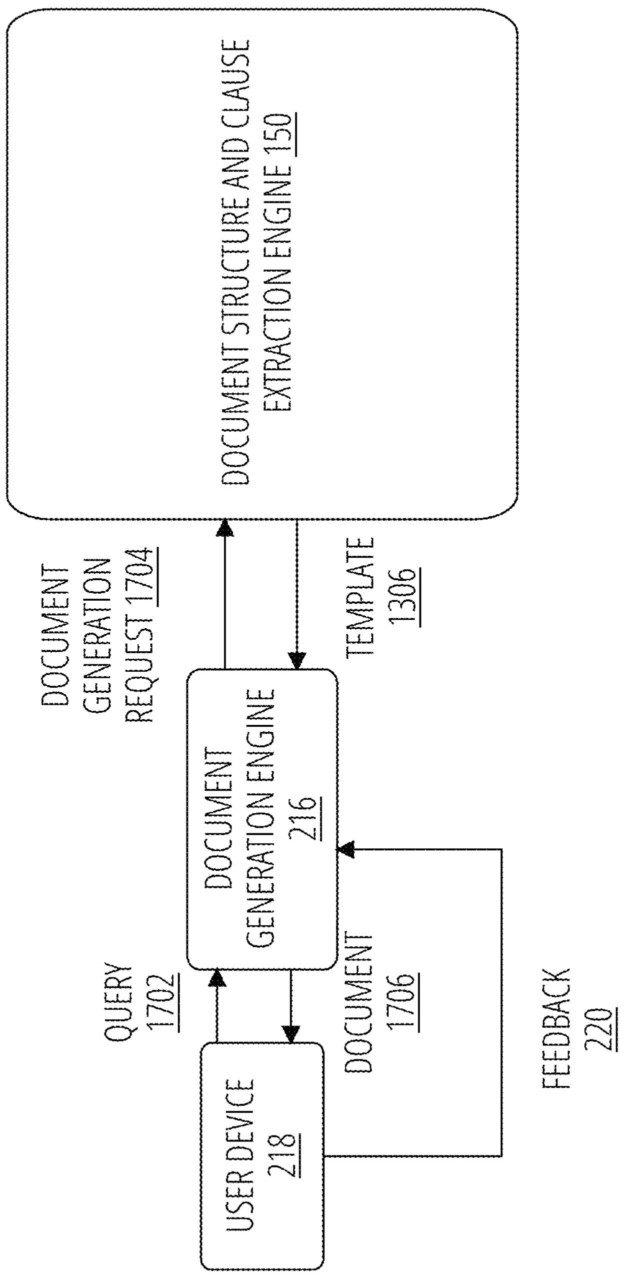
FIG. 17 illustrates an example operation of the document generation engine, according to some embodiments of the current subject matter.

FIG. 17 illustrates an example operation of the document generation engine 216, according to some embodiments of the current subject matter. The document generation engine 216 may be used to generate one or more documents 1706 based on a query 1702 that may be sent from the user device 218.

For example, the user of the user device 218 may input a query 1702 stating "Generate a residential lease agreement." The document generation engine 216 may receive and process the query 1702 to determine that the user wants generation of a document having a "lease agreement" type. Using this information (and/or any other information that the document generation engine 216 may determine from the query 1702), the document generation engine 216 may generate a document generation request 1704. The request 1704 may include information that the engine 216 may have determined based on the query 1702, including, for example, the type of the document being sought to be generated, the original query 1702, and/or any other information.

The document generation engine 216 may then send the document generation request 1704 to document structure and clause extraction engine 150. The engine 150 may receive and process the request 1704 and provide it, for example, to the template generation engine 212. The engine 212 may retrieve one or more templates 1306 (and/or templates 1406, 1408, 1504, 1506) that it may have already generated (as discussed herein) and/or generate a template 1306 (and/or templates 1406, 1408, 1504, 1506) upon receiving the document generation request 1704. The latter allows the document structure and clause extraction engine 150 to generate document templates dynamically and/or on-the-fly without performing any preprocessing of documents 202.

Once template 1306 (and/or templates 1406, 1408, 1504, 1506) is either retrieved and/or generated, it may be sent to the document generation engine 216, which may form a document 1706 for presentation on a graphical user interface of the user device 218. In some embodiments, the document generation engine 216 may be configured to present multiple templates 1306 (and/or templates 1406, 1408, 1504, 1506) on the graphical user interface of the user device 218. Alternatively, or in addition, the user device 218 may be provided access to the document portion library 208 that may store one or more templates 1306 (and/or templates 1406, 1408, 1504, 1506) that the user may select from.

Upon receiving the document 1706, the user may review the document and determine whether or not it is suitable to the user's needs. The user may use the user device 218 to provide feedback 220. The feedback 220 may any type of feedback, such as, for example, a yes/no vote (e.g., thumbs up, thumbs down, etc.) indicating whether the user's accepted and/or satisfied with the template/associated portions. The feedback 220 may be textual feedback that may include specific comments that may be written and sent to the document structure and clause extraction engine 150. As can be understood, any other type of feedback may be provided.

The engine 150 may receive the user's feedback 220 (whether positive or negative or neutral) and process it. For example, the engine 150 may update the structural representation of the document 1706 and generate an updated document 1706 (e.g., rearrange some structural elements, create new structural elements, revise structural representation, etc.). The engine 150 may also identify other ML model(s) 210 for the purposes of generation of further and/or different templates 1306 and/or associating/linking them to other document portions stored in document portion library 208. The engine 150 may use the user's feedback 220 to update the ML model(s) 210 that are used to generate templates 1306 (and/or templates 1406, 1408, 1504, 1506) and/or any associated document portions. Further, the engine 150 may generate one or more updated templates 1306 (and/or templates 1406, 1408, 1504, 1506) and/or associated document portions and provide an updated template 1306 (and/or templates 1406, 1408, 1504, 1506) to the document generation engine 216. As can be understood, any other actions may be performed by the engine 150 based on the user feedback 220. The engine 150 may train, re-train, refresh-train and/or create new ML model(s) 210.

Any of the above updates generated by the engine 150 may be provided to the ML models and/or generative AI models for generation of structural representations of documents, labeling of portions of documents, creation of templates for documents, associating various document portions with specific template portions, and/or any other tasks. Feedback 220 may be used to update any of the above operations and/or how any of them are performed. This process may continue until the user has no further feedback.

Once the user of the user device 218 has accepted the document 1706, the user may complete the document 1706 with information that may be specific to the user (e.g., names of the parties to the lease agreement, address of the leased premises, etc.). Once the document 1706 is completed by the user, it may be used by the document structure and clause extraction engine 150 to update one or more templates 1306 (and/or templates 1406, 1408, 1504, 1506) that may be stored in the document portion library 208. Alternatively, or in addition, the completed document 1706 may simply be stored by the library 208 and/or any other storage location.

Figure 18:
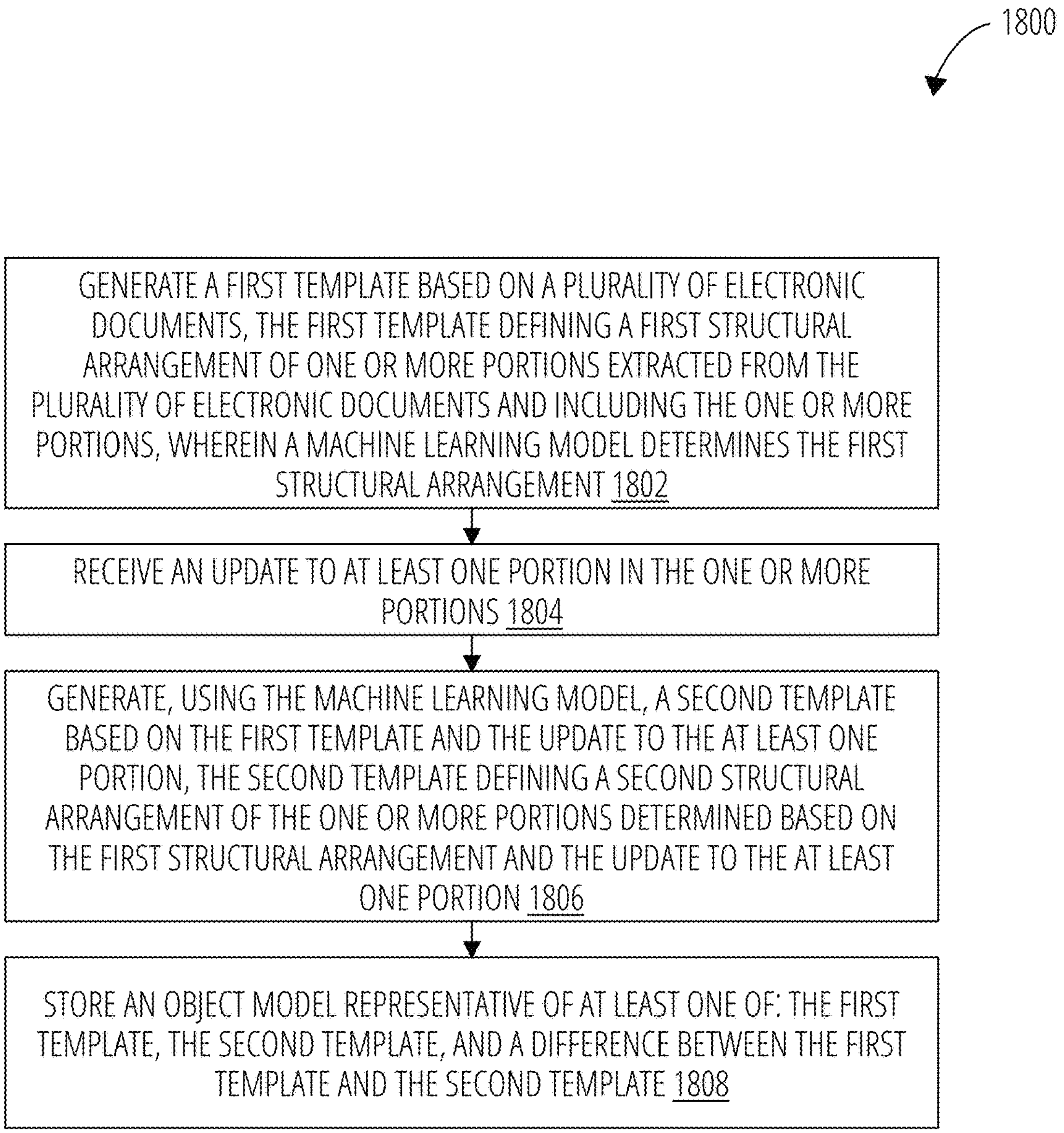
FIG. 18 illustrates an example process for generating one or more templates that may be used to create an electronic document, according to some embodiments of the current subject matter.

FIG. 18 illustrates an example process 1800 for generating one or more templates that may be used to create an electronic document, according to some embodiments of the current subject matter. The process 1800 may be executed by the system 100 shown in FIG. 1, and in particular, the document structure and clause extraction engine 150, as shown in FIG. 2.

At 1802, the document structure and clause extraction engine 150, and in particular, the template generation engine 212, may generate a first template (e.g., template(s) 1406, 1504) based on a plurality of electronic documents (e.g., electronic documents 202). The first template may define a first structural arrangement of one or more portions (portions 1312) extracted from the plurality of electronic documents as well as the portions themselves. A machine learning model (e.g., ML model(s) 210 and/or generative AI model(s) 214) may determine the structural arrangement for the first template.

At 1804, the template generation engine 212 may receive an update (e.g., update(s) 1402) to at least one portion included in the first template. As can be understood, the update(s) may be received with regard to any aspect of the first template (e.g., structural element of the template, portion associated with the structural element, etc.).

At 1806, the template generation engine 212 may generate a second template (e.g., template(s) 1408, 1506) based on the first template (e.g., template(s) 1406, 1504) and the update (e.g., update(s) 1402) to the at least one portion. The engine 212 may use the machine learning model (e.g., ML model(s) 210 and/or generative AI model(s) 214) to generate the second template. The second template may define a second structural arrangement (e.g., as shown in FIG. 14) of document portions. The second structural arrangement may be determined based on the first structural arrangement of the first template and the received update.

At 1808, the template generation engine 212 may generate and store an object model (e.g., object model 1410) that may be representative of at least one of: the first template, the second template, and a difference between the first template and the second template. Alternatively, or in addition, the object model may be presented on a graphical user interface of the user device 218.

Figure 19:
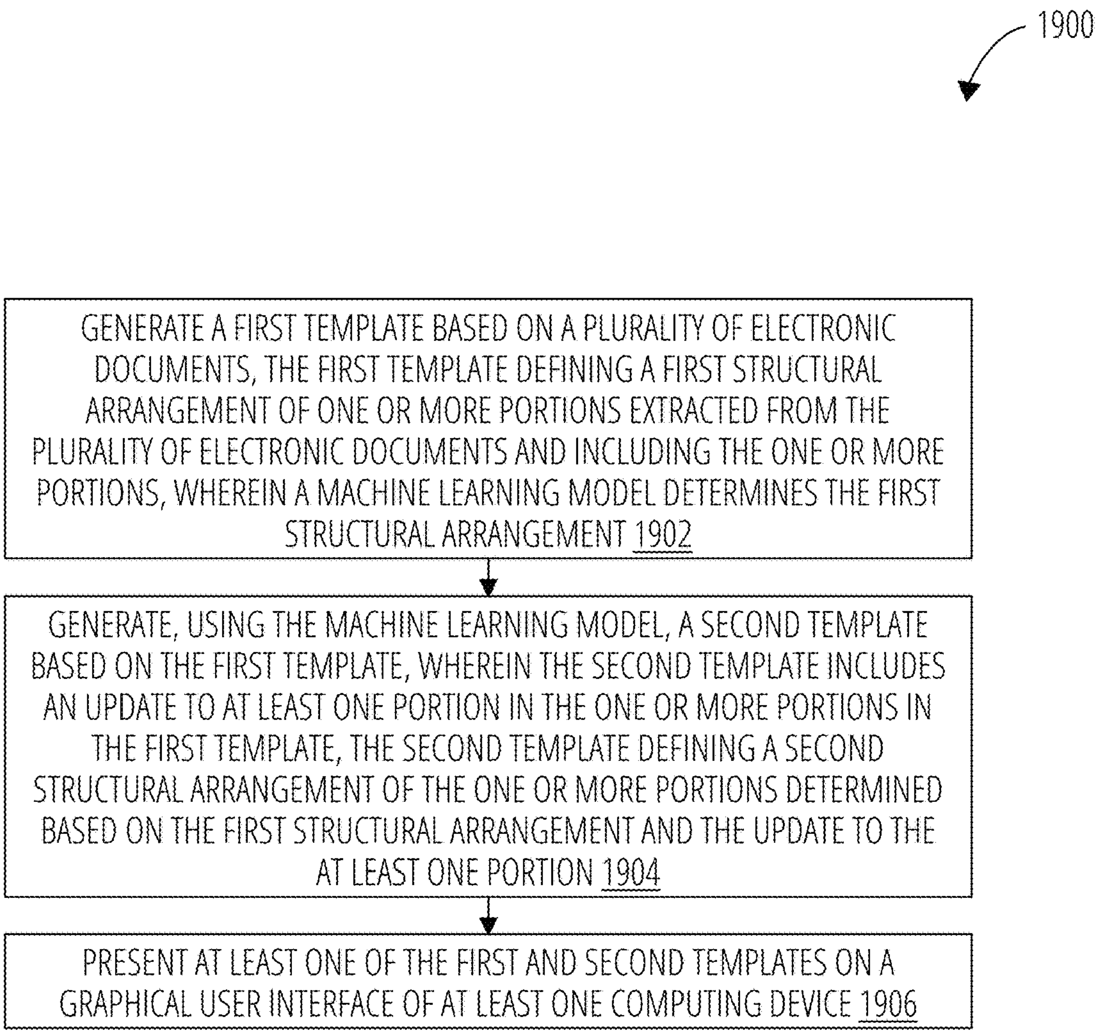
FIG. 19 illustrates another example process for generating one or more templates that may be used to create an electronic document, according to some embodiments of the current subject matter.

FIG. 19 illustrates another example process 1900 for generating one or more templates that may be used to create an electronic document, according to some embodiments of the current subject matter. The process 1900 may be executed by the system 100 shown in FIG. 1, and in particular, the template generation engine 212 of the document structure and clause extraction engine 150, as shown in FIG. 2.

At 1902, the template generation engine 212 may generates a first template (e.g., template(s) 1406, 1504) based on a plurality of electronic documents (e.g., electronic documents 202). The first template may define a first structural arrangement (e.g., as shown in FIG. 14) of one or more portions that may be extracted from the electronic documents and may include the portions themselves. A machine learning model (e.g., ML model(s) 210 and/or generative AI model(s) 214) may be instructed to determine such first structural arrangement.

At 1904, the template generation engine 212 may generate a second template (e.g., template(s) 1408, 1506) based on the first template. In particular, the second template may include an update (e.g., update(s) 1402) to at least one document portion in the first template. The second template may also define a second structural arrangement (e.g., as shown in FIG. 14) of one or more portions that may be determined based on the first structural arrangement and the received update. In some embodiments, the machine learning model (e.g., ML model(s) 210 and/or generative AI model(s) 214) may be used by the template generation engine 212 to generate the second template.

At 1906, the template generation engine 212 may be configured to present at least one of the first and second templates on a graphical user interface of at least one computing device (e.g., user device 218).

Figure 20:
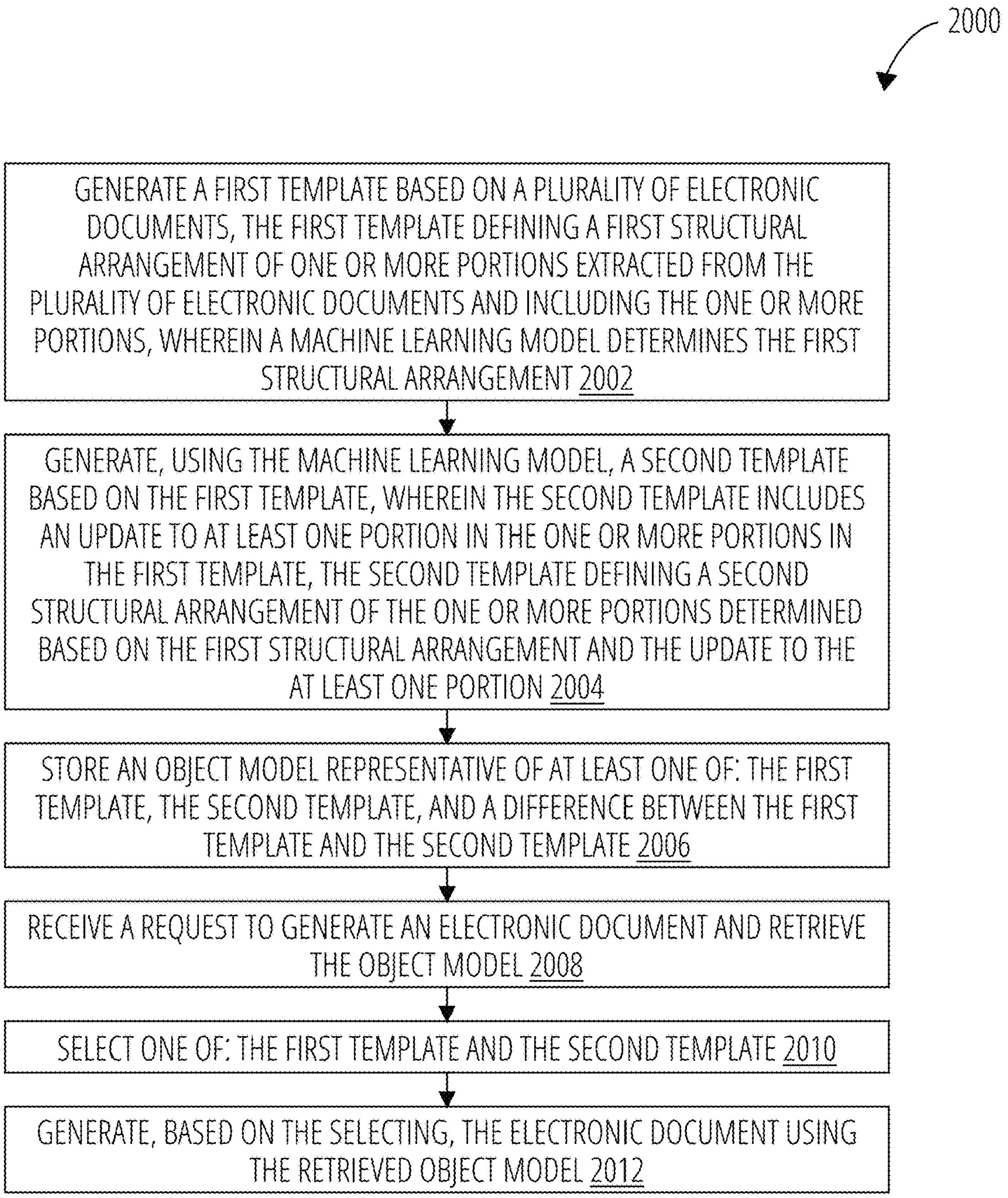
FIG. 20 illustrates yet another example process for generating one or more templates that may be used to create an electronic document, according to some embodiments of the current subject matter.

FIG. 20 illustrates yet another example process 2000 for generating one or more templates that may be used to create an electronic document, according to some embodiments of the current subject matter. The process 2000 may be executed by the system 100 shown in FIG. 1, and in particular, the template generation engine 212 of the document structure and clause extraction engine 150, as shown in FIG. 2.

At 2002, the engine 212 may generate a first template based on a plurality of electronic documents. The first template may define a first structural arrangement of one or more portions extracted from the plurality of electronic documents and may also include one or more such portions. The template generation engine 212 may use a machine learning model (e.g., ML model(s) 210 and/or generative AI model(s) 214) to determine the first structural arrangement.

At 2004, the template generation engine 212 may generates, using the ML model, a second template based on the first template. The second template may include an update to at least one portion contained the first template. The second template may also define a second structural arrangement of portions that may be determined based on the first structural arrangement and an update to at least one portion contained in the first template.

At 2006, the engine 212 may store an object model (e.g., object model 1410) that may be representative of at least one of: the first template, the second template, and a difference between the first template and the second template.

At 2008, the engine 212 may receive a request to generate an electronic document and retrieve the object model (e.g., from document portion library 208). The engine 212 may then select one of: the first template and the second template, at 2010, and generate, based on the selected template, the requested electronic document using the retrieved object model, at 2012.

Figure 21:
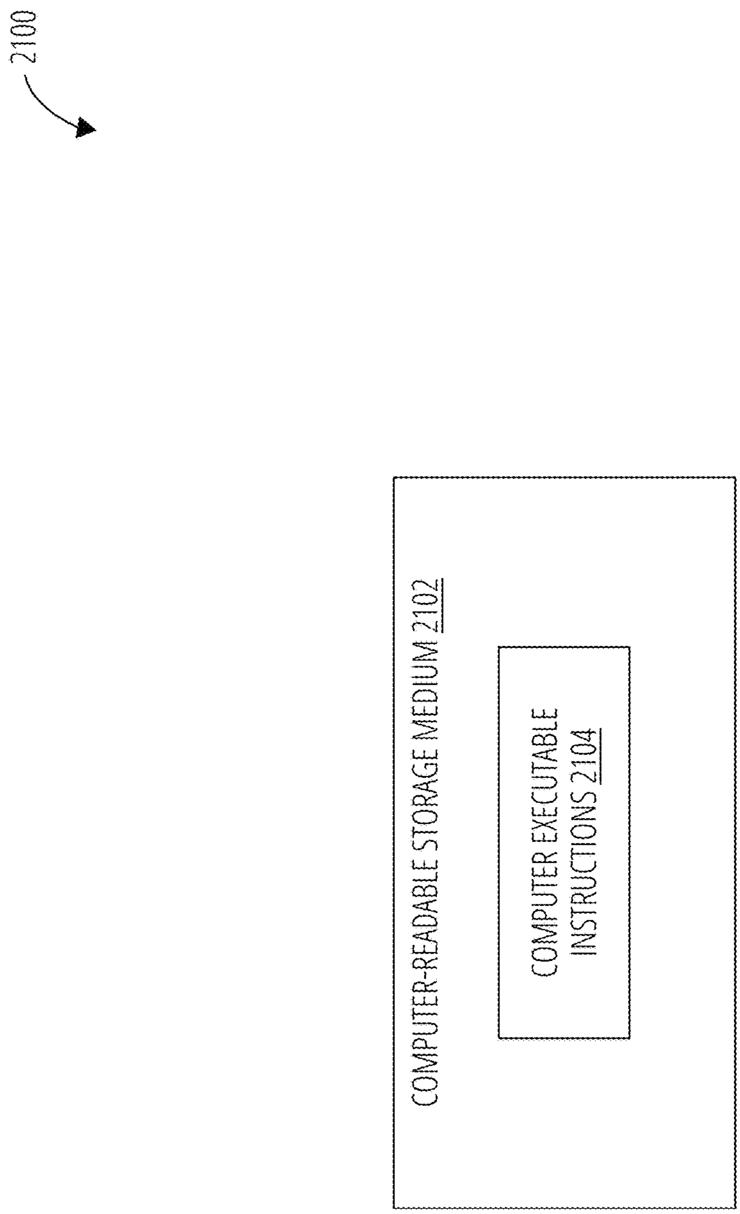
FIG. 21 illustrates a computer-readable storage medium in accordance with one embodiment.

FIG. 21 illustrates an apparatus 2100. Apparatus 2100 may comprise any non-transitory computer-readable storage medium 2102 or machine-readable storage medium, such as an optical, magnetic or semiconductor storage medium. In various embodiments, apparatus 2100 may comprise an article of manufacture or a product. In some embodiments, the computer-readable storage medium 2102 may store computer executable instructions with which circuitry can execute. For example, computer executable instructions 2104 can include instructions to implement operations described with respect to any logic flows described herein. Examples of computer-readable storage medium 2102 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 2104 may include any suitable type of code, such as source code, compiled code, interpreted code, executable code, static code, dynamic code, object-oriented code, visual code, and the like.

FIG. 22 illustrates an embodiment of a computing architecture 2200. Computing architecture 2200 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the computing architecture 2200 may have a single processor with one core or more than one processor. Note that the term "processor" refers to a processor with a single core or a processor package with multiple processor cores. In at least one embodiment, the computing architecture 2200 is representative of the components of the system 100. More generally, the computing architecture 2200 is configured to implement all logic, systems, logic flows, methods, apparatuses, and functionality described herein with reference to previous figures.

As used in this application, the terms "system" and "component" and "module" are intended to refer to a computer-related entity, either hardware, a combination of hardware and software, software, or software in execution, examples of which are provided by the exemplary computing architecture 2200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in FIG. 22, computing architecture 2200 comprises a system-on-chip (SoC) 2202 for mounting platform components. System-on-chip (SoC) 2202 is a point-to-point (P2P) interconnect platform that includes a first processor 2204 and a second processor 2206 coupled via a point-to-point interconnect 2270 such as an Ultra Path Interconnect (UPI). In other embodiments, the computing architecture 2200 may be of another bus architecture, such as a multi-drop bus. Furthermore, each of processor 2204 and processor 2206 may be processor packages with multiple processor cores including core(s) 2208 and core(s) 2210, respectively. While the computing architecture 2200 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform may refers to a motherboard with certain components mounted such as the processor 2204 and chipset 2232. Some platforms may include additional components and some platforms may only include sockets to mount the processors and/or the chipset. Furthermore, some platforms may not have sockets (e.g., SoC, or the like). Although depicted as a SoC 2202, one or more of the components of the SoC 2202 may also be included in a single die package, a multi-chip module (MCM), a multi-die package, a chiplet, a bridge, and/or an interposer. Therefore, embodiments are not limited to a SoC.

The processor 2204 and processor 2206 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 2204 and/or processor 2206. Additionally, the processor 2204 need not be identical to processor 2206.

Processor 2204 includes an integrated memory controller (IMC) 2220 and point-to-point (P2P) interface 2224 and P2P interface 2228. Similarly, the processor 2206 includes an IMC 2222 as well as P2P interface 2226 and P2P interface 2230. IMC 2220 and IMC 2222 couple the processor 2204 and processor 2206, respectively, to respective memories (e.g., memory 2216 and memory 2218). Memory 2216 and memory 2218 may be portions of the main memory (e.g., a dynamic random-access memory (DRAM)) for the platform such as double data rate type 4 (DDR4) or type 5 (DDR5) synchronous DRAM (SDRAM). In the present embodiment, the memory 2216 and the memory 2218 locally attach to the respective processors (i.e., processor 2204 and processor 2206). In other embodiments, the main memory may couple with the processors via a bus and shared memory hub. Processor 2204 includes registers 2212 and processor 2206 includes registers 2214.

Computing architecture 2200 includes chipset 2232 coupled to processor 2204 and processor 2206. Furthermore, chipset 2232 can be coupled to storage device 2250, for example, via an interface (I/F) 2238. The I/F 2238 may be, for example, a Peripheral Component Interconnect-enhanced (PCIe) interface, a Compute Express Link® (CXL) interface, or a Universal Chiplet Interconnect Express (UCIe) interface. Storage device 2250 can store instructions executable by circuitry of computing architecture 2200 (e.g., processor 2204, processor 2206, GPU 2248, accelerator 2254, vision processing unit 2256, or the like). For example, storage device 2250 can store instructions for server device 102, client devices 112, client devices 116, or the like.

Processor 2204 couples to the chipset 2232 via P2P interface 2228 and P2P 2234 while processor 2206 couples to the chipset 2232 via P2P interface 2230 and P2P 2236. Direct media interface (DMI) 2276 and DMI 2278 may couple the P2P interface 2228 and the P2P 2234 and the P2P interface 2230 and P2P 2236, respectively. DMI 2276 and DMI 2278 may be a high-speed interconnect that facilitates, e.g., eight Giga Transfers per second (GT/s) such as DMI 3.0. In other embodiments, the processor 2204 and processor 2206 may interconnect via a bus.

The chipset 2232 may comprise a controller hub such as a platform controller hub (PCH). The chipset 2232 may include a system clock to perform clocking functions and include interfaces for an I/O bus such as a universal serial bus (USB), peripheral component interconnects (PCIs), CXL interconnects, UCIe interconnects, interface serial peripheral interconnects (SPIs), integrated interconnects (I2Cs), and the like, to facilitate connection of peripheral devices on the platform. In other embodiments, the chipset 2232 may comprise more than one controller hub such as a chipset with a memory controller hub, a graphics controller hub, and an input/output (I/O) controller hub.

In the depicted example, chipset 2232 couples with a trusted platform module (TPM) 2244 and UEFI, BIOS, FLASH circuitry 2246 via I/F 2242. The TPM 2244 is a dedicated microcontroller designed to secure hardware by integrating cryptographic keys into devices. The UEFI, BIOS, FLASH circuitry 2246 may provide pre-boot code. The I/F 2242 may also be coupled to a network interface circuit (NIC) 2280 for connections off-chip.

Furthermore, chipset 2232 includes the I/F 2238 to couple chipset 2232 with a high-performance graphics engine, such as, graphics processing circuitry or a graphics processing unit (GPU) 2248. In other embodiments, the computing architecture 2200 may include a flexible display interface (FDI) (not shown) between the processor 2204 and/or the processor 2206 and the chipset 2232. The FDI interconnects a graphics processor core in one or more of processor 2204 and/or processor 2206 with the chipset 2232.

The computing architecture 2200 is operable to communicate with wired and wireless devices or entities via the network interface (NIC) 180 using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, 3G, 4G, LTE wireless technologies, among others. Thus, the communication can be a predefined structure as with a conventional network or simply an ad hoc communication between at least two devices. Wi-Fi networks use radio technologies called IEEE 802.11x (a, b, g, n, ac, ax, etc.) to provide secure, reliable, fast wireless connectivity. A Wi-Fi network can be used to connect computers to each other, to the Internet, and to wired networks (which use IEEE 802.3-related media and functions).

Additionally, accelerator 2254 and/or vision processing unit 2256 can be coupled to chipset 2232 via I/F 2238. The accelerator 2254 is representative of any type of accelerator device (e.g., a data streaming accelerator, cryptographic accelerator, cryptographic co-processor, an offload engine, etc.). One example of an accelerator 2254 is the Intel® Data Streaming Accelerator (DSA). The accelerator 2254 may be a device including circuitry to accelerate copy operations, data encryption, hash value computation, data comparison operations (including comparison of data in memory 2216 and/or memory 2218), and/or data compression. For example, the accelerator 2254 may be a USB device, PCI device, PCIe device, CXL device, UCIe device, and/or an SPI device. The accelerator 2254 can also include circuitry arranged to execute machine learning (ML) related operations (e.g., training, inference, etc.) for ML models. Generally, the accelerator 2254 may be specially designed to perform computationally intensive operations, such as hash value computations, comparison operations, cryptographic operations, and/or compression operations, in a manner that is more efficient than when performed by the processor 2204 or processor 2206. Because the load of the computing architecture 2200 may include hash value computations, comparison operations, cryptographic operations, and/or compression operations, the accelerator 2254 can greatly increase performance of the computing architecture 2200 for these operations.

The accelerator 2254 may include one or more dedicated work queues and one or more shared work queues (each not pictured). Generally, a shared work queue is configured to store descriptors submitted by multiple software entities. The software may be any type of executable code, such as a process, a thread, an application, a virtual machine, a container, a microservice, etc., that share the accelerator 2254. For example, the accelerator 2254 may be shared according to the Single Root I/O virtualization (SR-IOV) architecture and/or the Scalable I/O virtualization (S-IOV) architecture. Embodiments are not limited in these contexts. In some embodiments, software uses an instruction to atomically submit the descriptor to the accelerator 2254 via a non-posted write (e.g., a deferred memory write (DMWr)). One example of an instruction that atomically submits a work descriptor to the shared work queue of the accelerator 2254 is the ENQCMD command or instruction (which may be referred to as "ENQCMD" herein) supported by the Intel® Instruction Set Architecture (ISA). However, any instruction having a descriptor that includes indications of the operation to be performed, a source virtual address for the descriptor, a destination virtual address for a device-specific register of the shared work queue, virtual addresses of parameters, a virtual address of a completion record, and an identifier of an address space of the submitting process is representative of an instruction that atomically submits a work descriptor to the shared work queue of the accelerator

2254. The dedicated work queue may accept job submissions via commands such as the movdir64b instruction.

Various I/O devices 2260 and display 2252 couple to the bus 2272, along with a bus bridge 2258 which couples the bus 2272 to a second bus 2274 and an I/F 2240 that connects the bus 2272 with the chipset 2232. In one embodiment, the second bus 2274 may be a low pin count (LPC) bus. Various devices may couple to the second bus 2274 including, for example, a keyboard 2262, a mouse 2264 and communication devices 2266.

Furthermore, an audio I/O 2268 may couple to second bus 2274. Many of the I/O devices 2260 and communication devices 2266 may reside on the system-on-chip (SoC) 2202 while the keyboard 2262 and the mouse 2264 may be add-on peripherals. In other embodiments, some or all the I/O devices 2260 and communication devices 2266 are add-on peripherals and do not reside on the system-on-chip (SoC) 2202.

FIG. 23 illustrates a block diagram of an exemplary communications architecture 2300 suitable for implementing various embodiments as previously described. The communications architecture 2300 includes various common communications elements, such as a transmitter, receiver, transceiver, radio, network interface, baseband processor, antenna, amplifiers, filters, power supplies, and so forth. The embodiments, however, are not limited to implementation by the communications architecture 2300.

As shown in FIG. 23, the communications architecture 2300 includes one or more clients 2302 and servers 2304. The clients 2302 may implement a client version of the server device 102, for example. The servers 2304 may implement a server version of the server device 102, for example. The clients 2302 and the servers 2304 are operatively connected to one or more respective client data stores 2308 and server data stores 2310 that can be employed to store information local to the respective clients 2302 and servers 2304, such as cookies and/or associated contextual information.

The clients 2302 and the servers 2304 may communicate information between each other using a communication framework 2306. The communications communication framework 2306 may implement any well-known communications techniques and protocols. The communications communication framework 2306 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

(117) The communication framework 2306 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11 network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 2302 and the servers 2304. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

At least one computer-readable storage medium may include instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Various embodiments also relate to apparatus or systems for performing these operations. This apparatus may be specially constructed for the required purpose, or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The various elements of the devices as previously described with reference to FIGS. 1-20 may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

It will be appreciated that the exemplary devices shown in the block diagrams described above may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

The following examples pertain to further embodiments, from which numerous permutations and configurations will be apparent.

In one aspect, a method may include generating, using at least one processor, a first template based on a plurality of electronic documents, the first template defining a first structural arrangement of one or more portions extracted from the plurality of electronic documents and including the one or more portions, wherein a machine learning model determines the first structural arrangement; receiving, using the at least one processor, an update to at least one portion in the one or more portions; generating, using the at least one processor, using the machine learning model, a second template based on the first template and the update to the at least one portion, the second template defining a second structural arrangement of the one or more portions determined based on the first structural arrangement and the update to the at least one portion; and storing, using the at least one processor, an object model representative of at least one of: the first template, the second template, and a difference between the first template and the second template.

The method may also include wherein each of the first template and the second is generated based on a type of at least one electronic document in the plurality of electronic documents.

The method may also include wherein the first template is generated using one or more historical versions of one or more electronic documents in the plurality of electronic documents.

The method may also include wherein the first structural arrangement of the first template and the second structural arrangement of the second template are the same, wherein the object model includes the update to the at least one portion.

The method may also include wherein the first structural arrangement and the second structural arrangement are different, wherein the object model includes the update to the at least one portion and at least one structural difference between the first structural arrangement of the first template and the second structural arrangement of the second template.

The method may also include wherein the at least one structural difference defines arrangement of the update to the at least one portion within the second template.

The method may also include receiving a request to generate an electronic document; selecting one of: the first template and the second template; and generating, based on the selecting, the electronic document.

The method may also include wherein the plurality of electronic documents includes at least one of the following: an agreement, a legal document, a non-legal document, and any combinations thereof.

The method may also include receiving at least one feedback from at least one user computing device; performing, based on the received at least one feedback, at least one of the following: updating at least one of the first and second templates to generate at least one of the first and second templates, respectively; identifying another machine learning model and generating, using the another machine learning model, at least one of: the first and second templates defining at least another structural arrangement of the one or more portions of the electronic document for each type of electronic document; updating the machine learning model to generate an updated machine learning model and generating, using the updated machine learning model, at least one of: the first and second templates of the electronic document for each type of electronic document; and any combination thereof.

The method may also include wherein the at least one machine learning model includes at least one of the following: a large language model, at least another generative AI model, and any combination thereof.

In one aspect, a system may include at least one processor; and at least one non-transitory storage media storing instructions, that when executed by the at least one processor, cause the at least one processor to: generate a first template based on a plurality of electronic documents, the first template defining a first structural arrangement of one or more portions extracted from the plurality of electronic documents and including the one or more portions, wherein a machine learning model determines the first structural arrangement; generate, using the machine learning model, a second template based on the first template, wherein the second template includes an update to at least one portion in the one or more portions in the first template, the second template defining a second structural arrangement of the one or more portions determined based on the first structural arrangement and the update to the at least one portion; and present at least one of the first and second templates on a graphical user interface of at least one computing device.

The system may also include wherein the at least one processor is configured to store an object model representative of at least one of: the first template, the second template, and a difference between the first template and the second template;

The system may also include wherein the first structural arrangement of the first template and the second structural arrangement of the second template are the same, wherein the object model includes the update to the at least one portion.

The system may also include wherein the first structural arrangement and the second structural arrangement are different, wherein the object model includes the update to the at least one portion and at least one structural difference between the first structural arrangement of the first template and the second structural arrangement of the second template.

The system may also include wherein the at least one structural difference defines arrangement of the update to the at least one portion within the second template.

The system may also include wherein each of the first template and the second is generated based on a type of at least one electronic document in the plurality of electronic documents.

The system may also include wherein the first template is generated using one or more historical versions of one or more electronic documents in the plurality of electronic documents.

The system may also include wherein the at least one processor is configured to receive a request to generate an electronic document; select one of: the first template and the second template; and generate, based on the selecting, the electronic document.

In one aspect, a computer program product comprising a non-transitory machine-readable medium storing instructions that, when executed by at least one programmable processor, cause the at least one programmable processor to: generate a first template based on a plurality of electronic documents, the first template defining a first structural arrangement of one or more portions extracted from the plurality of electronic documents and including the one or more portions, wherein a machine learning model determines the first structural arrangement; generate, using the machine learning model, a second template based on the first template, wherein the second template includes an update to at least one portion in the one or more portions in the first template, the second template defining a second structural arrangement of the one or more portions determined based on the first structural arrangement and the update to the at least one portion; store an object model representative of at least one of: the first template, the second template, and a difference between the first template and the second template; receive a request to generate an electronic document and retrieve the object model; select one of: the first template and the second template; and generate, based on the selecting, the electronic document using the retrieved object model.

The computer program product may also include wherein the at least one processor is configured to receive at least one feedback from at least one user computing device; perform, based on the received at least one feedback, at least one of the following: update at least one of the first and second templates to generate at least one of the first and second templates, respectively; identify another machine learning model and generating, using the another machine learning model, at least one of: the first and second templates defining at least another structural arrangement of the one or more portions of the electronic document for each type of electronic document; update the machine learning model to generate an updated machine learning model and generating, using the updated machine learning model, at least one of: the first and second templates of the electronic document for each type of electronic document; and any combination thereof.

Any of the computing apparatus examples given above may also be implemented as means plus function examples. Other technical features may be readily apparent to one skilled in the art from the following figures, descriptions, and claims.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. A computer-implemented method, comprising:

generating, using at least one processor, a first template based on a plurality of electronic documents, the first template defining a first structural arrangement of one or more portions extracted from the plurality of electronic documents and including the one or more portions, wherein a machine learning model determines the first structural arrangement;

receiving, using the at least one processor, an update to at least one portion in the one or more portions from a graphical user interface;

generating, using the at least one processor, using the machine learning model, a second template based on the first template and the update to the at least one portion, the second template defining a second structural arrangement of the one or more portions determined based on the first structural arrangement and the update to the at least one portion;

storing, using the at least one processor, an object model in a template database, wherein the object model is representative of at least one of: the first template, the second template, and a difference between the first template and the second template;

receiving, using the at least one processor, a query to the template database for the first template or the second template from the graphical user interface; and generating, using the at least one processor, an electronic document based on the object model for the first template or the second template.

2. The method of claim 1, wherein each of the first template and the second is generated based on a type of at least one electronic document in the plurality of electronic documents.

3. The method of claim 1, wherein the first template is generated using one or more historical versions of one or more electronic documents in the plurality of electronic documents.

4. The method of claim 1, wherein the first structural arrangement of the first template and the second structural arrangement of the second template are the same, wherein the object model includes the update to the at least one portion.

5. The method of claim 1, wherein the first structural arrangement and the second structural arrangement are different, wherein the object model includes the update to the at least one portion and at least one structural difference between the first structural arrangement of the first template and the second structural arrangement of the second template.

6. The method of claim 5, wherein the at least one structural difference defines arrangement of the update to the at least one portion within the second template.

7. The method of claim 1, further comprising receiving a request to generate the electronic document;

selecting one of: the first template and the second template; and generating, based on the selecting, the electronic document.

8. The method of claim 1, wherein the plurality of electronic documents includes at least one of the following: an agreement, a legal document, a non-legal document, and any combinations thereof.

9. The method of claim 1, further comprising receiving at least one feedback from at least one user computing device;

performing, based on the received at least one feedback, at least one of the following:

updating at least one of the first and second templates to generate at least one of the first and second templates, respectively;

identifying another machine learning model and generating, using the another machine learning model, at least one of: the first and second templates defining at least another structural arrangement of the one or more portions of the electronic document for each type of electronic document;

updating the machine learning model to generate an updated machine learning model and generating, using the updated machine learning model, at least one of: the first and second templates of the electronic document for each type of electronic document; and any combination thereof.

10. The method of claim 1, wherein the at least one machine learning model includes at least one of the following: a large language model, at least another generative AI model, and any combination thereof.

11. A system, comprising:

at least one processor; and at least one non-transitory storage media storing instructions, that when executed by the at least one processor, cause the at least one processor to:

generate a first template based on a plurality of electronic documents, the first template defining a first structural arrangement of one or more portions extracted from the plurality of electronic documents and including the one or more portions, wherein a machine learning model determines the first structural arrangement;

generate, using the machine learning model, a second template based on the first template, wherein the second template includes an update to at least one portion in the one or more portions in the first template received from a graphical user interface, the second template defining a second structural arrangement of the one or more portions determined based on the first structural arrangement and the update to the at least one portion;

present at least one of the first and second templates on the graphical user interface of at least one computing device;

receive a selection of the first template or the second template from the graphical user interface; and generate an electronic document based on the first template or the second template.

12. The system of claim 11, wherein the at least one processor is configured to store an object model representative of at least one of: the first template, the second template, and a difference between the first template and the second template.

13. The system of claim 12, wherein the first structural arrangement of the first template and the second structural arrangement of the second template are the same, wherein the object model includes the update to the at least one portion.

14. The system of claim 12, wherein the first structural arrangement and the second structural arrangement are different, wherein the object model includes the update to the at least one portion and at least one structural difference between the first structural arrangement of the first template and the second structural arrangement of the second template.

15. The system of claim 14, wherein the at least one structural difference defines arrangement of the update to the at least one portion within the second template.

16. The system of claim 11, wherein each of the first template and the second is generated based on a type of at least one electronic document in the plurality of electronic documents.

17. The system of claim 11, wherein the first template is generated using one or more historical versions of one or more electronic documents in the plurality of electronic documents.

18. The system of claim 11, wherein the at least one processor is configured to receive a request to generate the electronic document;

select one of: the first template and the second template; and generate, based on the selecting, the electronic document.

19. A method computer program product comprising a non-transitory machine-readable medium storing instructions that, when executed by at least one programmable processor, cause the at least one programmable processor to:

generate a first template based on a plurality of electronic documents, the first template defining a first structural arrangement of one or more portions extracted from the plurality of electronic documents and including the one or more portions, wherein a machine learning model determines the first structural arrangement;

generate, using the machine learning model, a second template based on the first template, wherein the second template includes an update to at least one portion in the one or more portions in the first template received from a graphical user interface, the second template defining a second structural arrangement of the one or more portions determined based on the first structural arrangement and the update to the at least one portion;

store an object model in a template database, wherein the object model is representative of at least one of: the first template, the second template, and a difference between the first template and the second template;

receive a request to generate an electronic document and retrieve the object model from the template database;

select one of: the first template and the second template from the graphical user interface; and generate, based on the selecting, the electronic document using the retrieved object model from the template database.

20. The computer program product of claim 19, wherein the at least one processor is configured to receive at least one feedback from at least one user computing device;

perform, based on the received at least one feedback, at least one of the following:

update at least one of the first and second templates to generate at least one of the first and second templates, respectively;

identify another machine learning model and generating, using the another machine learning model, at least one of: the first and second templates defining at least another structural arrangement of the one or more portions of the electronic document for each type of electronic document;

update the machine learning model to generate an updated machine learning model and generating, using the updated machine learning model, at least one of: the first and second templates of the electronic document for each type of electronic document; and any combination thereof.

* * * * *